US012768237B2

(12) United States Patent
Kibler et al.

(10) Patent No.: US 12,768,237 B2
(45) Date of Patent: Oct. 20, 2026

(54) FLUID CONNECTION AND SEAL USEFUL AT WELLHEADS

(71) Applicant: FHE USA LLC, Fruita, CO (US)

(72) Inventors: Matthew E. Kibler, Grand Junction, CO (US); Kyle Scholl, Peoria, IL (US); Keith C. Johansen, Price, UT (US); Nicolas G. Snoke, Grand Junction, CO (US); Steven M. Hutchinson, Fruita, CO (US)

(73) Assignee: FHE USA LLC, Fruita, CO (US)

( * ) Notice: Subject to any disclaimer, the term of this patent is extended or adjusted under 35 U.S.C. 154(b) by 34 days.

(21) Appl. No.: 18/927,541

(22) Filed: Oct. 25, 2024

(65) Prior Publication Data

US 2025/0043648 A1 Feb. 6, 2025

Related U.S. Application Data

(63) Continuation-in-part of application No. 18/344,578, filed on Jun. 29, 2023, now Pat. No. 12,173,577,
(Continued)

(51) Int. Cl.
*E21B 33/038* (2006.01)
*E21B 17/046* (2006.01)
(Continued)

(52) U.S. Cl.
CPC .......... *E21B 33/038* (2013.01); *E21B 17/046* (2013.01); *E21B 23/02* (2013.01);
(Continued)

(58) Field of Classification Search
CPC .... E21B 33/038; E21B 17/046; F16L 37/002; F16L 37/127; F16L 37/096
(Continued)

(56) References Cited

U.S. PATENT DOCUMENTS 2,962,096 A 11/1960 Knox
3,096,999 A 7/1963 Ahlstone et al.
(Continued)

FOREIGN PATENT DOCUMENTS

GB 2147072 A 5/1985
WO 2016106176 A2 6/2016
(Continued)

OTHER PUBLICATIONS

Case pending in the United States Patent and Trademark Office Before the Patent Trial and Appeal Board: *Lee Specialties Inc.* v. *Fhe USA LLC.*, document filed entitled “Petition for Inter Partes Review Under 35 U.S.C. Section 312 And 37 C.F.R. Section 42.104”.

(Continued)

*Primary Examiner* — Zachary T Dragicevich
(74) *Attorney, Agent, or Firm* — Zeman-Mullen & Ford, LLP

(57) ABSTRACT

A fluid connection assembly includes a fluid connection adapter and a fluid connection housing assembly. A seal forms when the adapter enters the housing assembly. Wedge-style locking elements on the housing assembly constrict about the adapter. A displaceable locking ring urges the wedges to tighten against the adapter. Internal pressure further encourages the adapter to tighten against the wedges. Some embodiments enable locking on the exterior of the adapter and sealing on the interior. The housing assembly is movable to the adapter when the adapter is connected to a stationary fixture such as a wellhead. The wedge assemblies may affix to a flanged connector so that wedge constriction loads transmit to the flanged connector in the first instance. A locking tab feature guards against accidental separation of the connection assembly when pressurized. A quick test
(Continued)

system resides entirely on the housing assembly in order to simplify the adapter.

42 Claims, 44 Drawing Sheets

Related U.S. Application Data which is a continuation of application No. 17/127,425, filed on Dec. 18, 2020, now Pat. No. 11,692,408, which is a continuation of application No. 16/677,428, filed on Nov. 7, 2019, now Pat. No. 10,907,435, which is a continuation of application No. 16/221,279, filed on Dec. 14, 2018, now Pat. No. 10,550,659.

(60) Provisional application No. 63/616,573, filed on Dec. 30, 2023, provisional application No. 62/649,008, filed on Mar. 28, 2018.

(51) Int. Cl.

| | |
|---|---|
| ***E21B 23/02*** | (2006.01) |
| ***E21B 33/035*** | (2006.01) |
| ***E21B 33/06*** | (2006.01) |
| ***F16L 37/00*** | (2006.01) |
| ***F16L 37/096*** | (2006.01) |
| ***F16L 37/127*** | (2006.01) |

(52) U.S. Cl.

CPC ............ *E21B 33/06* (2013.01); *F16L 37/002* (2013.01); *E21B 33/0355* (2013.01); *F16L 37/096* (2013.01); *F16L 37/127* (2013.01)

(58) Field of Classification Search

USPC .......................... 285/315, 920; 166/338, 368

See application file for complete search history.

(56) References Cited

U.S. PATENT DOCUMENTS

| | | | |
|---|---|---|---|
| 3,452,815 | A | 7/1969 | Watkins |
| 3,486,556 | A | 12/1969 | Burgess |
| 3,608,932 | A | 9/1971 | Brown |
| 3,661,409 | A | 5/1972 | Brown et al. |
| 3,709,623 | A | 1/1973 | Stephan et al. |
| 3,841,665 | A | 10/1974 | Capot |
| 3,874,706 | A | 4/1975 | Arnold |
| 4,153,278 | A | 5/1979 | Ahlstone |
| 4,209,040 | A | 6/1980 | Peters |
| 4,225,160 | A | 9/1980 | Ortloff |
| 4,441,742 | A | 4/1984 | Owens, III |
| 4,526,406 | A | 7/1985 | Nelson |
| 4,557,508 | A | 12/1985 | Walker |
| 4,646,827 | A | 3/1987 | Cobb |
| 4,651,830 | A | 3/1987 | Crotwell |
| 4,667,986 | A | 5/1987 | Johnson et al. |
| 4,673,041 | A | 6/1987 | Turner et al. |
| 4,730,853 | A | 3/1988 | Gjessing |
| 4,815,770 | A | 3/1989 | Hyne et al. |
| 5,052,439 | A | 10/1991 | Smith, III |
| 5,099,882 | A | 3/1992 | Smith, III |
| 5,114,117 | A | 5/1992 | Appleford et al. |
| 5,279,369 | A | 1/1994 | Brammer |
| 5,282,655 | A | 2/1994 | Marietta |
| 5,479,960 | A | 1/1996 | Kirkman |
| 5,509,476 | A | 4/1996 | Vick, Jr. |
| 5,658,018 | A | 8/1997 | Hjertjolm |
| 5,771,927 | A | 6/1998 | Johansen et al. |
| 6,125,939 | A | 10/2000 | Abreo, Jr. |
| 6,129,149 | A | 10/2000 | Beall |
| 6,397,948 | B1 | 6/2002 | Williams et al. |
| 6,499,773 | B1 | 12/2002 | Ostergaard |
| 6,609,734 | B1 | 8/2003 | Baugh |
| 7,159,652 | B2 | 1/2007 | McGuire et al. |
| 7,740,061 | B2 | 6/2010 | Van Bilderbeek et al. |
| 8,272,444 | B2 | 9/2012 | Baugh |
| 8,474,537 | B2 | 7/2013 | Voss et al. |
| 8,511,387 | B2 | 8/2013 | Fraser et al. |
| 8,746,345 | B2 | 6/2014 | Kotrla et al. |
| 9,334,705 | B1 | 5/2016 | Ward et al. |
| 9,416,894 | B2 | 8/2016 | Abel |
| 9,644,443 | B1 | 5/2017 | Johansen et al. |
| 9,670,745 | B1 | 6/2017 | Johansen et al. |
| 9,784,394 | B2 | 10/2017 | Sannadi et al. |
| 9,879,496 | B2 | 1/2018 | Johansen et al. |
| 9,939,096 | B2 | 4/2018 | Tiberghien |
| 10,030,461 | B2 | 7/2018 | Johansen et al. |
| 10,072,474 | B2 | 9/2018 | Johansen et al. |
| 10,094,501 | B2 | 10/2018 | Bull et al. |
| 10,100,597 | B2 | 10/2018 | Mozisek |
| 10,107,057 | B2 | 10/2018 | Niehaus |
| 10,107,433 | B2 | 10/2018 | Eckard et al. |
| 10,113,384 | B2 | 10/2018 | Nguyen |
| 2001/0011592 | A1 | 8/2001 | Baker |
| 2003/0168857 | A1 | 9/2003 | Jennings |
| 2005/0146137 | A1 | 7/2005 | Davidson et al. |
| 2008/0006412 | A1 | 1/2008 | Ford |
| 2008/0044221 | A1 | 2/2008 | McKay et al. |
| 2010/0139925 | A1 | 6/2010 | McKay et al. |
| 2011/0025044 | A1 | 2/2011 | McKay |
| 2011/0079399 | A1 | 4/2011 | Nguyen et al. |
| 2011/0095526 | A1 | 4/2011 | Vanderford et al. |
| 2011/0266006 | A1 | 11/2011 | Lacheny et al. |
| 2011/0284206 | A1 | 11/2011 | Nguyen |
| 2012/0012341 | A1 | 1/2012 | White et al. |
| 2012/0222865 | A1 | 9/2012 | Larson et al. |
| 2013/0048309 | A1 | 2/2013 | Young |
| 2013/0093179 | A1 | 4/2013 | Jenkins et al. |
| 2013/0283919 | A1 | 10/2013 | Coonrod et al. |
| 2013/0341539 | A1 | 12/2013 | Hughes et al. |
| 2014/0034337 | A1 | 2/2014 | Van Wijk |
| 2014/0144648 | A1 | 5/2014 | McKay |
| 2014/0251631 | A1 | 9/2014 | Curtiss, III |
| 2014/0262307 | A1 | 9/2014 | Caldwell et al. |
| 2014/0352944 | A1 | 12/2014 | Devarajan et al. |
| 2015/0069755 | A1 | 3/2015 | Bull |
| 2015/0083430 | A1 | 3/2015 | Jahnke et al. |
| 2015/0114667 | A1 | 4/2015 | Mansukh et al. |
| 2016/0084066 | A1 | 3/2016 | DeBerry et al. |
| 2016/0138352 | A1 | 5/2016 | Leba et al. |
| 2016/0281473 | A1 | 9/2016 | Delgado et al. |
| 2016/0376863 | A1 | 12/2016 | Older et al. |
| 2017/0089162 | A1 | 3/2017 | Barnhart et al. |
| 2017/0152721 | A1 | 6/2017 | Bories et al. |
| 2017/0159390 | A1 | 6/2017 | Johansen et al. |
| 2017/0183932 | A1 | 6/2017 | Cotton et al. |
| 2017/0183933 | A1 | 6/2017 | Nguyen |
| 2017/0218716 | A1 | 8/2017 | Boulanger |
| 2017/0226846 | A1 | 8/2017 | Gray et al. |
| 2017/0328145 | A1 | 11/2017 | Wagoner et al. |
| 2017/0328164 | A1 | 11/2017 | Partridge et al. |
| 2018/0058169 | A1 | 3/2018 | Le |
| 2018/0080299 | A1 | 3/2018 | Johansen et al. |
| 2018/0080590 | A1 | 3/2018 | McKay |
| 2018/0128063 | A1 | 5/2018 | Curry |
| 2018/0163493 | A1 | 6/2018 | Le |
| 2018/0163494 | A1 | 6/2018 | Le |
| 2018/0163520 | A1 | 6/2018 | Navar et al. |
| 2018/0179839 | A1 | 6/2018 | Nguyen |
| 2018/0252052 | A1 | 9/2018 | Attiwell |
| 2018/0274707 | A1 | 9/2018 | McIntyre et al. |
| 2018/0283114 | A1 | 10/2018 | Cridland et al. |
| 2018/0292037 | A1 | 10/2018 | Fraczek et al. |
| 2018/0298698 | A1 | 10/2018 | Garro et al. |
| 2018/0298713 | A1 | 10/2018 | Bull et al. |
| 2023/0340851 | A1 | 10/2023 | Kibler et al. |

FOREIGN PATENT DOCUMENTS

| | | | |
|---|---|---|---|
| WO | 2016109143 | A1 | 7/2016 |
| WO | 2016113284 | A1 | 7/2016 |
| WO | 2016156857 | A1 | 10/2016 |
| WO | 2016160195 | A1 | 10/2016 |

(56) References Cited

FOREIGN PATENT DOCUMENTS

| | | | |
|---|---|---|---|
| WO | 2016172229 | A1 | 10/2016 |
| WO | 2016174473 | A1 | 11/2016 |
| WO | 2017040508 | A1 | 3/2017 |
| WO | 2017079801 | A1 | 5/2017 |
| WO | 2017093989 | A1 | 6/2017 |
| WO | 2017102219 | A1 | 6/2017 |
| WO | 2017102220 | A1 | 6/2017 |
| WO | 2017116869 | A2 | 7/2017 |
| WO | 2017141056 | A1 | 8/2017 |
| WO | 2017150982 | A1 | 9/2017 |
| WO | 2017171714 | A1 | 10/2017 |
| WO | 2017171853 | A1 | 10/2017 |
| WO | 2018044680 | A1 | 3/2018 |
| WO | 2018111740 | A1 | 6/2018 |
| WO | 2018111741 | A1 | 6/2018 |
| WO | 2018111882 | A1 | 6/2018 |
| WO | 2018125729 | A2 | 7/2018 |
| WO | 201856526 | A1 | 8/2018 |
| WO | 2018187719 | A1 | 10/2018 |
| WO | 2018191566 | A1 | 10/2018 |

OTHER PUBLICATIONS

Case pending in the United States Patent and Trademark Office Before the Patent Trial and Appeal Board: *Lee Specialties Inc.* v. *Fhe USA LLC.*, document filed entitled "Declaration of Benton Frederick Baugh, Ph.D., P.E., Under 37 C.F.R. Section 1.68 in Support of Petition for Inter Parties Revew".

Case pending in the United States Patent and Trademark Office Before the Patent Trial and Appeal Board: *Lee Specialties Inc.* v. *FHE USA LLC.*, document filed entitled "Curriculum Vitae: Benton F. Baugh Ph.d., P.E., Nae", docket document No. LSI-1004.

Case pending in the United States Patent and Trademark Office Before the Patent Trial and Appeal Board: *Lee Specialties Inc.* v. *FHE USA LLC.*, document filed entitled "Declaration of Andrew M. Nelson", docket document No. LSI-1008.

Specification for Drill-Through Equipment, ANSI/API Specification 16 A, Third Edition, Jun. 2004, effective date Dec. 1, 2004.

Case pending in the United States Patent and Trademark Office Before the Patent Trial and Appeal Board: *Lee Specialties Inc.* v. *FHE USA LLC.*, document filed entitled "Declaration of Ingrid Hsieh-Yee PH.D., Under 37 C.F.R. Section 1.68", docket document No. LSI-1010.

Case pending in the United States Patent and Trademark Office Before the Patent Trial and Appeal Board: *Lee Specialties Inc.* v. *Fhe USA LLC.*, document filed, Elmar, A Varco Company, "Pressure Control Equipment", www.elmar.co.uk. *Lee Specialties* v. *FHE USA*, docket document No. LSI-1012.

Case pending in the United States Patent and Trademark Office Before the Patent Trial and Appeal Board: *Lee Specialties Inc.* v. *FHE USA LLC.*, document filed, document filed entitled "Affidavit of Christopher Butler", docket document No. LSI-1013.

Case No. 5:18-cv-00715-OLG pending in the U.S. District Court for the Western District of Texas San Antonio Division: *FHE USA* v. *Lee Specialties Inc.*, document filed entitled "Plaintiff FHE USA LLC's Supplemental Repsonses and Objections to Defendant's Interrogatory No. 1", docket document No. LSI-1027.

Case No. 5:18-cv-00715-OLG pending in the U.S. District Court for the Western District of Texas San Antonio Division: *FHE USA* v. *Lee Specialties Inc.*, document filed entitled "Supplemental Exhibit A", docket document No. LSI-1028.

TechniipFMC brochure for FracNow Speedloc™-XT product; copyright 2020.

TechnipFMC iComplete™ Speedloc™-XT Connector System video by TechnipFMC dated Jul. 1, 2020, available at https://www.youtube.com/watch?v=a23ESk8sX7g.

Case pending in the United States Patent and Trademark Office Before the Patent Trial and Appeal Board: Decision of the Patent Trial and Appeal Board dated Feb. 10, 2020, instituting review of U.S. Pat. No. 10,030,461 in PTAB Inter-Parties Review case 2019-01366.

Case pending in the United States Patent and Trademark Office Before the Patent Trial and Appeal Board: *Lee Specialties Inc.* v. *FHE USA LLC.*, document filed entitled "Patent Owner's Preliminary Response".

Case pending in the United States Patent and Trademark Office Before the Patent Trial and Appeal Board: *Lee Specialties Inc.* v. *FHE USA LLC.*, document filed entitled "Baugh Supplemental Declaration", docket document No. LSI-1033.

Case pending in the United States Patent and Trademark Office Before the Patent Trial and Appeal Board: *Lee Specialties Inc.* v. *FHE USA LLC.*, document filed entitled "Reply to Patent Owner's Preliminary Response".

Case pending in the United States Patent and Trademark Office Before the Patent Trial and Appeal Board: *Lee Specialties Inc.* v. *FHE USA LLC.*, document filed entitled "Patent Owner's Sur-Reply To Petitioner's Reply to Patent Owner's Preliminary Response".

Case No. 5:18-cv-00715-OLG pending in the U.S. District Court for the Western District of Texas San Antonio Division: *FHE USA* v. *Lee Specialties Inc.*, document filed entitled "Defendant Lee Specialties Inc.'s Supplemental Opening Claim-Construction Brief", docket document No. LSI-1032.

Case No. 5:18-cv-00715-OLG pending in the U.S. District Court for the Western District of Texas San Antonio Division: *FHE USA* v. *Lee Specialties Inc.*, document filed entitled "Defendant Lee Specialties Inc.'s Supplemental Objections and Responses to Plaintiff FHE USA LLC's First Set of Interrogatories (Nos. 4-7)", docket document No. LSI-1030.

Case No. 5:18-cv-00715-OLG pending in the U.S. District Court for the Western District of Texas San Antonio Division: *FHE USA* v. *Lee Specialties Inc.*, document filed entitled "Defendant Lee Specialties Inc.'s Supplemental Responsive Claim-Construction Brief", docket document No. LSI-1034.

Case No. 5:18-cv-00715-OLG pending in the U.S. District Court for the Western District of Texas San Antonio Division: *FHE USA* v. *Lee Specialties Inc.*, document filed entitled "Defendant Lee Specialties Inc.'s Responsive Claim-Construction Brief", docket document No. FHE-2012.

Texas Oil Tools, Doc. No. PSB-027-PIB, Rev B, Product Service Bulletin PSBL-3.06 4.06 5.12 Hydraconn, Jun. 20, 2011, 6 pages.

Specification for Wellhead and Christmas Tree Equipment, ANSI/API Specification 6A, Twentieth Edition, Oct. 2010, effective date: Apr. 1, 2011.

FHE Product Catalog, circa 2014.

Lee Specialties Product Catalog, 2012.

Cain, D.E., et al., "Selecting Surface Wellhead Seal Mechanisms Utilizing a Needs Analysis Approach", Offshore Technology Conference paper, presented at the 21st Annual OTC in Houston, Texas on May 1-4, 1989.

Sabbagh, L., et al., "Optimizing Wireline Gun System Design and Perforating Performance for Very Late Changes in a Gulf of Mexico HPHT Deepwater Well", SPE 113727, paper presented at the 2008 SPE Europec/EAGE Annual Conference and Exhibition held in Rome, Italy, Jun. 9-12, 2008.

Torres, Carlos, et al., "Hurricane Contingency for Stuck Coiled Tubing: Preparing for Platform Evacuation and Allowing a Safe Recovery", SPE 143299, presented at the SPE/ICoTA Coiled Tubing and Well Intervention Conference and Exhibition held in the Woodlands, Texas, Apr. 5-6, 2011.

Lee Posi Lock Slides, circa 2018.

FHE materials, circa 2018.

FHE materials re OTC, circa 2018.

Case No. 5:18-cv-00715-OLG pending in the U.S. District Court for the Western District of Texas San Antonio Division: *FHE USA* v. *Lee Specialties Inc.*, document filed entitled "Joint Claim Construction Chart", docket document No. 36.

Case No. 5:18-cv-715-OLG pending in the U.S. District Court for the Western District of Texas San Antonio Division: *FHE USA* v. *Lee Specialties Inc.*, document filed entitled "Defendent Lee Specialties Inc.'s Opening Claim—Construction Brief", docket document No. 38.

(56) References Cited

OTHER PUBLICATIONS

Case No. 5:18-cv-715-OLG pending in the U.S. District Court for the Western District of Texas San Antonio Division: *FHE USA* v. *Lee Specialties Inc.*, document filed entitled "Declaration of Benton Frederick Baugh, Ph.D., P.E., Regarding Proposed Constructions and Indefiniteness of the Asserted Claims of U.S. Pat. No. 9,879,496 and U.S. Pat. No. 10,030,461", docket document No. 38-2.
Case No. 5:18-cv-00715-OLG pending in the U.S. District Court for the Western District of Texas San Antonio Division: *FHE USA* v. *Lee Specialties Inc.*, document filed entitled "LSI Exhibit 2B Merriam-Webster's", docket document No. 38-4.
Case No. 5:18-cv-00715-OLG pending in the U.S. District Court for the Western District of Texas San Antonio Division: *FHE USA* v. *Lee Specialties Inc.*, document filed entitled "LSI Exhibit 2C McGraw-Hill Engineering", docket document No. 38-5.
Case No. 5:18-cv-00715-OLG pending in the U.S. District Court for the Western District of Texas San Antonio Division: *FHE USA* v. *Lee Specialties Inc.*, document filed entitled "Plaintiff's Opening Claim Construction Brief", docket document No. 39.
Case No. 5:18-cv-00715-OLG pending in the U.S. District Court for the Western District of Texas San Antonio Division: *FHE USA* v. *Lee Specialties Inc.*, document filed entitled "Plaintiff FHE Inc.'s Initial Proposed Claim Constructions", docket document No. LSI-1023.
Case No. 5:18-cv-00715-OLG pending in the U.S. District Court for the Western District of Texas San Antonio Division: *FHE USA* v. *Lee Specialties Inc.*, document filed entitled "Plaintiff FHE USA Inc.'s Amended Modified Proposed Claim Constructions", docket document No. LSI-1024.
Case No. 5:18-cv-715-OLG pending in the U.S. District Court for the Western District of Texas San Antonio Division: *FHE USA* v. *Lee Specialties Inc.*, document filed entitled "Defendent Lee Specialties Inc.'s Responsive Claim—Construction Brief"; docket document No. 41.
Case No. 5:18-cv-00715-OLG pending in the U.S. District Court for the Western District of Texas San Antonio Division: *FHE USA* v. *Lee Specialties Inc.*, document filed entitled "Plaintiff's Responsive Claim Construction Brief", docket document No. 42.
International Search Report and The Written Opinion of the International Searching Authority in related PCT Application No. PCT/US2018/061114 mailed on Apr. 24, 2019 (5 pages).
International Search Report and The Written Opinion of the International Searching Authority in PCT/US2019/023999 mailed Apr. 19, 2019 (6 pages).
Forum Energy Technologies Brochure, "5⅛ ID x 10KSI Hydraulic Latch Assembly—Installation/OperationMaintenance", 24 pages.

FLUID CONNECTION AND SEAL USEFUL AT WELLHEADS

RELATED APPLICATIONS AND PRIORITY CLAIMS

This application claims the benefit of, and priority to, and commonly assigned U.S. provisional patent application Ser. No. 63/616,573 filed Dec. 30, 2023. The entire disclosure of Ser. No. 63/616,573 is incorporated herein by reference.

This application is also a continuation-in-part of co-pending and commonly assigned U.S. nonprovisional patent application Ser. No. 18/344,578 filed Jun. 29, 2023. Ser. No. 18/344,578 is a continuation of commonly-assigned U.S. nonprovisional patent application Ser. No. 17/127,425 filed Dec. 18, 2020 (U.S. Pat. No. 11,692,408). Ser. No. 17/127,425 is a continuation of commonly-assigned U.S. nonprovisional patent application Ser. No. 16/677,428 filed Nov. 7, 2019 (U.S. Pat. No. 10,907,435). Ser. No. 16/677,428 is a continuation of commonly-assigned U.S. nonprovisional patent application Ser. No. 16/221,279 filed Dec. 14, 2018 (U.S. Pat. No. 10,550,659). Ser. No. 16/221,279 claims the benefit of, and priority to, commonly-assigned U.S. provisional patent application Ser. No. 62/649,008 filed Mar. 28, 2018 (now expired). The entire disclosures of Ser. No. 18/344,578, 17/127,425, 16/677,428, 16/221,279 and 62/649,008 are also hereby incorporated herein by reference.

FIELD OF THE DISCLOSURE

This disclosure relates to the field of fluid connections, including without limitation hydraulic fracturing connections and pressure control devices used in subterranean drilling. More specifically, the disclosure relates to such fluid connections having remotely operable locking mechanisms whereby personnel may be moved away from such wells during connection and disconnection of the device. More specifically, this disclosure relates to such fluid connections capable of providing larger diameter seals at higher working pressures.

BACKGROUND

Conventionally, wellhead connections to pressure control equipment are typically made by either a hand union or hammer union. Wellhead operators engaging or disengaging these conventional types of wellhead connections place themselves in danger of injury. The pressure control equipment to be connected to the wellhead is typically heavy, and remains suspended above the wellhead operator via use of a crane. Interacting with the crane operator, a technician at the wellhead below must struggle with the suspended load as it is lowered in order to achieve the proper entry angle into the wellhead to make a secure connection. The wellhead operator must then connect the wellhead to the pressure control equipment, typically via a bolted flanged connection. The bolts must be tightened manually by a person at the wellhead, typically via a "knock wrench" struck with a sledgehammer in order to get the bolts sufficiently tight to withstand the internal operating pressure. During this whole process, as noted, the operator is in physical danger of injuries, such as collision with the suspended pressure control equipment load, or pinched or crushed fingers and hands when securing the connection.

Wellhead operators are exposed to similar risks of injury during conventional removal of the pressure control equipment from the wellhead. The removal process is substantially the reverse of the engagement process described in the previous paragraph.

Existing fluid connections have addressed the foregoing need in the well services industry to connect and disconnect pressure control equipment from the wellhead in a safe environment while minimizing the physical danger to human resources in the vicinity. Applicant's devices such as disclosed in U.S. Pat. Nos. 9,644,443 and 9,670,745 are examples of such existing fluid connections. FIGS. 1A and 1B in this disclosure illustrate examples of such existing fluid connections, and are based upon FIG. 2 in U.S. Pat. Nos. 9,644,443 and 9,670,745.

Embodiments of the fluid connections described in U.S. Pat. Nos. 9,644,443 and 9,670,745 may be rated up to 15,000 psi MAWP (maximum allowable working pressure), with diameters ranging from about 2" to about 7" ID. In practice, however, even though serviceable, embodiments rated over about 10,000 psi MAWP in over about 5" ID have proven difficult to manufacture with consistent performance. Additionally, 10,000 psi MAWP in 5" ID is generally recognized as a satisfactory service rating in wellhead pressure control applications.

Hydraulic fracturing has become an increasingly important technique used in the extraction of hydrocarbons from subterranean formations. Fluid connections are needed in hydraulic fracturing in order, for example, to facilitate flow of fracturing fluid into and out of wells via a wellhead. However, the fracturing process often calls for hydraulic fluid pressures and flow rates exceeding those typically seen in conventional wellhead pressure control applications. In some applications, hydraulic fracturing may call for 15,000 psi MAWP pressures in wellheads up to 8" ID. This in turn translates into a requirement for fluid connections that are rated for such correspondingly higher hydraulic pressures and wellhead diameters. A need exists for a fluid connection design that is capable of consistently retaining higher pressures in larger diameter wellheads, in order to accommodate higher fluid flows at such fluid pressures. At the same time, such a fluid connection design should also be remotely operable in order to address personnel safety considerations near wellheads as described above.

SUMMARY AND TECHNICAL ADVANTAGES

These and other needs in the prior art are addressed by a remotely-operated fluid connection and seal whose designs gain advantage in some embodiments from internal operational working pressure (e.g. ambient well pressure) to tighten the connection and seal against leakage.

This disclosure describes and illustrates multiple embodiments of a fluid connection assembly. According to some disclosed and illustrated embodiments, a fluid connection assembly comprises a fluid connection adapter and a fluid connection housing assembly. The fluid connection adapter is received into a fluid connection housing assembly in an "open" position. The fluid connection housing assembly provides a plurality of locking elements rotating about pivot pins. A locking element actuating section on the fluid connection adapter engages locking element rocking faces on the locking elements as the fluid connection assembly enters the fluid connection housing assembly. Engagement of the locking element rocking faces causes the locking elements to rotate, in turn causing locking element inner surfaces to contact a tapered lock engagement surface on the fluid connection adapter. In some embodiments, the fluid connection adapter's entry into the fluid connection housing assembly is stopped as a rib on the fluid connection adapter abuts housing notches within the fluid connection housing assembly. At this point, at least a first seal section on the fluid connection adapter sealingly contacts a first seal bore within the fluid connection housing assembly.

A locking ring is then brought onto the locking elements. A locking ring inner surface contacts locking element outer surfaces. Progressive engagement of the locking ring inner surface on the locking element outer surfaces causes the locking elements to constrict radially about the fluid connection adapter. Constriction of the locking elements urges the locking element inner surfaces to tighten against the tapered lock engagement surface on the fluid connection adapter. At this point, the fluid connection assembly is in the "closed" position.

Internal working pressure may then be introduced into the "closed" fluid connection assembly. For example, such internal working pressure may be from ambient well pressure in pressure and flow communication with the fluid connection assembly. Responsive to such internal pressure, the rib on the fluid connection adapter displaces from abutment with the housing notches on the fluid connection housing assembly, urging the tapered lock engagement surface on the fluid connection adapter even tighter onto the locking element inner surfaces, and urging the locking element outer surfaces even tighter onto the locking ring inner surface. At this point, the fluid connection assembly is in the "closed and locked" position. The presence of internal pressure further urges the first seal section on the fluid connection adapter to expand radially to make tighter contact with the first seal bore (within the fluid connection housing assembly), thereby enhancing the seal formed therebetween.

Alternative disclosed embodiments strengthen the first seal section on the fluid connection adapter with a high strength sleeve. Additional disclosed embodiments provide a quick test fitting and port to control fluid pressure in between at least the first seal section and the first seal bore.

According to other described and illustrated embodiments set forth in this disclosure, a fluid connection assembly comprises a fluid connection adapter and a fluid connection housing assembly. The fluid connection housing assembly is preferably movable, and is received in an "open position" onto a preferably stationary fluid connection adapter. The fluid connection housing assembly provides a plurality of wedges rotating about wedge pins. A locking ring is brought onto the wedges. A locking ring inner surface contacts wedge outer surfaces. Progressive engagement of the locking ring inner surface on the wedge outer surfaces causes the wedges to constrict radially about the fluid connection adapter. Constriction of the wedges urges the wedge inner surfaces to tighten against a tapered wedge engagement surface on the fluid connection adapter.

Internal working pressure may then be introduced into the "closed" fluid connection assembly. For example, such internal working pressure may be from ambient well pressure to which the fluid connection adapter is connected. The internal pressure urges the wedges and the tapered wedge engagement surface even tighter together. The presence of internal pressure further causes seal sections on the fluid connection adapter to expand radially and longitudinally. These expanding seal sections make tighter contact with corresponding seal sections on a seal insert on the fluid connection housing assembly, thereby enhancing the seal formed therebetween.

It is therefore a technical advantage of some disclosed fluid connection assembly embodiments to hold higher internal pressures in larger diameters than currently available from existing pressure seals. The disclosed fluid connection designs gain advantage from the internal work pressure to provide improved seal performance.

A further technical advantage of some disclosed fluid connection assembly embodiments is that, in currently preferred embodiments, the fluid connection adapter forms its pressure seal with the fluid connection housing assembly "deeper" or "further into" the fluid connection housing assembly than with other known connections. More specifically, the sealing contact between first seal section (on the fluid connection adapter) and first seal bore (on the fluid connection housing assembly) is located further away from the entry point into the fluid connection housing assembly than has typically been seen in other known connections. This "deeper connection" feature enhances the robustness of the seal, and gives the disclosed fluid connection assembly a greater capacity to retain high pressures in high flow/high volume service applications such as hydraulic fracturing. It is known in fracturing operations that the part corresponding to the fluid connection adapter may be exposed to high loads (bending, torsion, compression) as fracturing fluid piping is connected thereto. These loads may be even higher in deployments where coil tubing apparatus, for example, is also planned to be connected to the part corresponding to the fluid connection adapter. Provision of sealing contact "deeper" into the fluid connection housing assembly, as in embodiments of the disclosed fluid connection assembly, mitigates the effect of such high loads to stress or weaken the seal contact.

A further technical advantage of some disclosed fluid connection assembly embodiments is that its design favors robustness and dependability. Embodiments of the disclosed fluid connection assembly minimize moving parts and hydraulics in order to enhance robustness at high pressures in larger diameters.

A further technical advantage of some disclosed fluid assembly embodiments is that may be remotely operable. According to illustrated embodiments, the locking ring is brought onto the locking elements via retraction of an actuation assembly including a hydraulically-actuated piston. In some deployments, the piston may be actuated remotely. Remote actuation addresses the personnel safety concerns described in the Background section above.

A further technical advantage of some disclosed fluid connection assembly embodiments is that, in embodiments in which a high strength sleeve is provided, the high strength sleeve strengthens and may provide wear protection to seal sections on the fluid connection adapter.

A further technical advantage of some disclosed fluid connection assembly embodiments is that, in embodiments in which a quick test fitting is provided, a hand pump can conveniently deliver high pressure fluid to a portion of the pressure connection, especially when such portion is sealed between two sets of sealing rings. Such sealing rings may be o-rings in some embodiments, for example, although throughout this disclosure, the term "sealing ring", wherever used, is not limited to any type of suitable seal that may deployed as a sealing ring. It will be appreciated that the sealing rings may limit or impede high pressure fluid flow into or out of the portion of the pressure connection between the two sets of sealing rings. Embodiments of this disclosure provide a quick test port into the flow-limited portion of the pressure connection between seal sections and seal bores. A hand pump may then be used to deliver fluid to a quick test fitting allowing flow through the quick test port to the flow-limited portion. This allows the pressure integrity of the seals provided by the sealing rings to be tested prior to applying high fluid pressures from an operational pressure source (such as a well). In other applications, the quick test port may be used to equalize pressure in the flow-limited portion of the pressure connection during service engagement and disengagement of the fluid connection assembly.

A further technical advantage of some disclosed fluid connection assembly embodiments is that, in embodiments, the fluid connection adapter is configured to be stationary and the fluid connection housing assembly is configured to be movable. As a result, in embodiments, the fluid connection adapter may be deployed on a wellhead and the fluid connection may be moved to be received onto the stationary fluid connection adapter. Embodiments of the disclosed fluid connection assembly are designed to make the stationary fluid connection adapter as uncomplicated as possible, such as a machined metal cylinder attached to a flange. Conversely, embodiments are designed to deploy as much of the assembly's engineering complexity and functionality as is feasible onto the movable fluid connection housing assembly. Cost economies thus become available. Sites having multiple wellheads may deploy a fluid connection adapter on each wellhead, which, as noted, is a relatively simple uncomplicated and inexpensive component. A single fluid connection housing assembly can then serve all of the fluid connection adapters.

A further technical advantage arises in embodiments where the fluid connection adapter is configured to be stationary and the fluid connection housing assembly is configured to be movable. Where a quick test system is provided in such embodiments, the quick test system is engineered to reside entirely on the fluid connection housing assembly. No portion of the quick test system in such embodiments resides on the fluid connection adapter. This configuration allows for provision and maintenance of the entire quick test system on the movable fluid connection housing assembly, and, if desired, remote from the fluid connection adapter. As noted in the previous paragraph, embodiments of the disclosed fluid connection assembly are designed to make the stationary fluid connection adapter as uncomplicated as possible, such as a machined metal cylinder attached to a flange. Conversely, embodiments are designed to deploy as much of the assembly's engineering complexity and functionality as is feasible onto the movable fluid connection housing assembly.

A further technical advantage arises in embodiments where the quick test system is engineered to reside entirely on the fluid connection housing assembly (refer previous paragraph). Some embodiments may provide an additional monitoring port and passageway from an exterior of the fluid connection housing assembly into the flow-limited portion of the pressure connection between housing seal sections and adapter seal bores where "quick testing" is required. In this way, an external pressure monitor may determine whether the quick test system needs to be pressurized prior to introducing internal working pressure (e.g., ambient well pressure) into the fluid connection assembly. Alternatively, the external pressure monitor may determine whether the quick test system needs to be depressurized prior to disengaging the fluid connection housing assembly from the fluid connection adapter (preferably after internal working pressure has been removed and the fluid connection assembly has been unlocked).

A further technical advantage of some disclosed fluid connection assembly embodiments is that the assembly includes a hybrid fluid connection adapter. In embodiments, the fluid connection housing assembly forms a locking arrangement on one side of the fluid connection adapter and a sealing arrangement on the other side. The fluid connection adapter may thus be designed in shorter and more robust configurations. In embodiments described in this disclosure, the locking arrangement is disposed on the outside of the fluid connection adapter and the sealing arrangement on the inside. The overall scope of this disclosure is not limited in this regard, however.

A further technical advantage of some disclosed fluid connection assembly embodiments is the manner in which the fluid connection housing assembly takes up load, especially when the fluid connection housing assembly locks onto the fluid connection adapter. In embodiments, the fluid connection housing assembly provides wedge assemblies that affix directly to a flanged connector received into a housing frame. As a result, loads exerted on the components of the wedge assemblies during operation of the fluid connection assembly (such as during locking operations) are passed through to (and are potentially absorbed by) the flanged connector in the first instance (rather than the housing frame). The wedge assemblies and flanged connector thus suffer wear under load in the first instance (rather than the housing frame). This load distribution allows economical service of the wedge assemblies and the flanged connector, while at the same time allowing the housing frame to be designed as a more complex (and potentially expensive) component requiring less frequent service. Further, in embodiments, selected wedge assemblies affix to the flanged connector removably via wedge anchor fasteners, so that such fastened wedge assemblies may be unfastened from the flanged connector (and the fluid connection housing assembly) for service or replacement.

A further technical advantage of some disclosed fluid connection assembly embodiments arises from introduction of internal working pressure into the "closed" fluid connection assembly. As noted above, such internal working pressure may be from ambient well pressure to which the fluid connection adapter is connected, for example. Embodiments of the fluid connection housing assembly further comprises a flanged connector and a seal insert such that the seal insert is disposed to be received into the flanged connector. A longitudinal housing seal surface on the seal insert opposes a longitudinal flanged connector seal surface on the flanged connector when the seal insert is received into the flanged connector. The seal insert is disposed to expand longitudinally responsive to introduction of internal working pressure within the fluid connection adapter, causing the longitudinal housing seal surface to tighten against the longitudinal flanged connector seal surface. Tightening of the longitudinal housing seal surface against the longitudinal flanged connector seal surface acts to discourage internal working pressure from leaking out from between the seal insert and the flanged connector when the seal insert is received into the flanged connector. In embodiments, an elastomer seal ring (such as an o-ring seal) may be provided between the longitudinal housing seal surface and the longitudinal flanged connector seal surface in order to further seal the surfaces when internal working pressure causes the seal insert to expand longitudinally and tighten against the flanged connector.

A further technical advantage of some disclosed fluid connection assembly embodiments is the provision of a "locking tab" feature. The "locking tab" feature is designed to enhance safety when the fluid connection assembly is used operationally in the presence of an internal operating pressure from, for example, a wellhead. The "locking tab" feature includes a locking ring engagement rib on the locking ring and a corresponding wedge outer surface chamfer on at least one wedge. The wedge outer surface chamfers are configured to receive the locking ring engagement rib when the locking ring is fully engaged on the wedge outer surfaces. When an internal working pressure is introduced, the pressure acts to urge the wedge outer surfaces tighter onto the locking ring, which causes the wedge outer surface chamfers to hold the locking ring engagement rib in place, which in turn restrains the locking ring from displacement relative to the wedges. The interoperation of the locking ring engagement rib and the wedge outer surface chamfers is thus effective to guard against unintentional (or accidental) disengagement of the fluid connection housing assembly from the fluid connection adapter when an internal working pressure is present.

In accordance with a first aspect, therefore, this disclosure describes embodiments of a fluid connection assembly, comprising: a fluid connection adapter having first and second adapter ends, the fluid connection adapter providing a tapered adapter wedge engagement surface on an external surface of the fluid connection adapter, the fluid connection adapter further providing at least a first adapter seal surface on an internal surface of the fluid connection adapter; and a fluid connection housing assembly having first and second housing ends, the fluid connection housing assembly including a plurality of wedges and at least a first housing seal surface; wherein each wedge is disposed to constrict radially; wherein each wedge has a wedge inner surface; wherein entry of the second adapter end into the first housing end causes the first adapter seal surface to sealingly contact the first housing seal surface; wherein entry of the second adapter end into the first housing end also causes the wedge inner surfaces to engage the fluid connection adapter via the adapter wedge engagement surface; and wherein the first adapter seal surface is disposed to expand radially, such that when the first adapter seal surface expands radially the first adapter seal surface tightens sealing contact against the first housing seal surface.

In some embodiments according to the first aspect, the locking ring provides a locking ring engagement rib, and each wedge provides a wedge outer surface chamfer configured to receive the locking engagement ring rib; wherein, when the locking ring engagement rib is received by at least one wedge outer surface chamfer, introduction of internal pressure within the second adapter end restrains the locking ring from disengagement from each wedge outer surface.

In some embodiments according to the first aspect, the fluid connection housing assembly further comprises a flanged connector and a seal insert such that the seal insert is disposed to be received into the flanged connector, wherein the first housing seal surface is on an exterior of the seal insert, wherein a longitudinal housing seal surface on the seal insert opposes a longitudinal flanged connector seal surface on the flanged connector when the seal insert is received into the flanged connector; and the seal insert is disposed to expand longitudinally responsive to introduction of internal pressure within the second adapter end, causing the longitudinal housing seal surface to tighten against the longitudinal flanged connector seal surface.

In accordance with a second aspect, this disclosure describes embodiments of a fluid connection assembly, comprising: a fluid connection adapter having first and second adapter ends, the fluid connection adapter providing a tapered adapter wedge engagement surface on an external surface of the fluid connection adapter, the fluid connection adapter further providing at least a first adapter seal surface; and a fluid connection housing assembly having first and second housing ends, the fluid connection housing assembly including a plurality of wedges and at least a first housing seal surface; wherein each wedge is disposed to constrict radially; wherein each wedge has a wedge inner surface; wherein entry of the second adapter end into the first housing end causes the first adapter seal surface to sealingly contact the first housing seal surface; wherein entry of the second adapter end into the first housing end also causes the wedge inner surfaces to engage the fluid connection adapter via the adapter wedge engagement surface; wherein the first adapter seal surface is disposed to expand radially, such that when the first adapter seal surface expands radially the first adapter seal surface tightens sealing contact against the first housing seal surface; and wherein, when the fluid connection adapter is in ultimate stationary connection to a pressurized source of fluids, the fluid connection housing assembly is movable to be brought into fluid sealing engagement with the fluid connection adapter.

In accordance with a third aspect, this disclosure describes embodiments of a fluid connection assembly, comprising: a fluid connection adapter having first and second adapter ends, the fluid connection adapter providing a tapered adapter wedge engagement surface on an external surface of the fluid connection adapter, the fluid connection adapter further providing at least a first adapter seal surface; a fluid connection housing assembly having first and second housing ends, the fluid connection housing assembly including a plurality of wedge assemblies and at least a first housing seal surface; the fluid connection housing assembly further providing a flanged connector received into a housing frame, wherein the wedge assemblies are affixed to the flanged connector; wherein each wedge assembly includes a wedge such that each wedge is disposed to constrict radially; wherein each wedge has a wedge inner surface; wherein entry of the second adapter end into the first housing end causes the first adapter seal surface to sealingly contact the first housing seal surface; wherein entry of the second adapter end into the first housing end also causes the wedge inner surfaces to engage the fluid connection adapter via the adapter wedge engagement surface; and wherein the first adapter seal surface is disposed to expand radially, such that when the first adapter seal surface expands radially the first adapter seal surface tightens sealing contact against the first housing seal surface.

In some embodiments according to the third aspect, selected wedge assemblies affix to the flanged connection removably via wedge anchor fasteners.

In some embodiments according to the third aspect, the fluid connection housing assembly is movable to be brought into fluid sealing engagement with the fluid connection adapter when the fluid connection adapter is in ultimate stationary connection to a pressurized source of fluids.

In accordance with a fourth aspect, this disclosure describes embodiments of a fluid connection assembly, comprising: a fluid connection adapter having first and second adapter ends, the fluid connection adapter providing a tapered adapter wedge engagement surface on an external surface of the fluid connection adapter, the fluid connection adapter further providing at least a first adapter seal surface; and a fluid connection housing assembly having first and second housing ends, the fluid connection housing assembly including a plurality of wedges and at least a first housing seal surface, the fluid connection housing assembly further including a displaceable locking ring in which the locking ring provides a locking ring engagement rib; wherein each wedge is disposed to constrict radially; wherein each wedge has a wedge inner surface and a wedge outer surface;

wherein at least one wedge provides a wedge outer surface chamfer configured to receive the locking ring engagement rib; wherein entry of the second adapter end into the first housing end causes the first adapter seal surface to sealingly contact the first housing seal surface; wherein entry of the second adapter end into the first housing end also causes the wedge inner surfaces to engage the fluid connection adapter via the adapter wedge engagement surface; wherein displacement of the locking ring engages the wedge outer surfaces to urge the wedge inner surfaces to tighten against the adapter wedge engagement surface; wherein the first adapter seal surface is disposed to expand radially, such that when the first adapter seal surface expands radially the first adapter seal surface tightens sealing contact against the first housing seal surface; and wherein, when the locking ring engagement rib is received by at least one wedge outer surface chamfer, introduction of internal pressure within the second adapter end restrains the locking ring from disengagement from each wedge outer surface.

In some embodiments according to the fourth aspect, the fluid connection housing assembly is movable to be brought into fluid sealing engagement with the fluid connection adapter when the fluid connection adapter is in ultimate stationary connection to a pressurized source of fluids.

In some embodiments according to the fourth aspect, the fluid connection housing assembly further includes a flanged connector received into a housing frame, wherein the wedge assemblies are affixed to the flanged connector.

In some embodiments according to the fourth aspect, the fluid connection housing assembly further comprises a flanged connector and a seal insert such that the seal insert is disposed to be received into the flanged connector, wherein the first housing seal surface is on an exterior of the seal insert, wherein a longitudinal housing seal surface on the seal insert opposes a longitudinal flanged connector seal surface on the flanged connector when the seal insert is received into the flanged connector; and the seal insert is disposed to expand longitudinally responsive to introduction of internal pressure within the second adapter end, causing the longitudinal housing seal surface to tighten against the longitudinal flanged connector seal surface.

In accordance with a fifth aspect, this disclosure describes embodiments of a fluid connection assembly, comprising: a fluid connection adapter having first and second adapter ends, the fluid connection adapter providing a tapered adapter wedge engagement surface on an external surface of the fluid connection adapter, the fluid connection adapter further providing at least a first adapter seal surface; and a fluid connection housing assembly having first and second housing ends, the fluid connection housing assembly including a plurality of wedges and at least a first housing seal surface, the fluid connection housing assembly further including a flanged connector and a seal insert such that the seal insert is disposed to be received into the flanged connector, wherein the first housing seal surface is on an exterior of the seal insert, wherein a longitudinal housing seal surface on the seal insert opposes a longitudinal flanged connector seal surface on the flanged connector when the seal insert is received into the flanged connector; wherein each wedge is disposed to constrict radially; wherein each wedge has a wedge inner surface; wherein entry of the second adapter end into the first housing end causes the first adapter seal surface to sealingly contact the first housing seal surface; wherein entry of the second adapter end into the first housing end also causes the wedge inner surfaces to engage the fluid connection adapter via the adapter wedge engagement surface; wherein the first adapter seal surface is disposed to expand radially, such that when the first adapter seal surface expands radially the first adapter seal surface tightens sealing contact against the first housing seal surface; and wherein the seal insert is disposed to expand longitudinally responsive to introduction of internal pressure within the second adapter end, causing the longitudinal housing seal surface to tighten against the longitudinal flanged connector seal surface.

In some embodiments according to the fifth aspect, the fluid connection housing assembly is movable to be brought into fluid sealing engagement with the fluid connection adapter when the fluid connection adapter is in ultimate stationary connection to a pressurized source of fluids.

In some embodiments according to the fifth aspect, the fluid connection housing assembly further includes a flanged connector received into a housing frame, wherein the wedge assemblies are affixed to the flanged connector.

In some embodiments according to the second, third fourth and fifth aspects, the first adapter seal surface is on an internal surface of the fluid connection adapter.

In some embodiments according to any of the first, second, third or fifth aspects, each wedge also has a wedge outer surface and in which the fluid connection housing assembly further includes a displaceable locking ring, wherein displacement of the locking ring engages the wedge outer surfaces to cause the wedge inner surfaces to engage the fluid connection adapter via the adapter wedge engagement surface. In some embodiments according to any of the first, second, third, fourth or fifth aspects, engagement of the locking ring on the wedge outer surfaces may urge the wedge inner surfaces to tighten against the adapter wedge engagement surface. The wedge inner surfaces may also be disposed to tighten against the adapter wedge engagement surface responsive to displacement of the second adapter end towards the first housing end once the locking ring engages the wedge outer surfaces. The first adapter seal surface may also be disposed to expand radially responsive to introduction of internal pressure within the second adapter end.

In some embodiments according to any of the first, second, third, fourth or fifth aspects, the fluid connection housing assembly further includes a second housing seal surface and a quick test passageway, wherein the second housing seal surface is also on an exterior of the seal insert, wherein the quick test passageway extends from a fluid connection housing assembly exterior through to a preselected location between the first housing seal surface and the second housing seal surface.

The foregoing has outlined rather broadly some of the features and technical advantages of the technology embodied in the disclosed fluid connection designs, in order that the detailed description that follows may be better understood. Additional features and advantages of the disclosed technology may be described. It should be appreciated by those skilled in the art that the conception and the specific embodiments disclosed may be readily utilized as a basis for modifying or designing other structures for carrying out the same inventive purposes of the disclosed technology, and that these equivalent constructions do not depart from the spirit and scope of the technology as described and as set forth in the appended claims.

BRIEF DESCRIPTION OF THE DRAWINGS

For a more complete understanding of embodiments described in detail below, and the advantages thereof, reference is now made to the following drawings, in which.

DETAILED DESCRIPTION

Figure 1A:
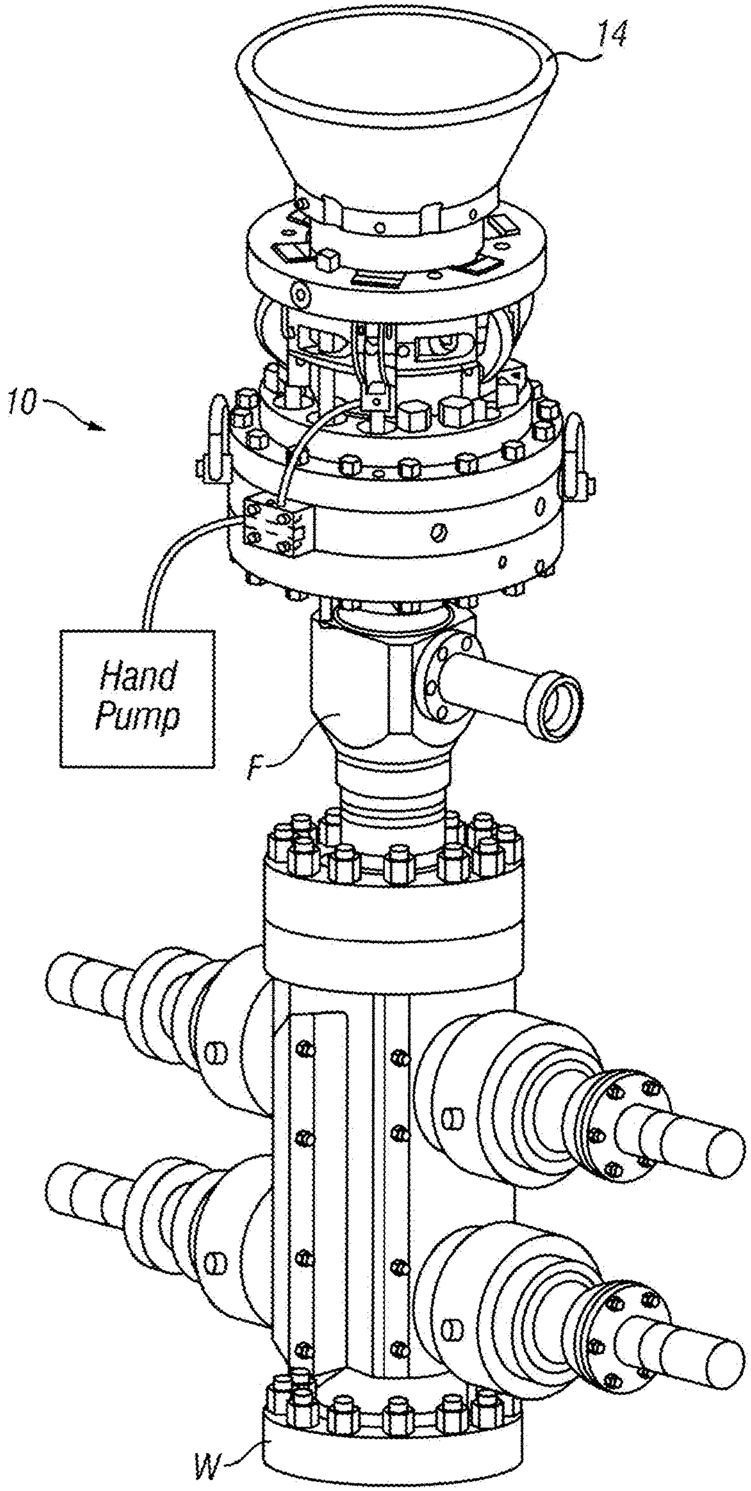
FIG. 1A (Prior Art)
FIGS. 1A and 1B depict a prior art fluid connection.
Figure 1B:
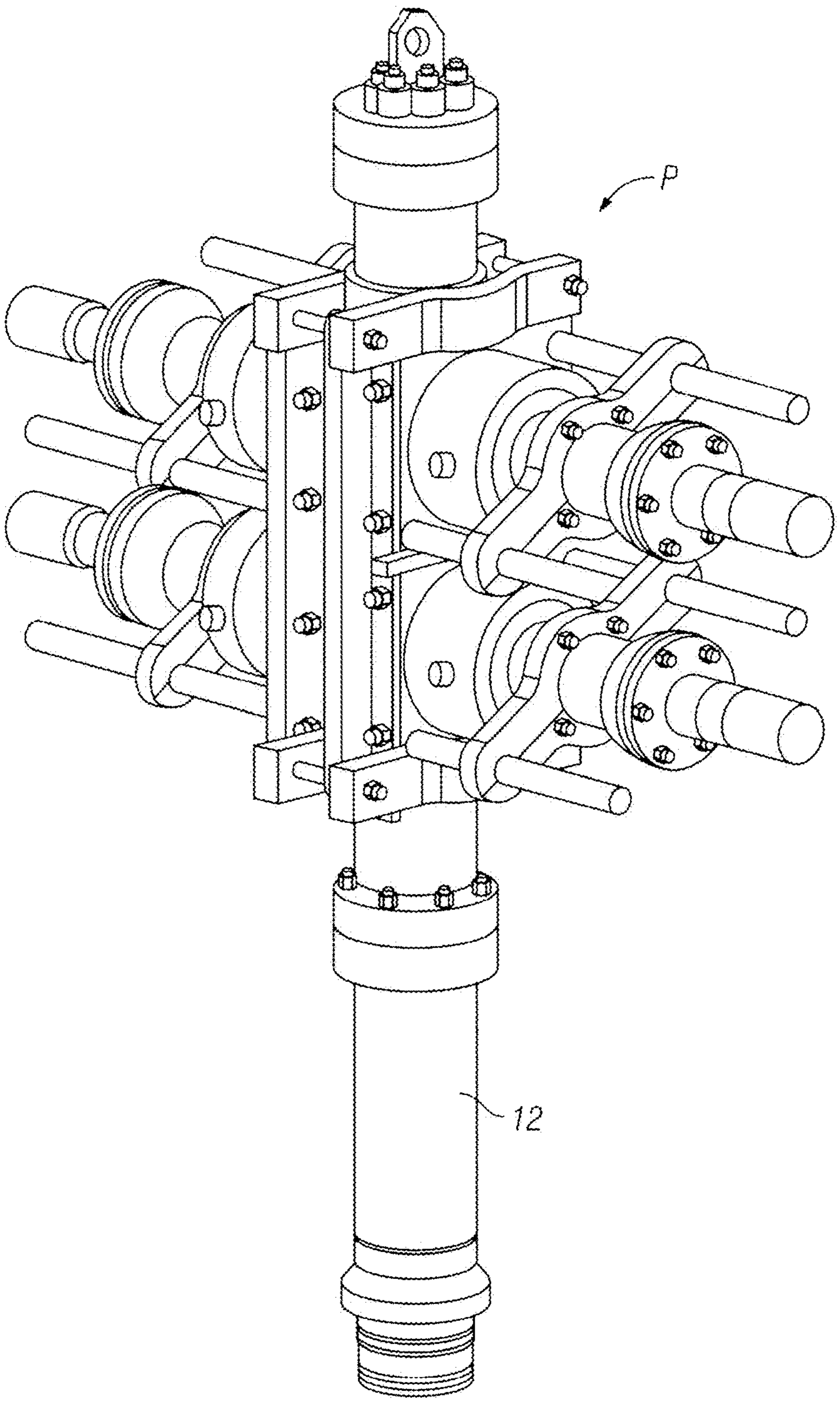
FIG. 1B (Prior Art)

Reference is now made to FIGS. 1A through 30 in describing embodiments of the disclosed fluid connections. For the purposes of the following disclosure, FIGS. 1A and 1B depict prior art devices. FIGS. 2 through 30 depict embodiments of new fluid connection designs. In particular, but without limitation to the full scope of this disclosure, FIGS. 2 through 17 depict a first embodiment of a fluid connection design in accordance with this disclosure and FIGS. 18 through 30 depict a second embodiment of a fluid connection design in accordance with this disclosure. As such, FIGS. 2 through 17 should be viewed together and FIGS. 18 through 30 should be viewed together. Any part, item, or feature that is identified by part number on one of FIGS. 1A through 30 will have the same part number when illustrated on another of FIGS. 1A through 30. It will be understood that the embodiments as illustrated and described with respect to FIGS. 2 through 17 and FIGS. 18 through 30 are exemplary, and the scope of this disclosure is not limited to such illustrated and described embodiments.

Figure 2:
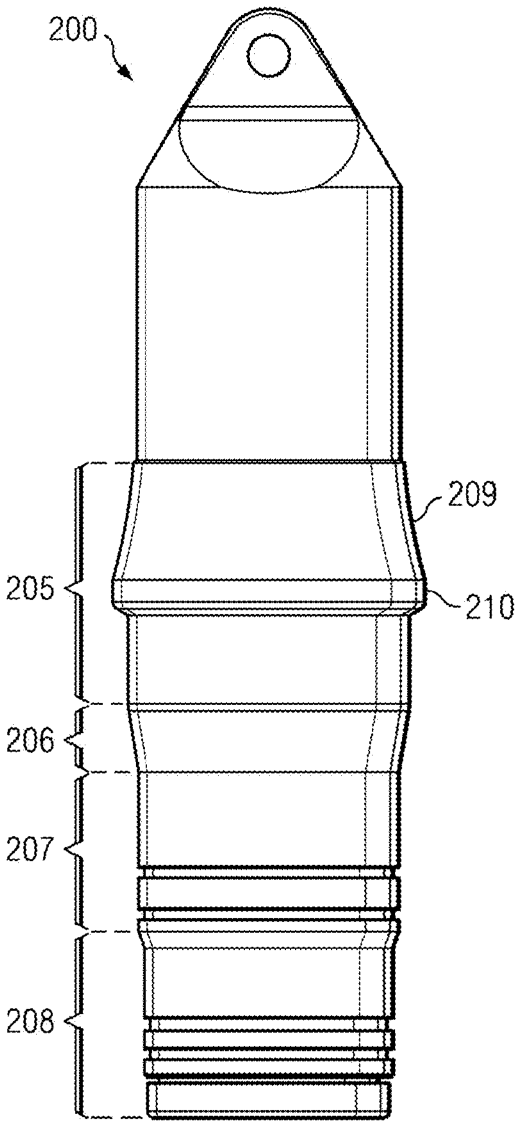
FIGS. 2, 3 and 4 depict exemplary fluid connection adapter embodiments 200, 200A and 200B respectively.

FIGS. 1A and 1B illustrate examples of existing fluid connections, and are based upon FIG. 2 in U.S. Pat. Nos. 9,644,443 and 9,670,745. FIGS. 1A and 1B should be viewed together. In FIGS. 1A and 1B, pressure control equipment ("PCE") is labeled generally as P, and wellhead is labeled generally as W. Pressure control assembly 10 is secured to wellhead W via a conventional bolted flange, although not limited in such regard. The wellhead end of pressure control assembly 10 advantageously provides a customized fitting F to connect to wellhead W. Adapter 12 is secured to PCE P via conventional threading, although not limited to a threaded connection between PCE P and adapter 12. In operation, adapter 12 enters pressure control assembly 10 via tulip 14. Adapter 12 and pressure control assembly 10 thereupon combine to form a fluid connection and seal according to the disclosure of U.S. Pat. Nos. 9,644,443 and 9,670,745.

Fluid Connection Designs According to a First Embodiment

Figure 5:
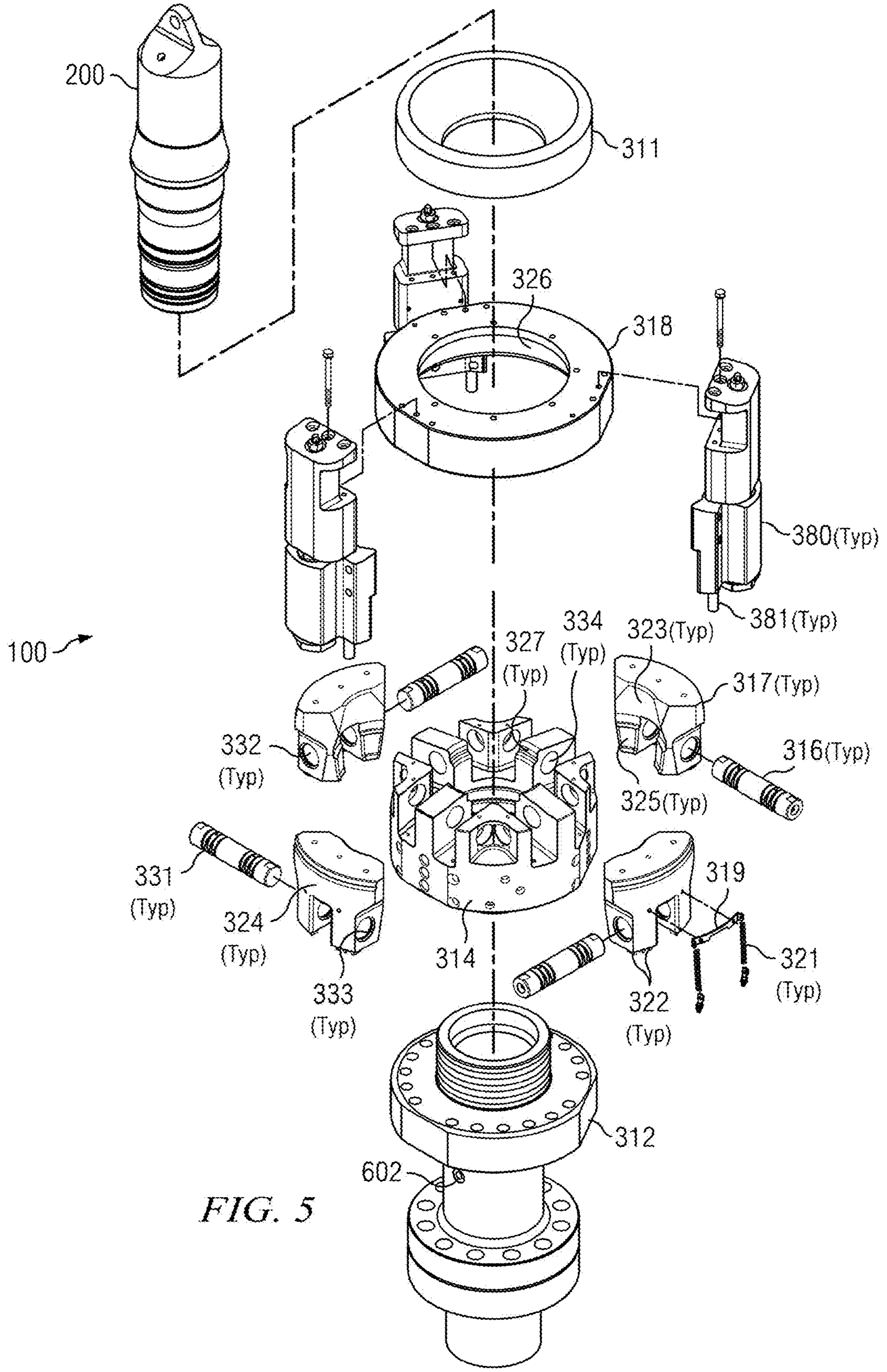
FIG. 5 is an exploded view of fluid connection assembly 100, in which fluid connection assembly 100 is a first embodiment thereof in accordance with this disclosure.
Figure 6:
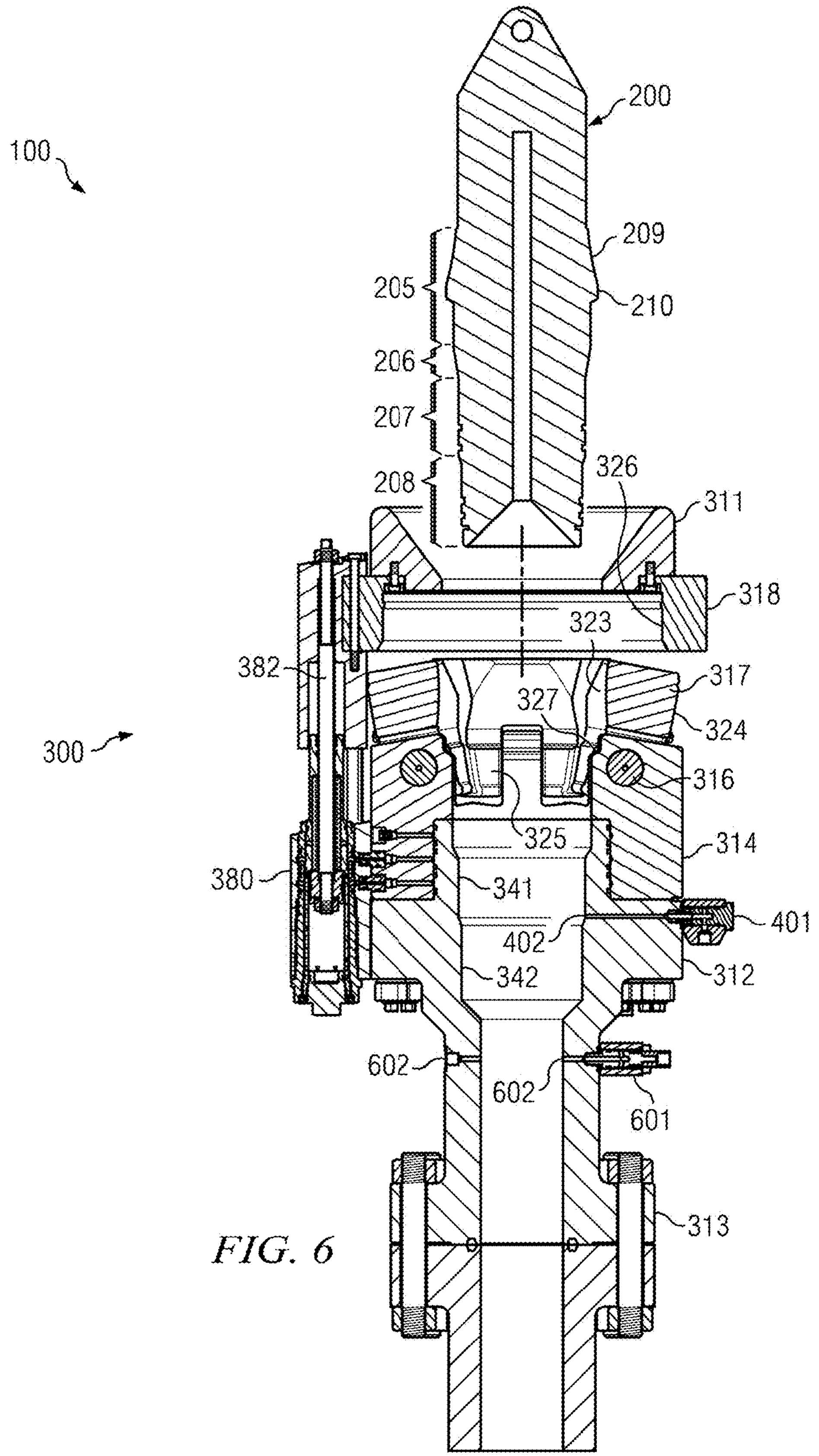
FIG. 6 is a section through fluid connection assembly 100 in an "open" position.

FIGS. 2, 5 and 6 should now be viewed together. FIGS. 2, 5 and 6 illustrate one embodiment of the remotely-operated fluid connection and seal technology described in this disclosure. Referring first to FIG. 6, fluid connection assembly 100 comprises fluid connection adapter 200 and fluid connection housing assembly 300. Fluid connection adapter 200 has first and second adapter ends, in which the first adapter end is blank (or closed off) and the second adapter end is configured to be inserted into fluid connection housing assembly 300. Fluid connection housing assembly 300 has first and second housing ends, in which the first housing end is configured to receive the second adapter end. Fluid connection housing assembly 300 may provide a wellhead adapter 312 with a flanged connection 313 at the second housing end to enable ultimate connection to a pressurized source of fluids (such as, for example, a well-head). Stated generally with reference to FIG. 6, fluid connection housing assembly 300 provides: (i) a retractable locking ring 318; (ii) a plurality of locking elements 317, and (iii) at least a first seal bore 341.

As noted, the embodiments illustrated on FIGS. 2, 5 and 6 include fluid connection adapter 200 having a blank (or closed off) first adapter end. As such, fluid connection adapter 200 is suitable for use as a nightcap, or when operators wish to close off a wellhead temporarily. Fluid connection adapter is not limited in its deployments.

Figure 3:
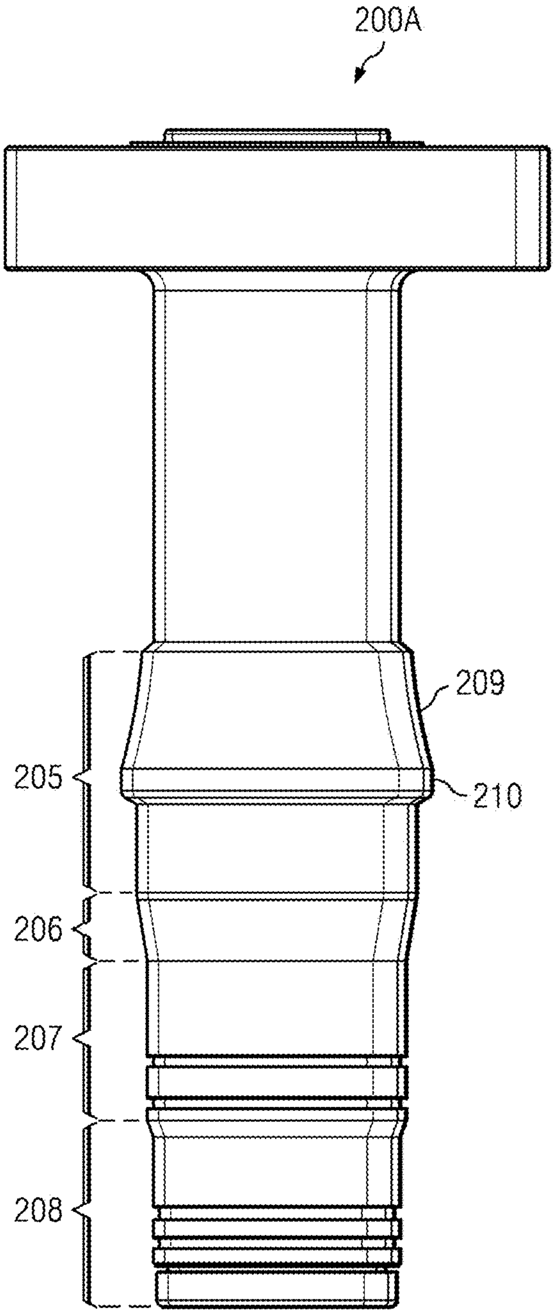
Figure 4:
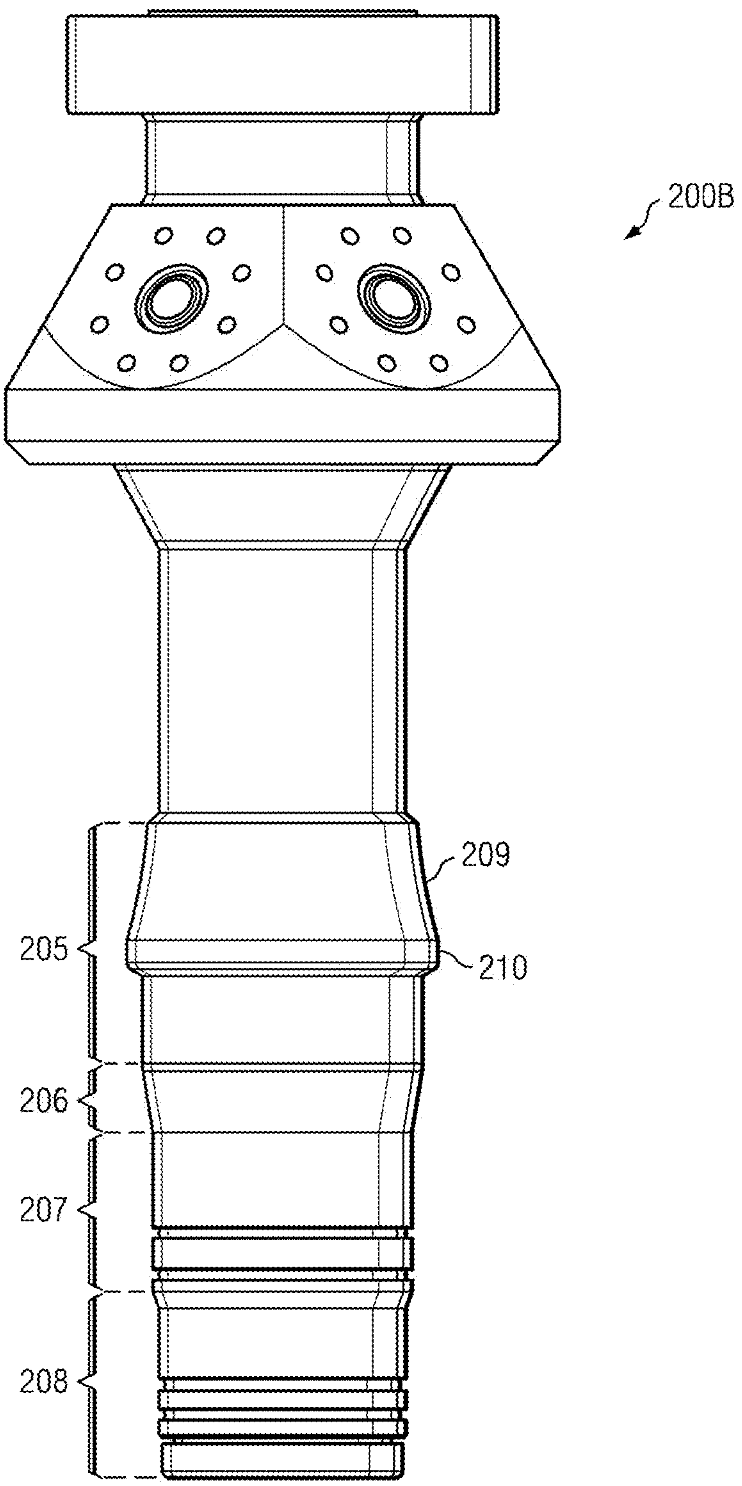

FIGS. 3 and 4 illustrate alternative embodiments to fluid connection adapter 200 on FIGS. 2, 5 and 6. For example, flanged fluid connection adapter 200A on FIG. 3 provides a flange at its first adapter end thereof for further connection to other equipment (such as pressure control equipment in wellhead pressure control applications. By way of further example, goat head fluid connection adapter 200B on FIG. 4 provides a "goat head"-style manifold at its first adapter end thereof for connection to multiple fracturing fluid lines during hydraulic fracturing service. The scope of this disclosure is not limited to the examples of FIGS. 2, 3 and 4.

It will nonetheless be noted from FIGS. 2, 3 and 4 that each of the illustrated alternative adapter embodiments 200, 200A, 200B each share a common configuration at their second adapter ends, to be described in more detail immediately below with reference to FIG. 2. In this way, and with reference now to FIG. 6, such common configuration allows alternative adapter embodiments 200, 200A, 200B to be interchangeable when inserted into fluid connection housing assembly 300.

With reference now to FIG. 2, fluid connection adapter 200 generally provides in order towards the second adapter end: (a) a tapered lock engagement surface 209, (b) a locking element actuating section 206, and (c) at least a first seal section 207. In more detail, fluid connection adapter 200 provides an enlarged outer diameter (OD) section 205. Enlarged OD section 205 includes tapered lock engagement surface 209 and rib 210. As will be described, enlarged OD section 205 acts as a positive stop to enable fluid connection adapter 200 to enter fluid connection housing assembly 300 to only a predetermined longitudinal position.

Fluid connection adapter 200 also provides locking element actuating section 206. Fluid connection adapter 200 further provides first and second seal sections 207, 208. Locking element actuating section 206 and first and second seal sections 207, 208 are described in more detail below with reference to interaction with cooperating parts within fluid connection housing assembly 300. However, it will be seen on FIG. 2 that first and second seal sections 207, 208 also preferably each provide one or more grooves in which sealing rings may be located, in order to further facilitate seals between cooperating machined surfaces. Sealing rings (such as o-rings, for example) have been omitted for clarity in this disclosure.

FIGS. 5 and 6 should now be viewed together. FIG. 5 is an exploded view and FIG. 6 is a section view of the illustrated embodiments of fluid connection assembly 100. FIG. 6 shows fluid connection assembly 100 in an "open" position. Fluid connection adapter 200 is described in detail above with reference to FIG. 2.

Fluid connection housing assembly 300 includes wellhead adapter 312 at a second housing end thereof, per earlier disclosure. Fluid connection housing 314 is connected to wellhead adapter 312 by a flange/bolted connection. In other embodiments (not illustrated), fluid connection housing 314 and wellhead adapter 312 may be integrally formed, or connected by a threaded connection, and the scope of the disclosure is not limited in this regard.

Wellhead adapter 312 provides first and second seal bores 341, 342 formed therein. First and second seal bores 341, 342 are shaped to receive and form seals with first and second seal sections 207, 208 respectively on fluid connection adapter 200. Note first and second seal bores 341, 342 and first and second seal sections 207, 208 may preferably further include sealing rings to enhance sealing. Such sealing rings (such as o-rings, for example) are omitted for clarity on FIGS. 5 and 6.

Fluid connection housing 314 provides housing notches 327. When fluid connection adapter 200 is received into fluid connection housing assembly 300, rib 210 on fluid connection adapter 200 eventually abuts housing notches 327, thereby limiting the travel of fluid connection adapter 200 into fluid connection housing assembly 300.

Figure 9:
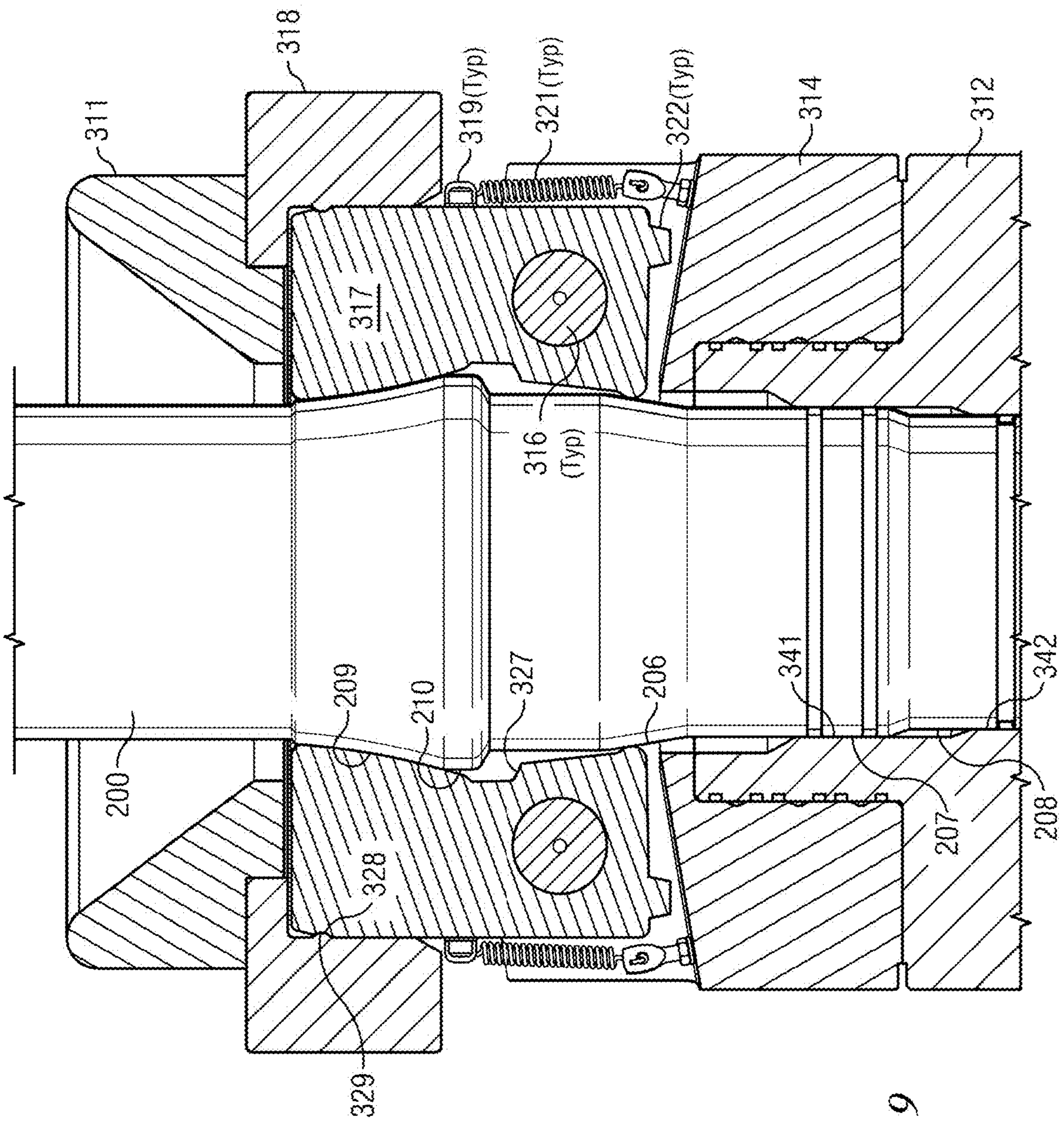
FIG. 9 is a partial section through fluid connection assembly 100 in a "closed and locked" position.

A plurality of locking elements 317 rotate within fluid connection housing 314. In the embodiments illustrated on FIGS. 5 and 6, four (4) locking elements 317 are provided. The scope of this disclosure is not limited to any specific number of locking elements 317 that may be provided in other embodiments. Stated generally, each locking element 317 is disposed to constrict radially via rotation about a corresponding pivot pin 316 provided in the fluid connection housing assembly 300. In more detail, locking elements 317 rotate about pivot pins 316 received into pin bores 332 on locking elements 317 and housing bores 334 on fluid connection housing 314. Pivot pins 316 preferably provide pin grooves 331 for sealing cooperation with pin rotation gaskets 333 deployed within pin bores 332 in locking elements 317. In the embodiments illustrated on FIGS. 5 and 6, rotation stops 322 on locking elements 317 limit rotation of locking elements 317 about pivot pins 316 to a user-selected angular displacement. In other embodiments (not illustrated), rotation stops 322 may not be provided. Locking elements 317 also have straps 319 rigidly affixed (e.g. via bolting) to the exterior thereof in illustrated embodiments. Referring now to FIG. 9, tension springs 321 connect locking elements 317 to fluid connection housing 314 via straps 319. Generally stated, spring bias ordains a default rotational position for locking elements 317 about their corresponding pivot pins 316. In more detail, tension springs 321 create spring bias to ordain and hold a default rotational position for locking elements 317 against rotation stops 322 in an "open" position. This disclosure is not limited to the manner in which such spring bias is created. Other non-illustrated embodiments may, for example, use torsion springs to create the spring bias. Alternatively, other non-illustrated embodiments may, for example, use hydraulic or pneumatic arrangements to create bias to hold locking elements 317 in a default position. Other non-illustrated embodiments may provide no bias holding locking elements 317 in a default position.

FIGS. 5 and 6 illustrate locking elements 317 having locking element inner and outer surfaces 323, 324. Locking elements 317 also have locking element rocking surfaces 325. Locking element rocking surfaces 325, and locking element inner and outer surfaces 323, 324 are all described in more detail below with reference to interaction with cooperating parts within fluid connection housing assembly 300.

Generally stated, at least one actuator assembly 380 energizes retraction of locking ring 318. In some embodiments, actuator assemblies 380 may be remotely operable. In more detail, at least one actuator assembly 380 is rigidly affixed (e.g. via bolting) to fluid connection housing 314. In the embodiments illustrated on FIGS. 5 and 6, three (3) circumferentially spaced-apart actuator assemblies 380 are provided. The scope of this disclosure is not limited to any specific number of actuator assemblies 380 that may be provided in other embodiments. Actuator assemblies 380 are also rigidly affixed (e.g. via bolting) to locking ring 318. In illustrated embodiments, actuator assemblies 380 are hydraulically-actuated piston assembles in which pistons 382 extend and retract locking ring 318 away from and towards locking elements 317. The scope of this disclosure is not limited, however, to any particular design of actuator assemblies 380. Actuator assemblies 380 further preferably provide guide rods 381 running parallel to the travel of pistons 382 to keep such piston travel rigid and straight under operational loads.

Locking ring 318 has locking ring inner surface 326. Locking ring inner surface 326 is described in more detail below with reference to interaction with cooperating parts within fluid connection housing assembly 300. Locking ring 318 is rigidly affixed (e.g. via bolting) to guide funnel 311. Guide funnel 311 assists directing fluid connection adapter 200 into fluid connection housing assembly 300.

FIG. 6 shows wellhead adapter 312 providing quick test fitting 401 received into quick test port 402, preferably by threaded engagement. It will be appreciated that although FIG. 6 illustrates an embodiment in which one quick test fitting and port 401, 402 are provided, the scope of this disclosure is not limited in this regard, and any number quick test ports 402 may be provided (or none at all). However, in most deployments only one will be in operation at any time. Quick test ports 402 that are not in operation may be sealed with threaded plugs for future use. One purpose of providing redundant quick test ports 402 is in case one or more become damaged during service, and have to be permanently sealed. In presently preferred embodiments, quick test ports 402 are preferably 3⁄16" in diameter, although the scope of this disclosure is not limited in this regard.

Generally stated, fluid connection housing assembly 300 further provides quick test port 402. Quick test port 402 comprises a fluid passageway from the exterior of fluid connection housing assembly 300 through to first seal bore 341, for example. In more detail, quick test fitting 401 and quick test port 402 provide a fluid passageway through wellhead adapter 312 into the space between first and second seal sections 207, 208 and first and second seal bores 341 and 342 when fluid connection adapter 200 is fully received into fluid connection housing assembly 300. Fluid may be introduced through quick test fitting 401 into the space between first and second seal sections 207, 208 and first and second seal bores 341 and 342 (via, for example, hand pumping). Pressure in the space between first and second seal sections 207, 208 and first and second seal bores 341 and 342 may thus be equalized (and in particular, pressure between sealing rings in such space may be equalized) after the introduction of operational high pressure fluid (e.g. from a well) into wellhead adapter 312.

Conversely, it will be appreciated that upon removal of operational pressure within wellhead adapter 312, the seals created between first and second seal sections 207, 208 and first and second seal bores 341 and 342 (and in particular, between sealing rings in such seals) may not immediately release by themselves. Quick test fitting 401 enables fluid trapped at pressure in the space between first and second seal sections 207, 208 and first and second seal bores 341 and 342 to be relieved. In other applications, fluid delivered through quick test fitting 401 enables the integrity of the seals created between first and second seal sections 207, 208 and first and second seal bores 341 and 342 (and in particular, between sealing rings in such seals) to be checked prior to introducing high pressure fluid into a connection between fluid connection adapter 200 and fluid connection housing assembly 300.

FIGS. 5 and 6 also illustrate transducer ports 602. It will be appreciated that although FIG. 6 illustrates an embodiment in which two transducer ports 602 are provided, the scope of this disclosure is not limited in this regard, and any number of transducer ports 602 may be provided (or none at all). It will be understood that various suitable equipment may be deployed into transducer ports 602, including (without limitation) pressure sensors/transducers to monitor internal pressure IP such as shown and described below with reference to FIG. 7D, for example. In illustrated embodiments (such as in FIG. 6, for example), needle valve 601 is deployed in one of transducer ports 602. In such embodiments, needle valve 601 may be used to drain/equalize pressure within wellhead adapter 312 during service operations when, for example, fluid connection adapter 200 is being removed and fluid connection housing assembly 300 is being exposed to atmospheric pressure. The scope of this disclosure is not limited to particular uses for transducer ports 602 or equipment deployed therein.

Figure 7A:
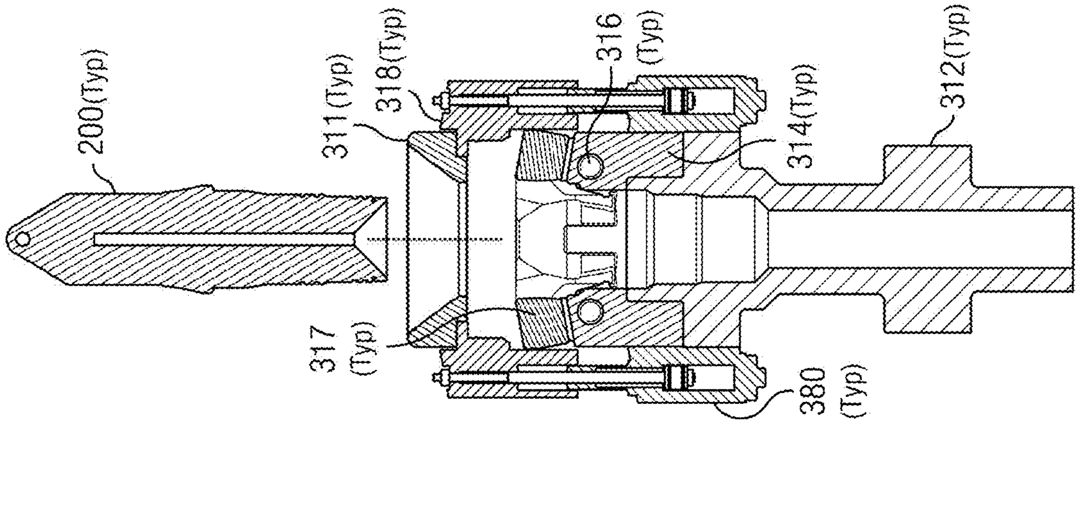
FIGS. 7A through 7D are sequential "freeze frame" views illustrating engagement of fluid connection assembly 100 to form a fluid connection and seal.
Figure 7B:
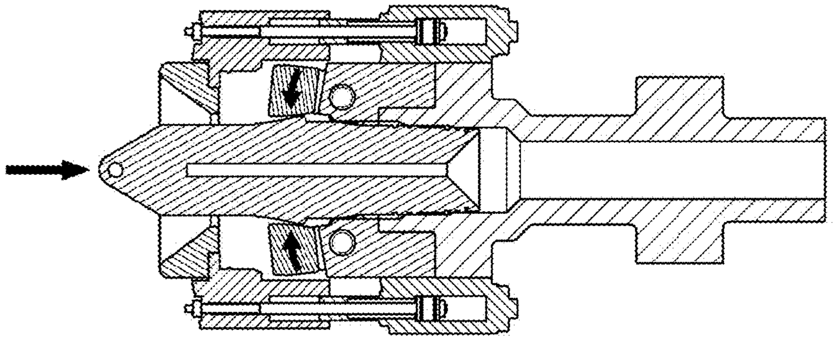
Figure 7C:
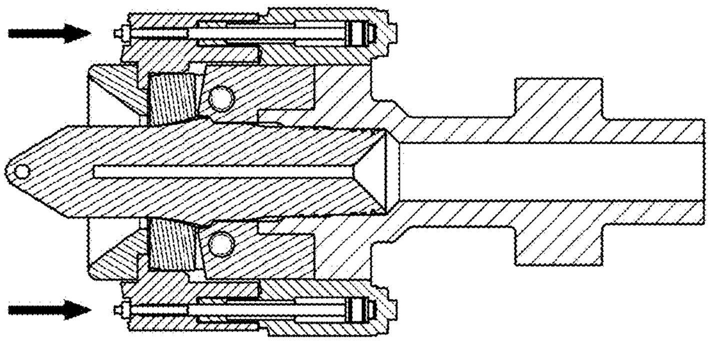
Figure 7D:
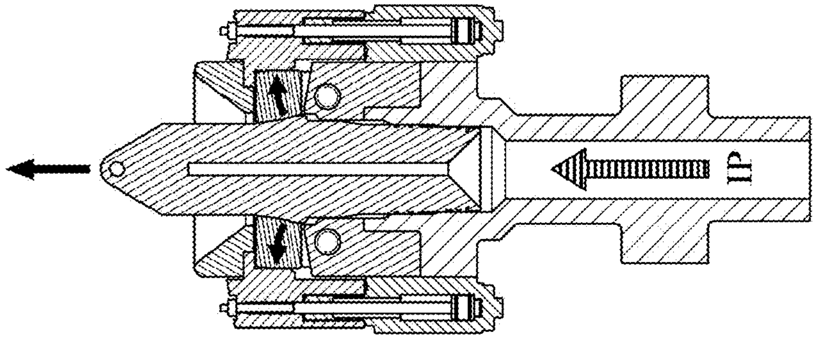
Figure 8C:
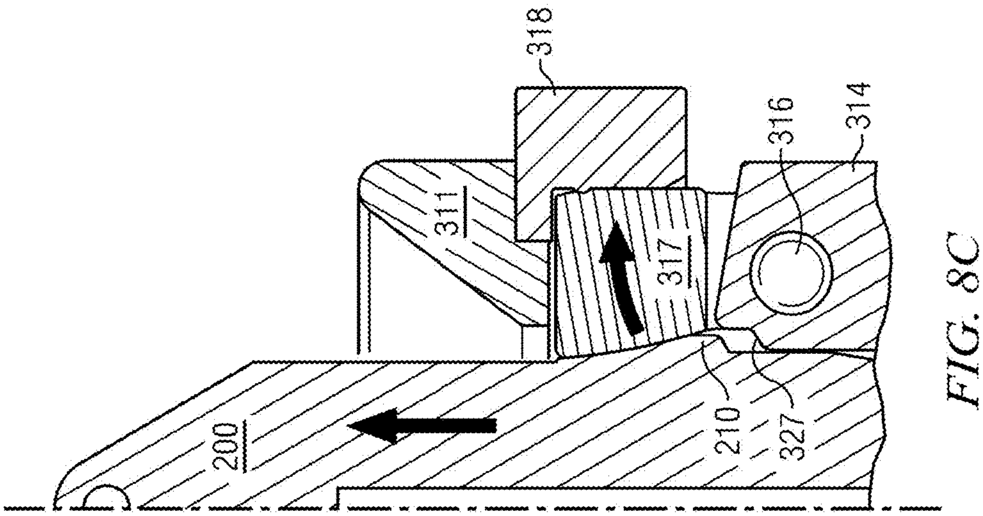
FIGS. 8A, 8B and 8C are additional, enlarged "freeze frame" views further illustrating engagement of fluid connection assembly 100 to form a fluid connection and seal.
Figure 8B:
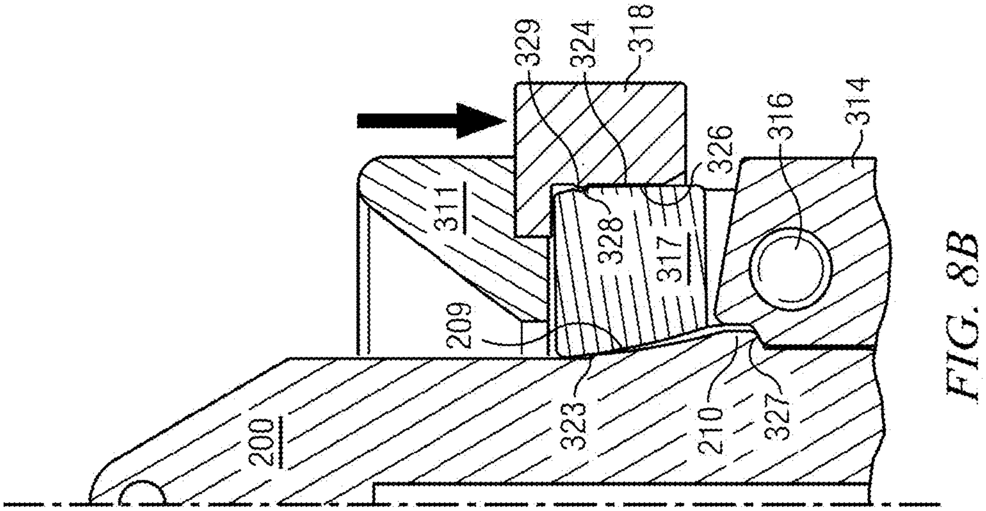
Figure 8A:
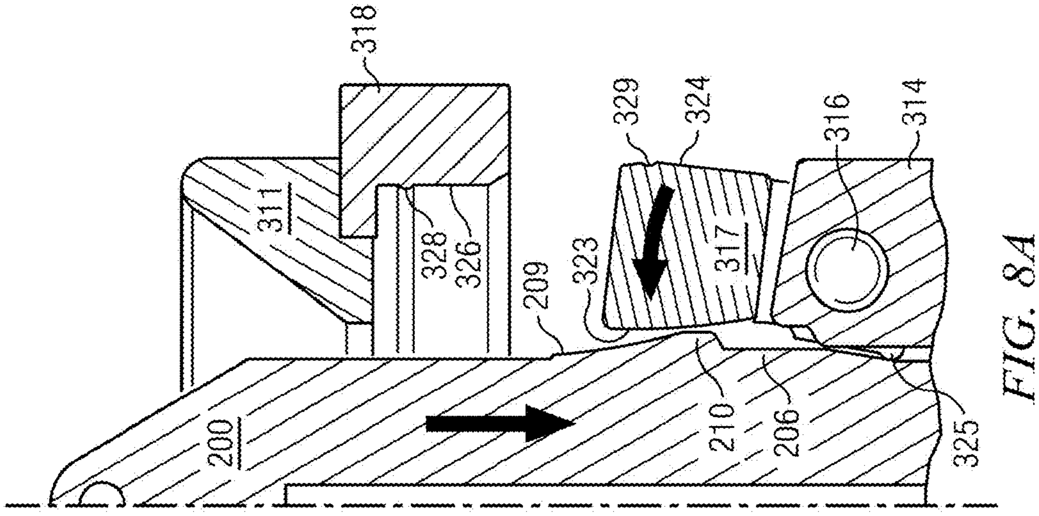

FIGS. 6, 7A through 7D, 8A through 8C, and 9 should now be viewed together for an understanding of the operation of embodiments of the disclosed remotely-operated fluid connection and seal technology. FIGS. 7A through 7D are sequential "freeze frame" views illustrating engagement of fluid connection assembly 100 to form a fluid connection and seal. FIGS. 8A, 8B and 8C are additional, enlarged "freeze frame" views further illustrating engagement of fluid connection assembly 100 to form a fluid connection and seal. FIG. 9 is a partial section through fluid connection assembly 100 in a "closed and locked" position. FIG. 7A is a simplified rendering of FIG. 6 depicting fluid connection assembly in an "open" position. FIG. 7D is a simplified rendering of FIG. 9 depicting fluid connection assembly 100 in a "closed and locked" position.

Referring first to FIG. 7A, the second adapter end of fluid connection adapter 200 enters the first housing end of the fluid connection housing assembly 300 through guide funnel 311 and past locking ring 318. Stated generally with reference to FIGS. 6, 7A and 7B, during entry of the second adapter end into the first housing end: (A) locking element actuating section 206 contacts locking element rocking surfaces 325, thereby causing locking elements 317 to rotate such that locking element inner surfaces 323 contact the tapered lock engagement surface 209; and (B) first seal section 207 sealingly contacts first seal bore 208. Transitioning from FIG. 7A to FIG. 7B in more detail, locking element actuating section 206 on fluid connection adapter makes contact with locking element rocking surfaces 325, causing locking elements 317 to "close" via rotation as shown on FIG. 7B, whereupon locking element inner surfaces 323 begin to engage enlarged OD section 205 on fluid connection adapter 200. FIG. 8A illustrates such "closing" of locking elements 317 in enlarged format. The rotation of locking elements 317 as shown on FIG. 7B also restrains fluid connection adapter 200 from unintended reverse longitudinal movement (i.e. from accidentally "exiting" fluid connection housing assembly 300).

Stated generally with reference to FIGS. 6, 7B and 7C, when locking ring 318 is retracted, progressive engagement of locking ring inner surface 326 on locking element outer surfaces 324 urges locking element inner surfaces 323 to tighten against tapered lock engagement surface 209. Transitioning now from FIG. 7B to FIG. 7C in more detail, fluid connection adapter 200 ends its travel into fluid connection housing assembly 300 as rib 210 abuts housing notches 327. Locking element inner surfaces 323 make full contact with tapered lock engagement surface 209 on fluid connection adapter 200. Actuator assemblies 380 retract to bring locking ring 318 onto locking elements 317. Retraction of actuator assemblies 380 causes locking ring inner surface 326 to make contact with locking element outer surfaces 324. Locking element outer surfaces 324 have a taper. Progressive engagement of locking ring inner surface 326 on locking element outer surfaces 324 causes locking elements 317 to constrict radially. As locking ring inner surface 326 tightens its contact with locking element outer surfaces 324, locking ring 318 urges locking element inner surfaces 323 tighter onto tapered lock engagement surface 209. Preferably, tapered lock engagement surface 209 has a taper selected to cooperate with locking element inner surfaces 323 such that a full tightening action and force translation is enabled as locking elements 317 constrict radially, while still allowing relatively easy disengagement in reverse when releasing fluid connection adapter 200 from fluid connection housing assembly 300. This disclosure is not limited to any specific cooperating tapers selected, and may include curved tapers as well as straight tapers. FIG. 8B illustrates in enlarged format the above-described movement of locking ring 318 onto locking elements 317 to place locking elements 317 into a "closed" position.

Additionally, as illustrated on FIG. 7C, when fluid connection adapter 200 ends its travel into fluid connection housing assembly 300: (1) first seal section 207 on fluid connection adapter 200 sealingly engages first seal bore 341 inside wellhead adapter 312, and (2) second seal section 208 on fluid connection adapter 200 sealingly engages second seal bore 342 also inside wellhead adapter 312.

Stated generally with reference to FIGS. 6, 7C and 7D, the locking element inner surfaces 323 are disposed to further tighten against the tapered lock engagement surface 209 responsive to displacement of the second adapter end towards the first housing end during engagement of the locking ring inner surface 326 on the locking element outer surfaces 324. Transitioning now from FIG. 7C to FIG. 7D in more detail, operational internal pressure IP is introduced inside fluid connection housing assembly 300. Well pressure may be the source of internal pressure IP, for example. Internal pressure IP displaces fluid connection adapter 200 into tighter restraint by locking elements 317. Specifically, responsive to internal pressure IP, rib 210 displaces from abutment with housing notches 327, urging tapered lock engagement surface 209 even tighter onto locking element inner surfaces 323, and urging locking element outer surfaces 324 even tighter onto locking ring inner surface 326.

FIG. 7D also depicts first seal section 207 still sealingly engaged with first seal bore 341, and second seal section 208 still sealingly engaged with second seal bore 342. It will be understood that when internal pressure IP displaces fluid connection adapter 200, first and second seal sections 207, 208 also slidingly displace within first and second seal bores 341, 342 but nonetheless maintain sealing contact and engagement. Further, with additional reference to FIG. 9, it will be understood that, generally stated, first seal section 207 is disposed to expand radially and further tighten sealing contact against first seal bore 341 responsive to introduction of internal pressure IP within the second adapter end. In more detail, the presence of internal pressure IP urges first and second seal sections 207, 208 to expand radially to make tighter contact with first and second seal bores 341, 342, thereby enhancing the seals formed therebetween. FIG. 8C illustrates in enlarged format the displacement of fluid connection adapter 200 into tighter restraint by locking elements 317 wherein locking elements 317 are now in a "closed and locked" position.

Disengagement of fluid connection adapter 200 from fluid connection housing assembly 300 is essentially the reverse operation of the one described immediately above with reference to FIGS. 7A through 7D. Internal pressure IP is removed. Actuator assemblies 380 extend, causing locking ring 318 to release locking elements 317 from radial constriction. Fluid connection adapter 200 may be removed. As enlarged OD section 205 on fluid connection adapter 200 withdraws, tapered lock engagement surface 209 and rib 210 cause locking elements 317 to rotate about pivot pins 316 back into an "open" position.

FIG. 9 is similar to FIGS. 7D and 8C, in that FIG. 9 also illustrates locking elements 317 in a "closed and locked" position. In FIG. 9, however, the illustrated embodiment depicts additional features, some of which may be considered optional in other embodiments. As described above with reference to FIGS. 5 and 6, FIG. 9 shows rotation stops 322 on locking elements 317 to limit rotation of locking elements 317 about pivot pins 316 to a user-selected angular displacement. As also described above with reference to FIGS. 5 and 6, FIG. 9 shows straps 319 and tension springs 321. Tension springs 321 create spring bias to ordain and hold a default rotational position for locking elements 317 against rotation stops 322 in an "open" position.

FIG. 9 further illustrates locking ring ridge 328 on locking ring 318 matched with locking element groove 329 on locking elements 317. Locking ring ridge 318 is preferably a geometrically inverted ridge shaped to fit within locking element groove 329. Locking ring ridge 328 cooperates with locking element groove 329 to provide an additional locking feature, strengthening the contact between locking ring inner surface 326 and locking element outer surfaces 324 against sliding displacement. Further, the additional locking feature provided by locking ring ridge 328 and locking element groove 329 may prevent inadvertent movement of locking ring 318 during operational service. Such inadvertent movement might arise by erroneous actuation of an actuator assembly 380 during operational service while the disclosed fluid connection is in the "closed and locked" position. The additional locking feature, although optional, may thereby enhance operational safety of the disclosed fluid connection when operational pressure is introduced.

Figure 10:
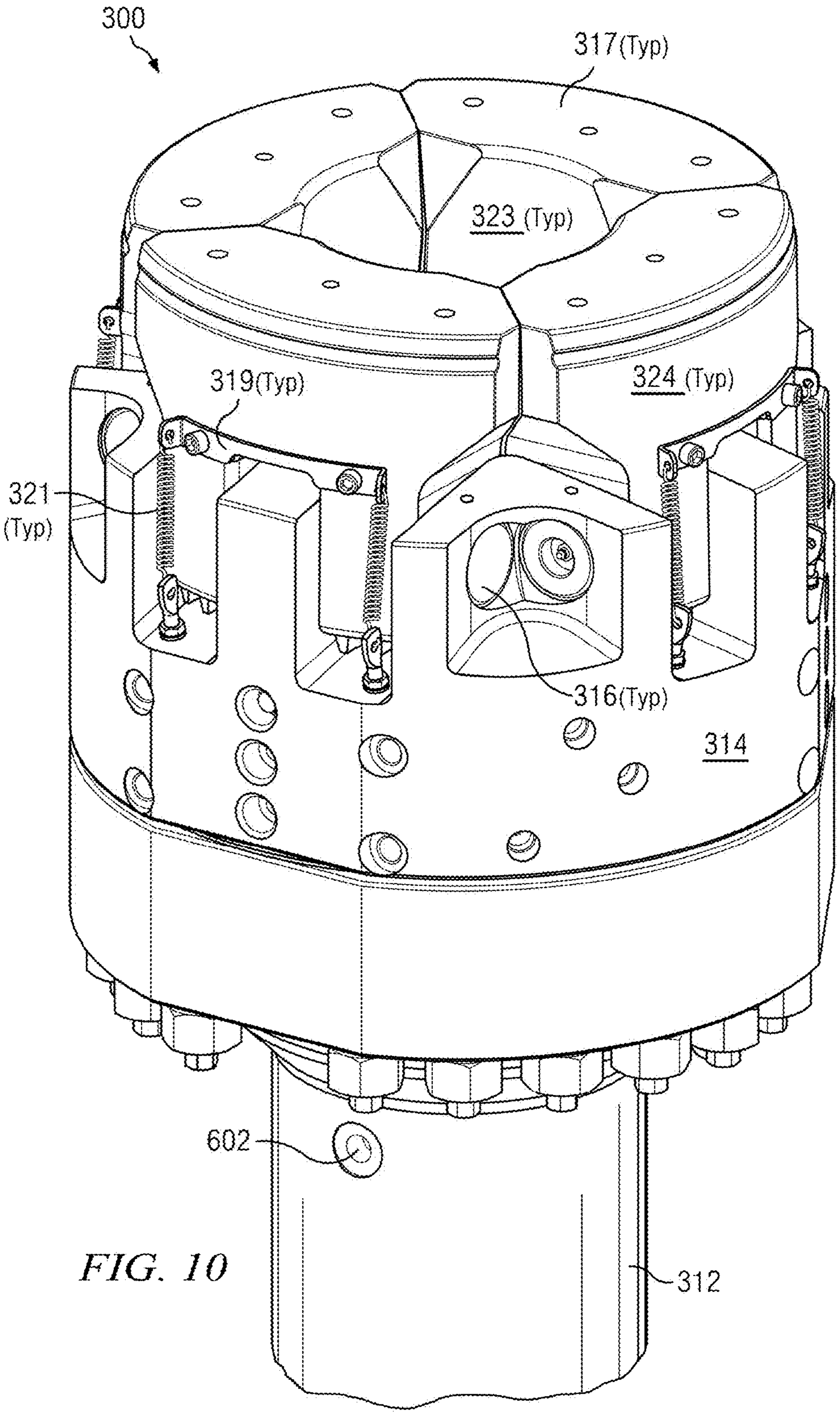
FIG. 10 is a general perspective view of fluid connection housing 300 in isolation, with actuator assemblies 380 and locking ring 318 removed to reveal locking elements 317.

FIG. 10 is a general perspective view of fluid connection housing 300, with actuator assemblies 380 and locking ring 318 removed to reveal locking elements 317. FIG. 10 also illustrates other features described above with reference to other Figures in this disclosure.

Figure 11:
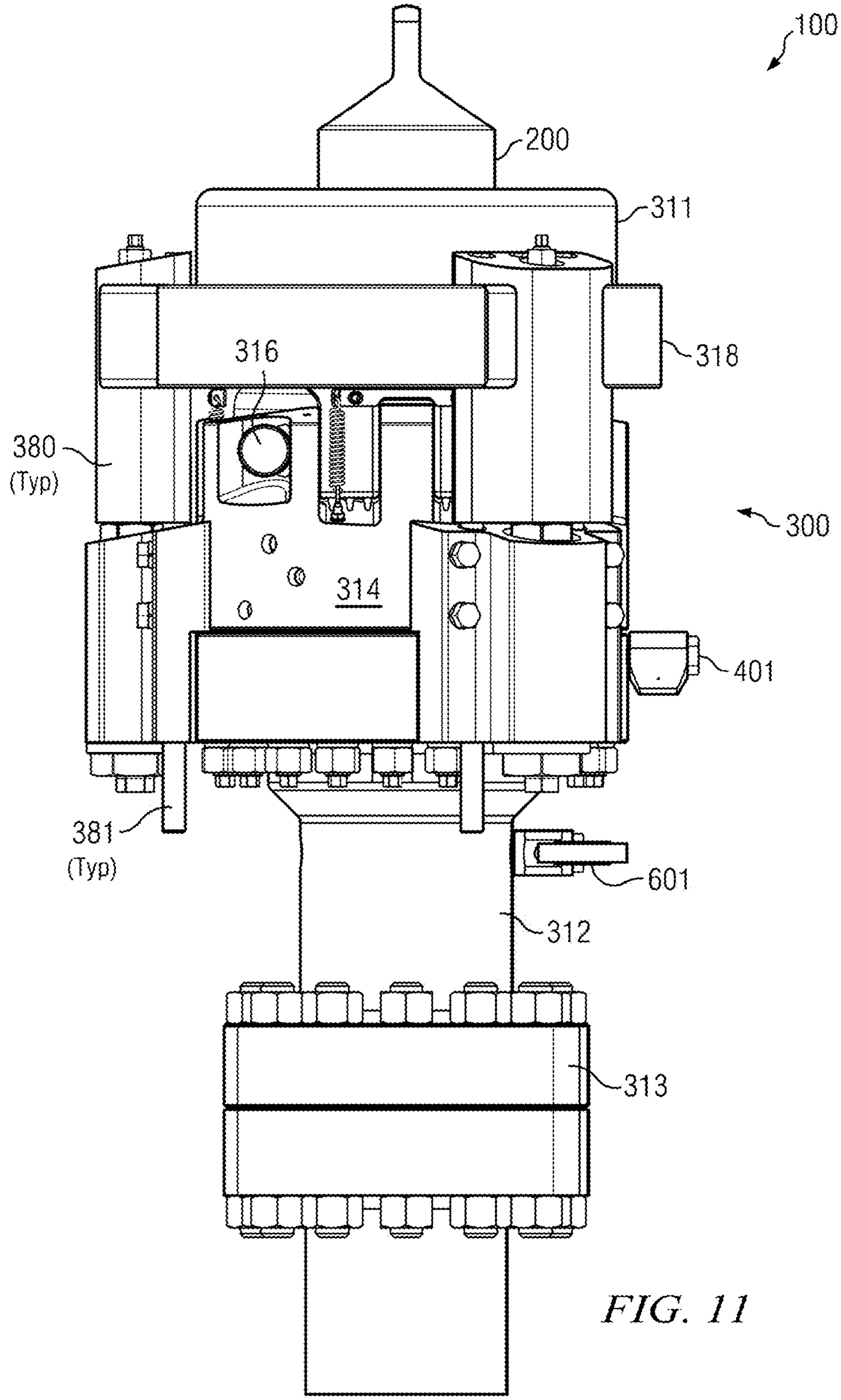
FIG. 11 is a general elevation view of fluid connection assembly 100.
Figure 12:
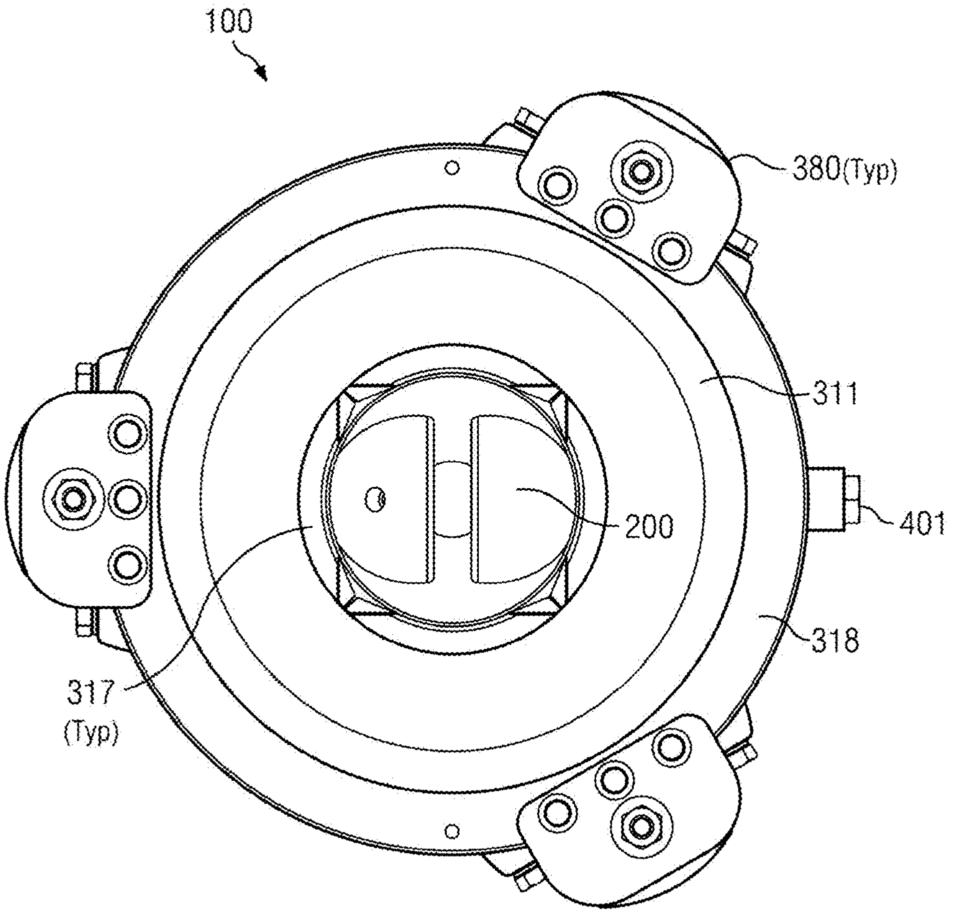
FIG. 12 is a general plan (or "top") view of fluid connection assembly 100.
Figure 13:
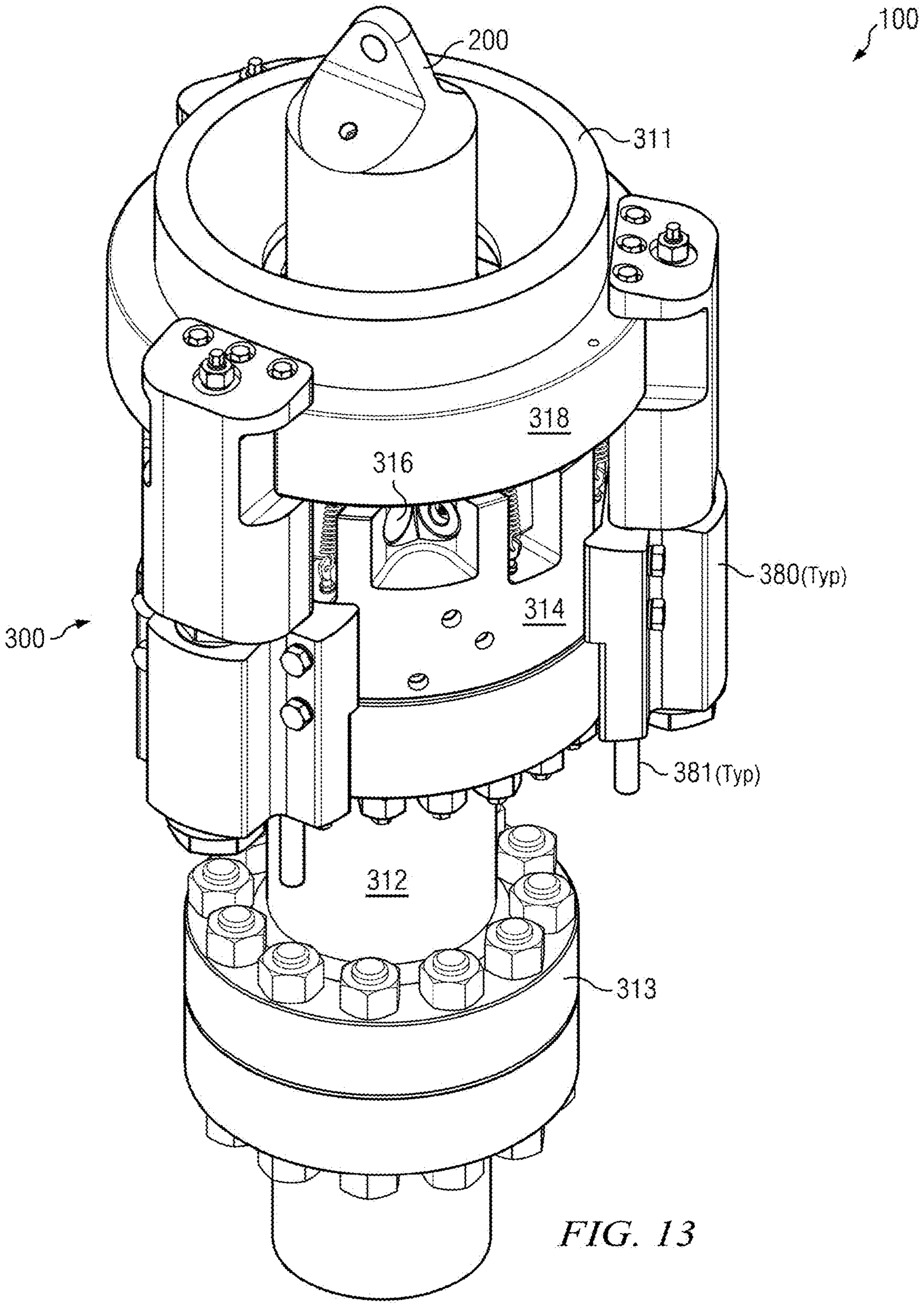
FIG. 13 is a general perspective view of fluid connection assembly 100.

FIGS. 11 through 13 show various views of fluid connection assembly 100.

FIG. 11 is a general elevation view of fluid connection assembly 100. FIG. 12 is a general plan (or "top") view of fluid connection assembly 100. FIG. 13 is a general perspective view of fluid connection assembly 100. FIGS. 11 through 13 illustrate features and aspects of fluid connection assembly 100 also described above with reference to other Figures in this disclosure. FIGS. 11 through 13 are intended to aid further understanding of such features and aspects by providing additional views.

Figure 14:
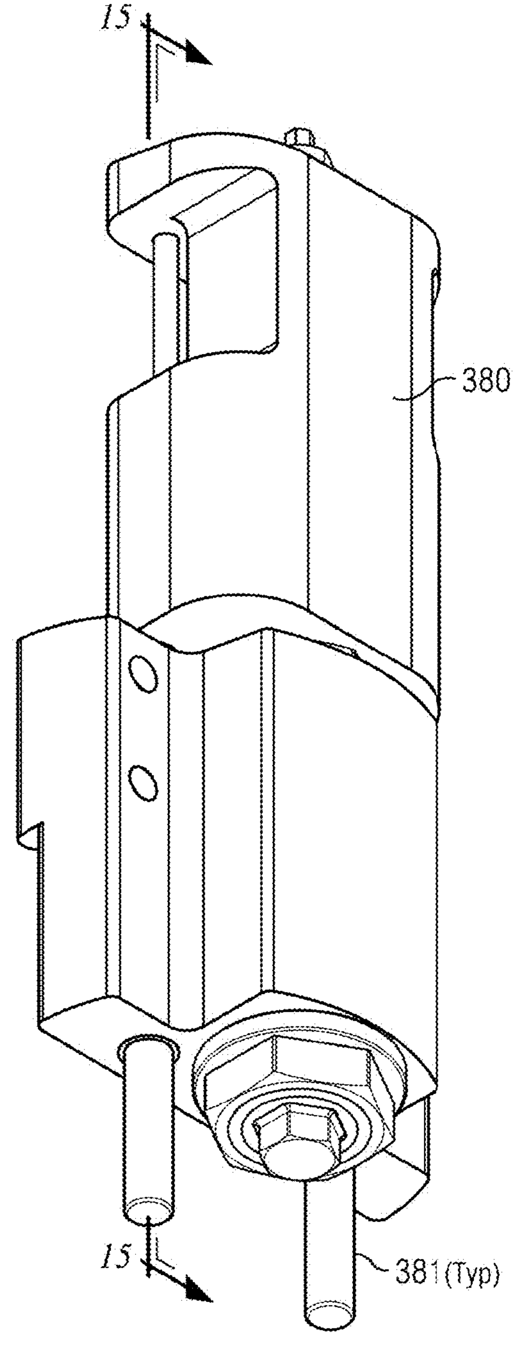
FIG. 14 illustrates one embodiment of an actuator assembly 380 in isolation.
Figure 15:
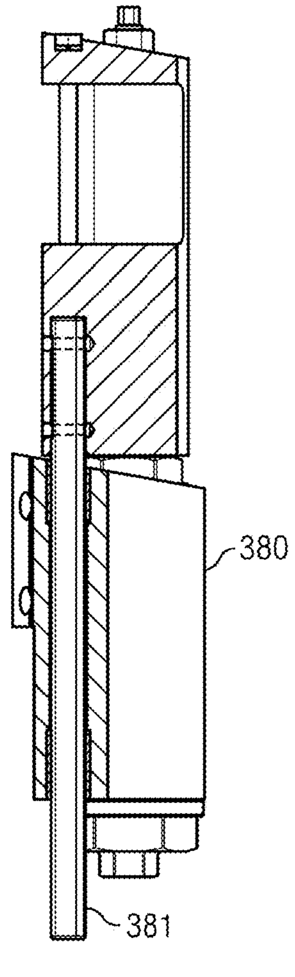
FIG. 15 is a section as shown on FIG. 14.

FIG. 14 illustrates one embodiment of an actuator assembly 380 in a fully retracted position, and FIG. 15 is a section as shown on FIG. 14. As noted in the description above with reference to FIGS. 5 and 6, actuator assemblies 380 may be hydraulically-actuated piston assembles in which pistons 382 extend and retract. Pistons 382 are hidden on FIGS. 14 and 15 in order to better view guide rods 381. As shown on FIGS. 14 and 15, guide rods 381 preferably run parallel to the travel of pistons 382 to keep such piston travel rigid and straight under operational loads. In illustrated embodiments, two (2) guide rods 381 are provided for each actuator assembly 380, although the scope of this disclosure is not limited in this regard.

Figure 16:
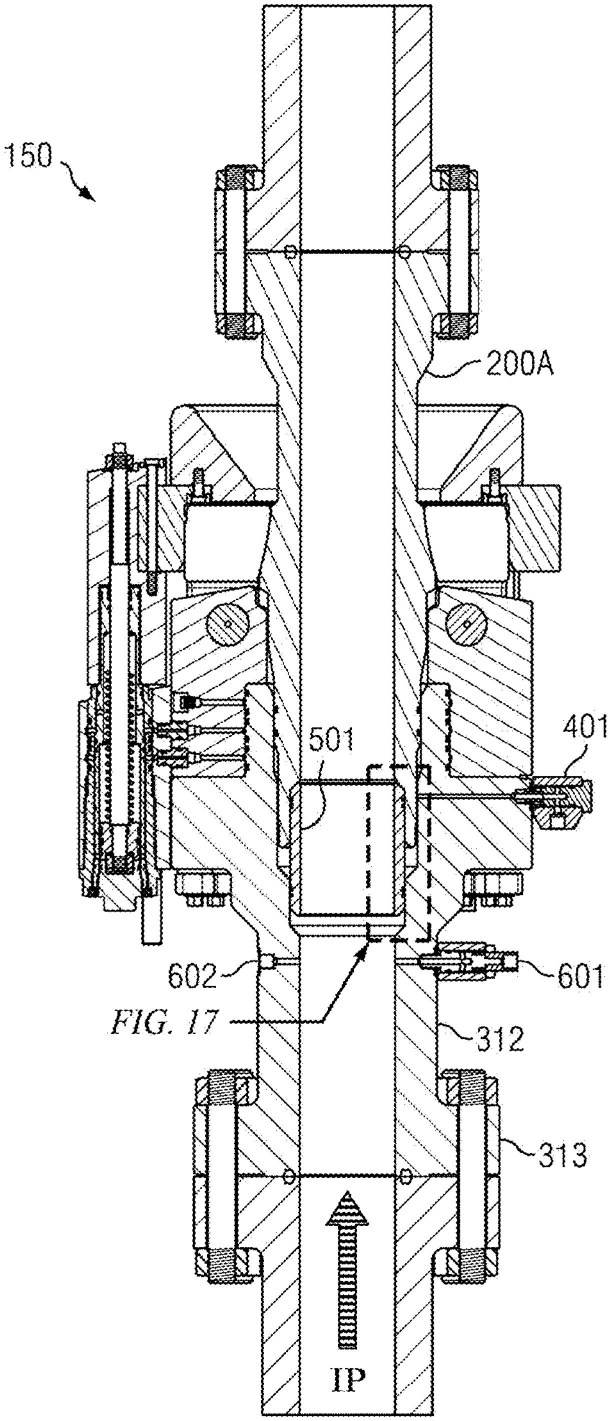
FIG. 16 is a section through high strength fluid connection assembly 150, in which high strength fluid connection assembly 150 is a second embodiment thereof in accordance with this disclosure.

FIG. 16 is a section view through high strength fluid connection assembly 150.

Figure 17:
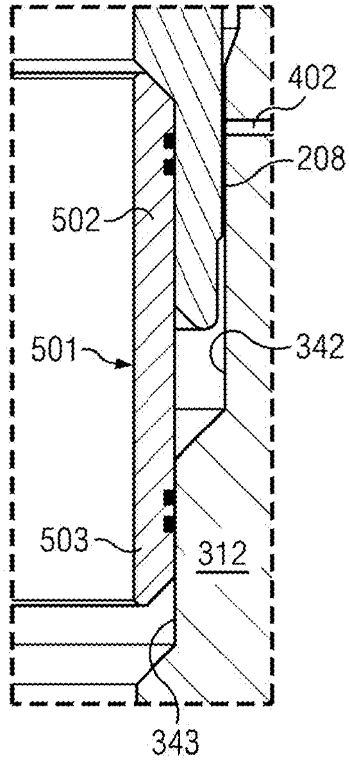
FIG. 17 is an enlargement as shown on FIG. 16.

FIG. 17 is an enlargement as shown on FIG. 16. High strength fluid connection assembly 150 presents additional embodiments. In contrast to previously-described embodiments, FIGS. 16 and 17 depict high strength fluid connection assembly 150 providing high strength sleeve 501.

It will be noted that the illustrated embodiments of FIG. 16 also include depiction of flanged fluid connection adapter 200A from FIG. 3. It will nonetheless be understood that the following description of high strength sleeve 501 is independent of the style of fluid connection adapter deployed. High strength sleeve 501 may be provided on any style of fluid connection adapter (including as depicted on FIGS. 2, 3 and 4) and the scope of this disclosure is not limited in this regard.

Generally stated, and as shown on FIGS. 16 and 17, the second adapter end further includes high strength sleeve 501, wherein high strength sleeve 501 provides wall thickness strengthening to a selected portion of the second adapter end. In more detail, high strength sleeve 501 strengthens the material on flanged fluid connection adapter 200A in the region of second seal section 208, and further provides a high strength sleeve extended portion 503 on the second adapter end that sealingly engages with high strength sleeve bore 343 provided in wellhead adapter 312. Advantageously, high strength sleeve 501 is made from a high strength metal such as titanium, although the scope of this disclosure is not limited to any particular material selection for high strength sleeve 501. FIG. 17 shows that the presence of high strength sleeve 501 is operative to reduce the effective internal diameter at which a seal is formed to coincide with high strength sleeve bore 343, either via direct contact between high strength sleeve 501 and high strength sleeve bore 343, or via contact between high strength sleeve 501 and second seal section 208.

It will be understood that in some embodiments, flanged fluid connection adapter 200A has a wall thickness that is thinnest at the second adapter end, in the region of second seal section 208. This thinning of wall thickness is inevitable given a geometry that requires (1) keeping external diameter towards the second adapter end small (to pass through locking elements 317 in the "open" position), and (2) keeping internal diameter large throughout so as not to affect internal flow or pressure. Especially at higher working pressures, it will be appreciated that when internal pressure IP on FIG. 16 urges second seal section 208 to expand radially onto second seal bore 342, the thinner wall thickness of flanged fluid connection adapter 200A in the regions of second seal section 208 may be susceptible to deformation or cracking, possibly leading to failure.

In other embodiments, such as illustrated on FIGS. 16 and 17, high strength sleeve 501 may be operative to act as a substitute "effective internal wall" of the second adapter end at the location where a pressure seal is formed. In this way, the internal diameter at which the seal is formed may be reduced (the seal now being formed on the exterior of the sleeve). The overall circumferential wall cross-sectional area at such reduced internal diameter is now also reduced (by virtue of a reduced diameter), thereby reducing the force exerted by internal pressure IP on the internal wall. Since the wall material itself in the sleeve is preferably high strength material, such as titanium, the wall thickness of high strength sleeve 501 may be thin to retain the force exerted by internal pressure IP.

Thus, as shown on FIGS. 16 and 17, high strength sleeve 501 is provided as an insert on the second adapter end of flanged fluid connection adapter 200A. In the illustrated embodiments, high strength sleeve 501 strengthens second seal section 208 by providing high strength sleeve insert portion 502 received into second seal section 208. In illustrated embodiments (to which the scope of this disclosure is not limited), high strength sleeve 501 further provides high strength sleeve extended portion 503 protruding from the second adapter end. As shown on FIG. 17, high strength sleeve extended portion 503 sealingly engages directly with high strength sleeve bore 343 provided within wellhead adapter 312.

It will be appreciated that the foregoing description of illustrated embodiments of high strength sleeve 501 are exemplary only. The scope of this disclosure contemplates embodiments in which a high strength insert or sleeve may be deployed as required to provide wall thickness strengthening to a selected portion of the second adapter end.

Further, in addition to providing strengthening, some embodiments of high strength sleeve 501 may also provide wear protection to the inside of second adapter end via wear coatings such as, for example, tungsten carbide coatings.

Fluid Connection Designs According to a Second Embodiment

Figure 18:
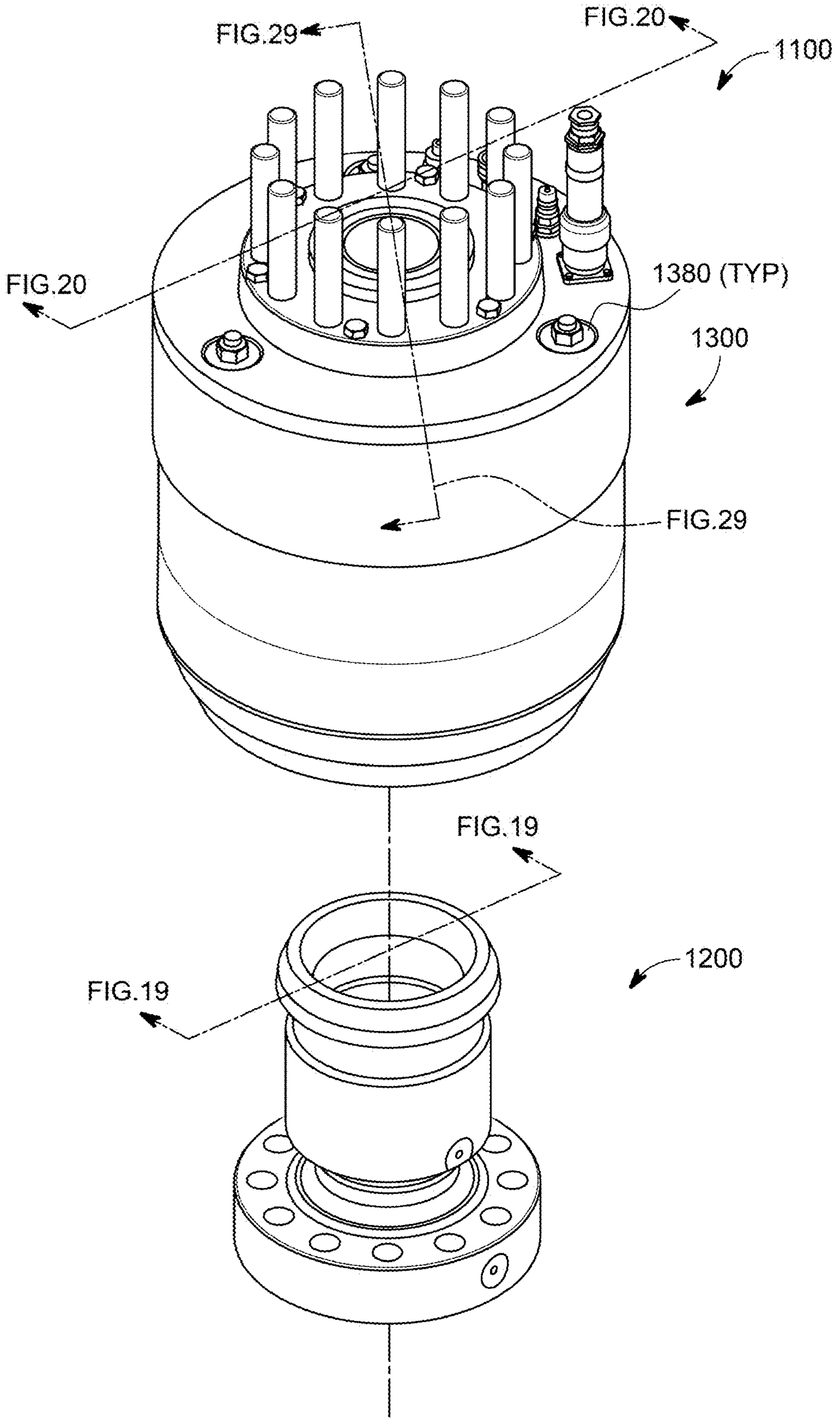
FIG. 18 is a general arrangement drawing depicting a fluid connection assembly 1100 including fluid connection adapter 1200 and fluid connection housing assembly 1300, in which fluid connection assembly 1100 is a second embodiment thereof in accordance with this disclosure.
Figure 19:
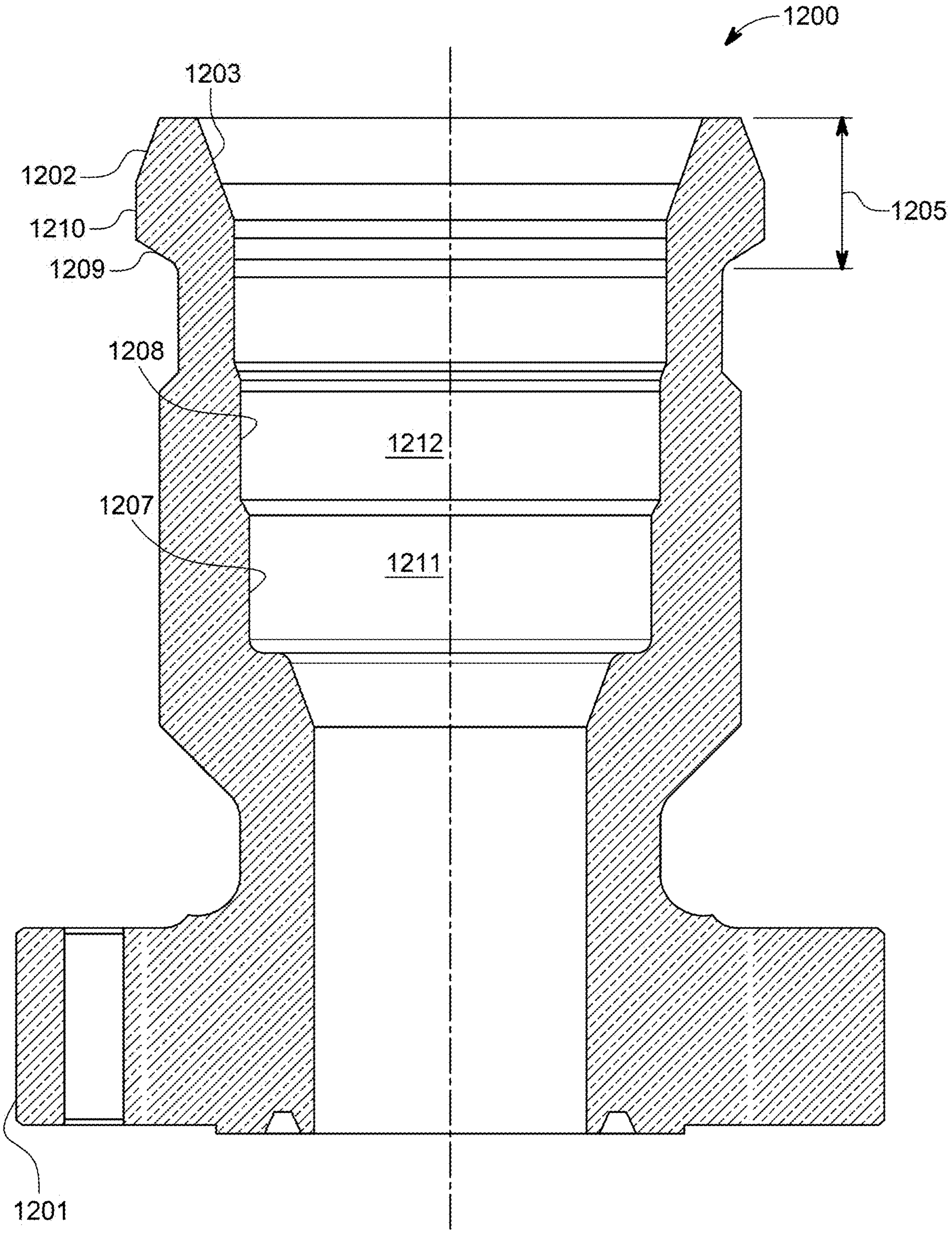
FIG. 19 is a section as shown on FIG. 18, depicting a section through an embodiment of fluid connection adapter 1200.
Figure 20:
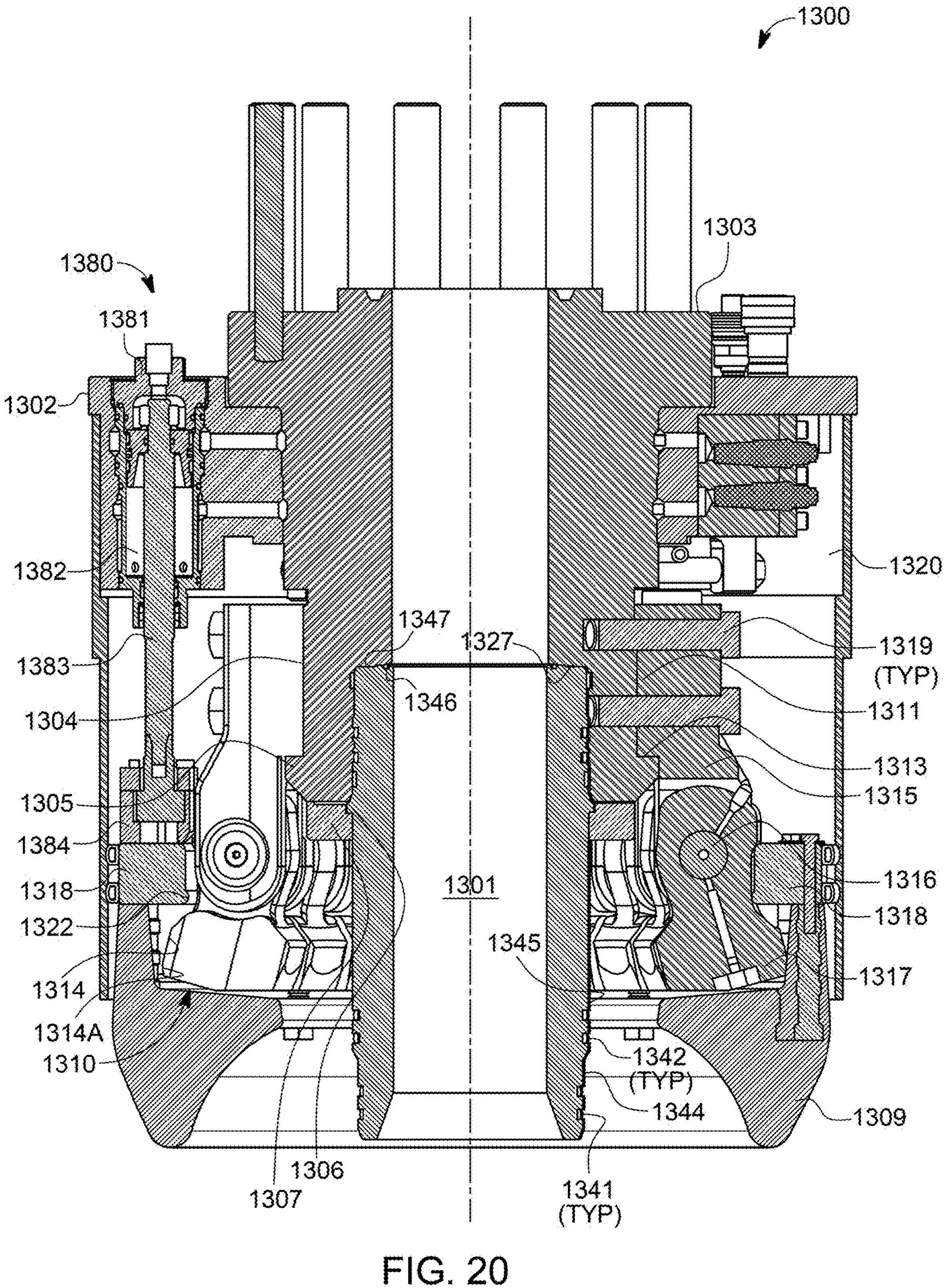
FIG. 20 is a section as shown on FIG. 18, depicting a section through an embodiment of fluid connection housing assembly 1300.

FIG. 18 depicts fluid connection assembly 1100 including fluid connection adapter 1200 and fluid connection housing assembly 1300. Referring now to FIG. 19 in conjunction with FIG. 18, fluid connection adapter 1200 has first and second adapter ends. The first adapter end provides flange 1201 to enable ultimate connection to a pressurized source of fluids (such as, for example, a wellhead). The second adapter end is configured to be inserted into fluid connection housing assembly 1300. Referring now to FIG. 20 in conjunction with FIG. 18, fluid connection housing assembly 1300 has first and second housing ends, in which the first housing end is configured to receive the second adapter end as fluid connection adapter 1200 enters fluid connection housing assembly 1300. The second housing end is configured to be attached ultimately to flow iron, possibly with other equipment interposed.

Embodiments of fluid connection assembly 1100 as shown on FIG. 18 are configured such that fluid connection adapter 1200 may be stationary (as in, for example, attached ultimately to a well head), and such that fluid connection housing assembly 1300 may be movable (as in, for example, deployable by crane to mate with a stationary fluid connection adapter 1200). The scope of the technology described in this disclosure is not limited in this regard, however.

FIG. 19 depicts a section through an embodiment of fluid connection adapter 1200. Fluid connection adapter 1200 on FIG. 19 generally provides locking features on an external surface thereof and sealing features on an internal surface thereof. More specifically, fluid connection adapter 1200 on FIG. 19 includes enlarged OD section 1205 towards the second end. With momentary additional reference to FIG. 24A, for example, enlarged OD section includes rib 1210 providing external and internal centering guide sections 1202, 1203 to assist with mating fluid connection adapter 1200 inside fluid connection housing assembly 1300 over seal insert 1301. Returning now to FIG. 19, rib 1210 on fluid connection adapter 1200 further provides adapter wedge engagement surface 1209 on an external surface of fluid connection adapter 1200. In some embodiments, adapter wedge engagement surface 1209 is tapered. Referring again to FIG. 24A, for example, adapter wedge engagement surface 1209 is for constricting wedge locking engagement with wedge inner surface 1323.

FIG. 19 further depicts first and second adapter seal surfaces 1207, 1208 defining first and second adapter seal bores 1211, 1212 respectively on an internal surface of fluid connection adapter 1200. Referring momentarily to FIG. 22A, for example, first and second adapter seal surfaces 1207, 1208 are for corresponding sealing engagement with first and second housing seal surfaces 1344, 1345 on an external surface of seal insert 1301. Referring momentarily to FIG. 20, seal insert 1301 is provided on fluid connection housing assembly 1300. FIG. 20 illustrates an embodiment in which seal insert 1301 provides retaining rib 1306. Fluid connection housing assembly 1300 holds sealing ring in place on FIG. 20 by interposing retaining rib 1306 between flanged connector 1303 and retaining ring 1307.

Figure 24:
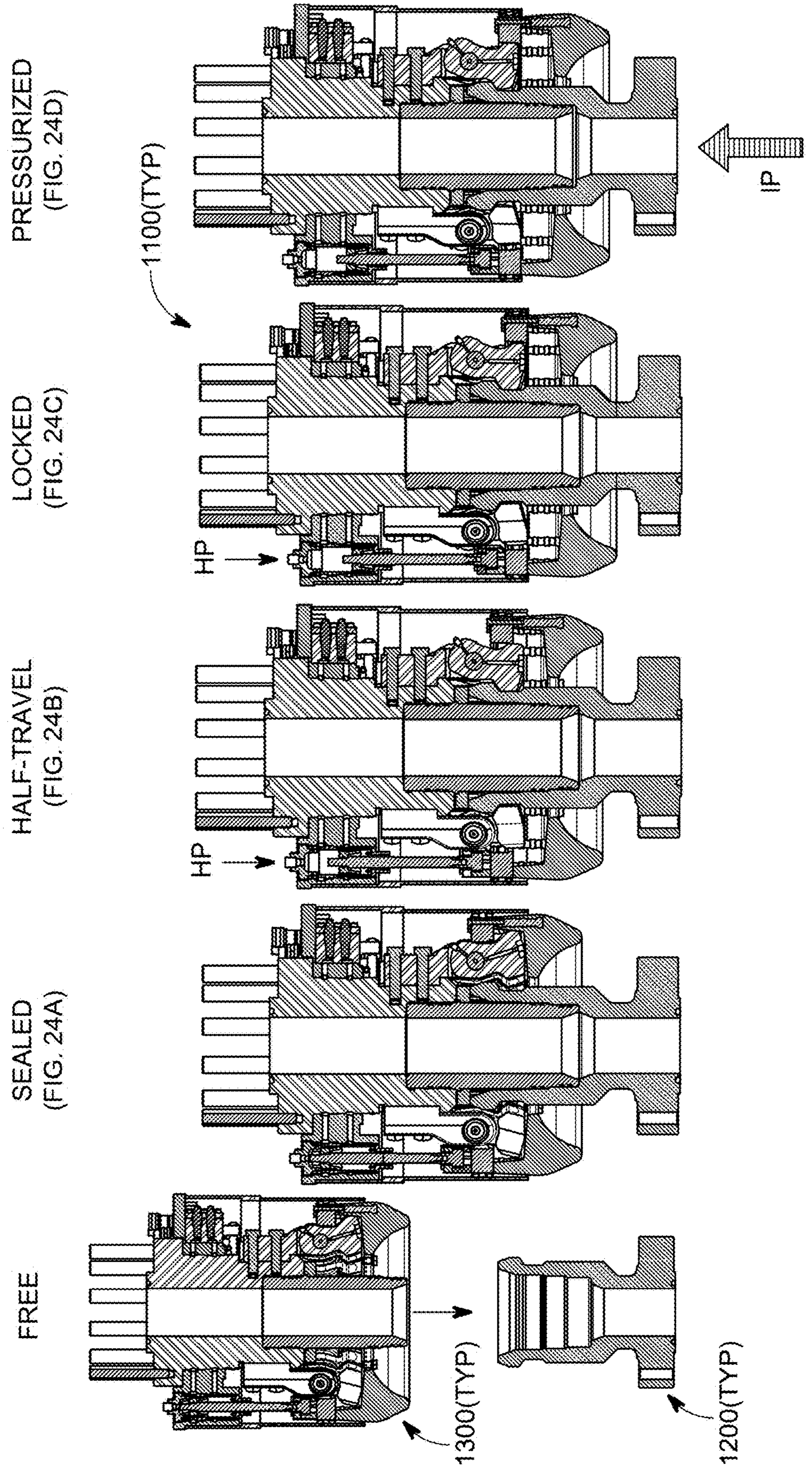
FIG. 24 depicts sequential "freeze frame" views illustrating engagement of fluid connection assembly 1100 to form a fluid connection and seal.
Figure 24A:
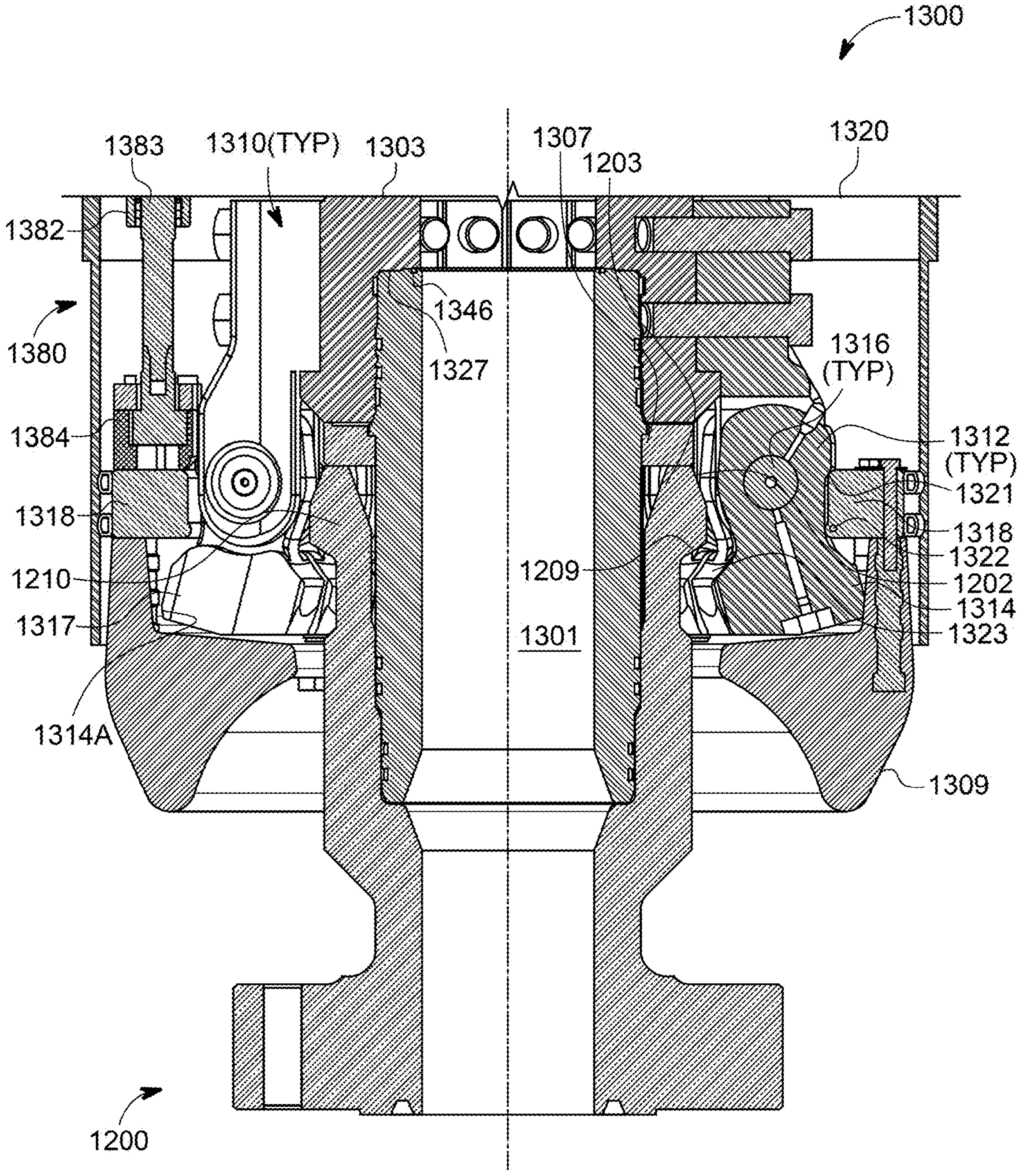
FIGS. 24A though 24D are enlargements of the correspondingly-labeled "freeze frame" views on FIG. 24.

FIG. 24A further shows that rib 1210 on fluid connection adapter 1200 encounters and abuts retaining ring 1307 when fluid connection housing assembly 1300 is fully received over fluid connection adapter 1200. In this way, rib 1210 acts as a positive stop to regulate fluid connection adapter 1200's maximum penetration into fluid connection housing assembly 1300. The maximum penetration distance may be selected to be a penetration at which: (a) wedge inner surface 1323 is positioned to lock operationally against adapter wedge engagement surface 1209; and (b) first and second adapter seal surfaces 1207, 1208 are positioned to seal operationally with first and second housing seal surfaces 1344, 1345.

FIG. 20 is a section as shown on FIG. 18, depicting a section through an embodiment of fluid connection housing assembly 1300. FIG. 20 shows fluid connection housing assembly 1300 on FIG. 20 providing the following major components and assemblies: flanged connector 1303, housing frame 1302, retaining ring 1307, seal insert 1301, wedge assemblies 1310, piston assemblies 1380, locking ring 1318, tulip 1309 and cover 1320. FIG. 20 further calls out details and features of some of the major components and assemblies. Such details and features are described below with reference to additional Figures.

Figure 20A:
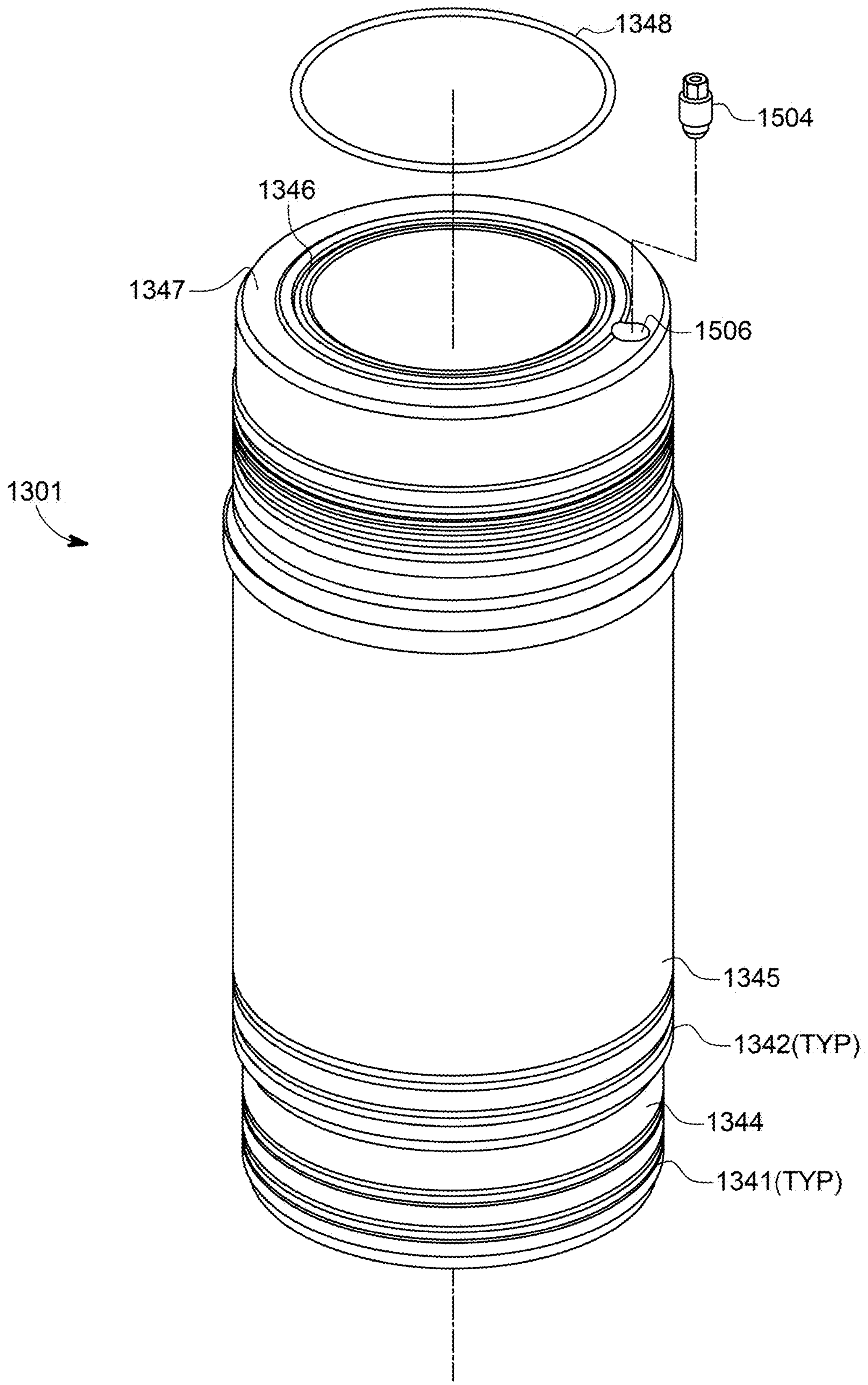
FIG. 20A is an isolated and enlarged view of seal insert 1301 and related components, as also shown on FIGS. 20 and 30, for example.
Figure 30:
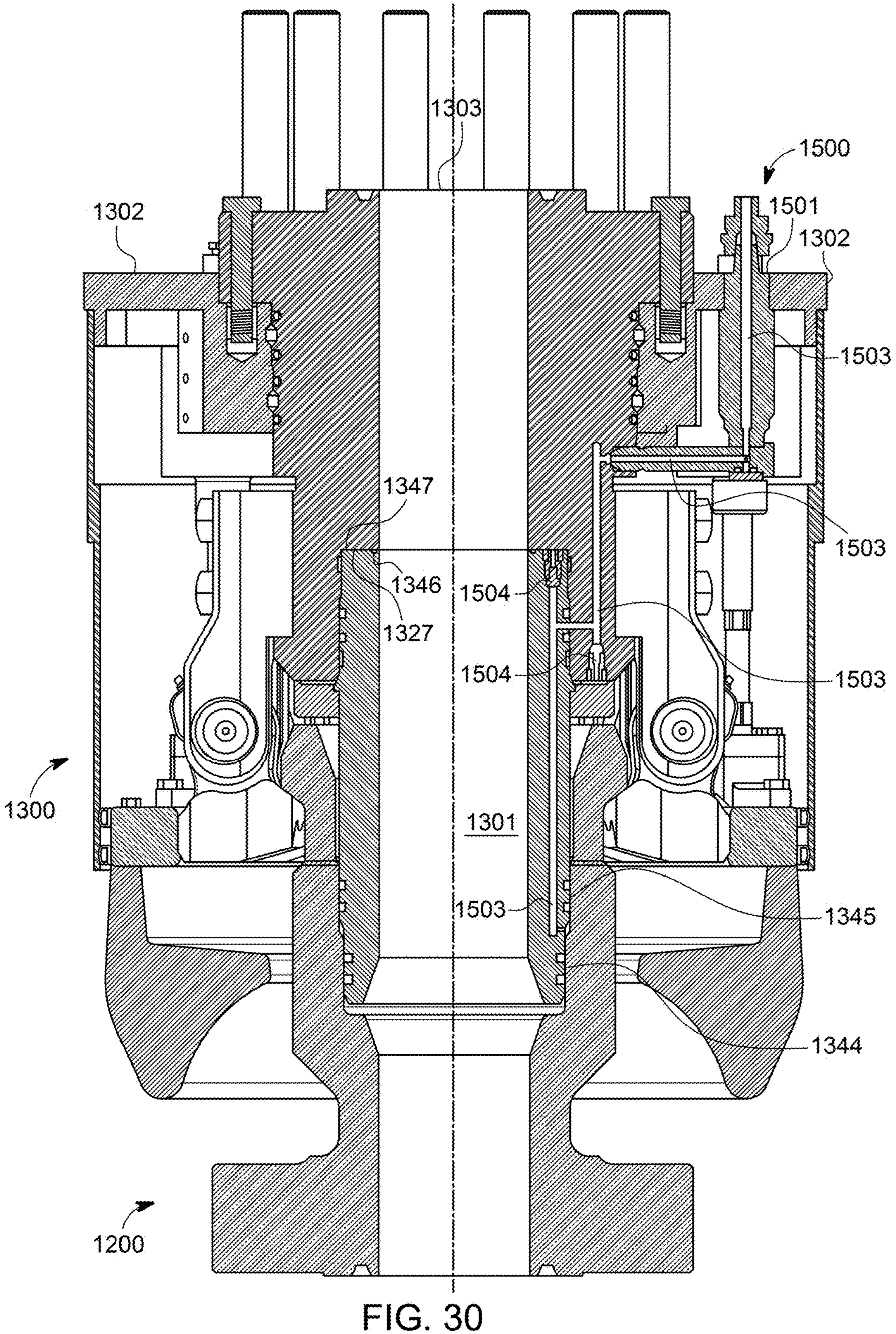
FIG. 30 is similar to the section view in FIG. 29 except with the section location reoriented to cut through quick test sub 1500 (as seen on FIG. 26) in order to illustrate quick test passageway 1503 through fluid connection housing assembly 1300.

FIG. 20A is an isolated and enlarged view of seal insert 1301 and related components, as also shown on FIGS. 20 and 30, for example. FIG. 20A shows additional features of seal insert 1301 and related components in more detail. In embodiments, seal insert 1301 is disposed to be received into flanged connector 1303 (refer FIG. 20, for example). FIG. 20A illustrates first and second housing seal surfaces 1344, 1345 on an external surface (or an exterior) of seal insert 1301. Referring momentarily to FIG. 22A, for example, first and second housing seal surfaces 1344, 1345 are for corresponding sealing engagement with first and second adapter seal surfaces 1207, 1208 on an internal surface of fluid connection adapter 1200.

FIG. 20A also shows first and second seal insert grooves 1341, 1342. Referring again momentarily to FIG. 22A, first and second seal insert grooves 1341, 1342 are for elastomer seal rings 1343 (such as o-rings, for example).

FIG. 20A further depicts seal insert 1301 including longitudinal housing seal surface 1347. FIG. 20A also shows longitudinal seal insert groove 1346 for elastomer seal ring 1348. Elastomer seal ring 1348 may be an o-ring, for example. With momentary reference to FIG. 24D, for example, it will be seen that longitudinal housing seal surface 1347 opposes longitudinal flanged connector seal surface 1327 on flanged connector 1303 when seal insert 1301 is received into flanged connector 1303.

FIG. 20A also illustrates seal insert 1301 including quick test passageway aperture 1506 in longitudinal housing seal surface 1347. Quick test passageway aperture 1506 is for receiving quick test passageway plug 1504. Quick test passageway plug 1504 and quick test aperture 1506 are described below in greater detail with reference to FIG. 30.

Figure 20B:
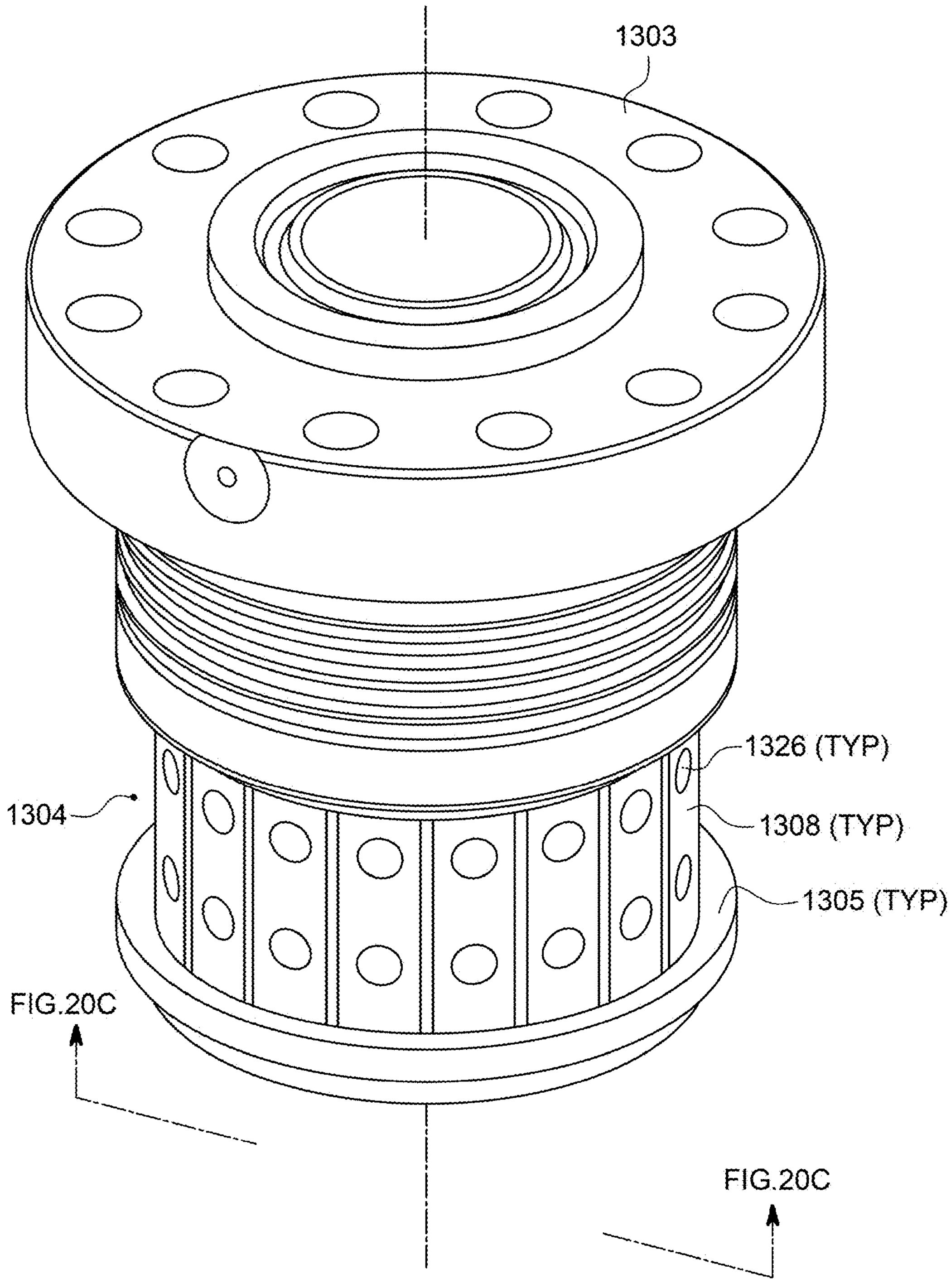
FIG. 20B is an isolated and enlarged view of flanged connector 1303, as also shown on FIGS. 20 and 22B, for example.
Figure 20C:
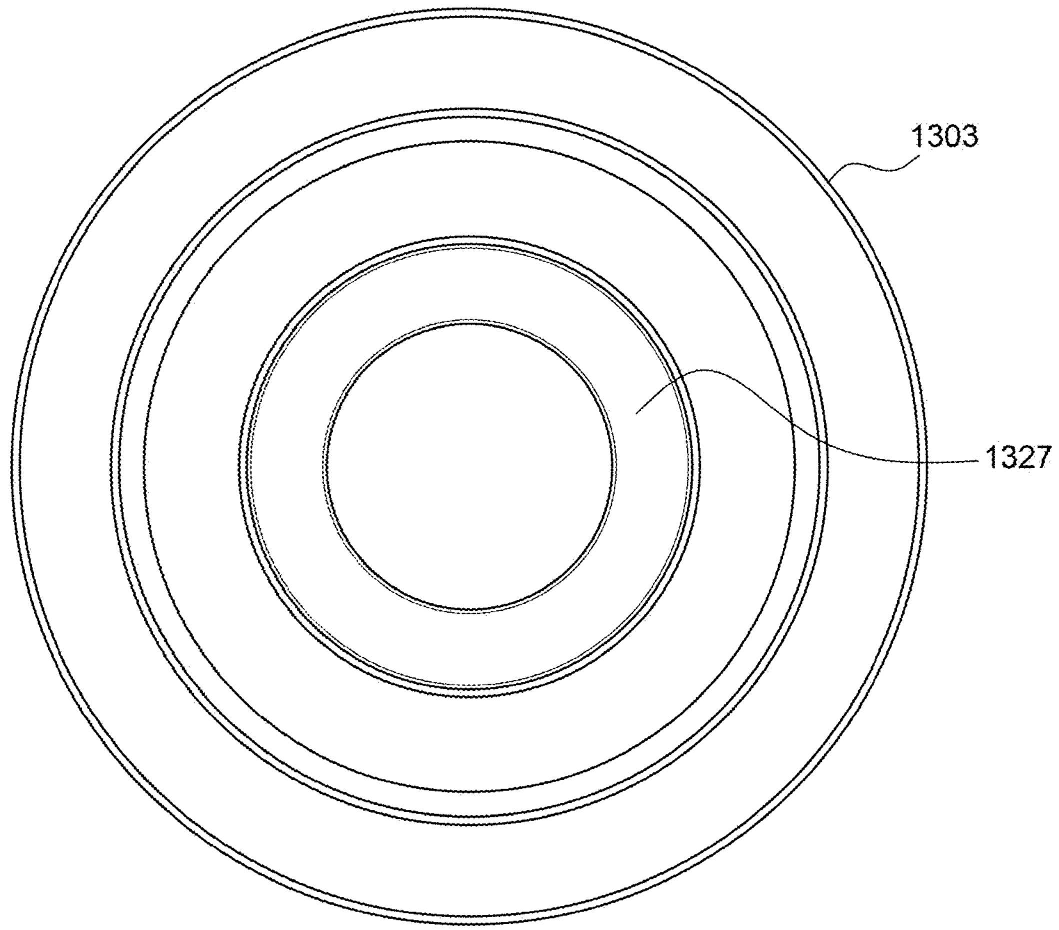
FIG. 20C is an end view of flanged connector 1303 as shown on FIG. 20B.
Figure 22:
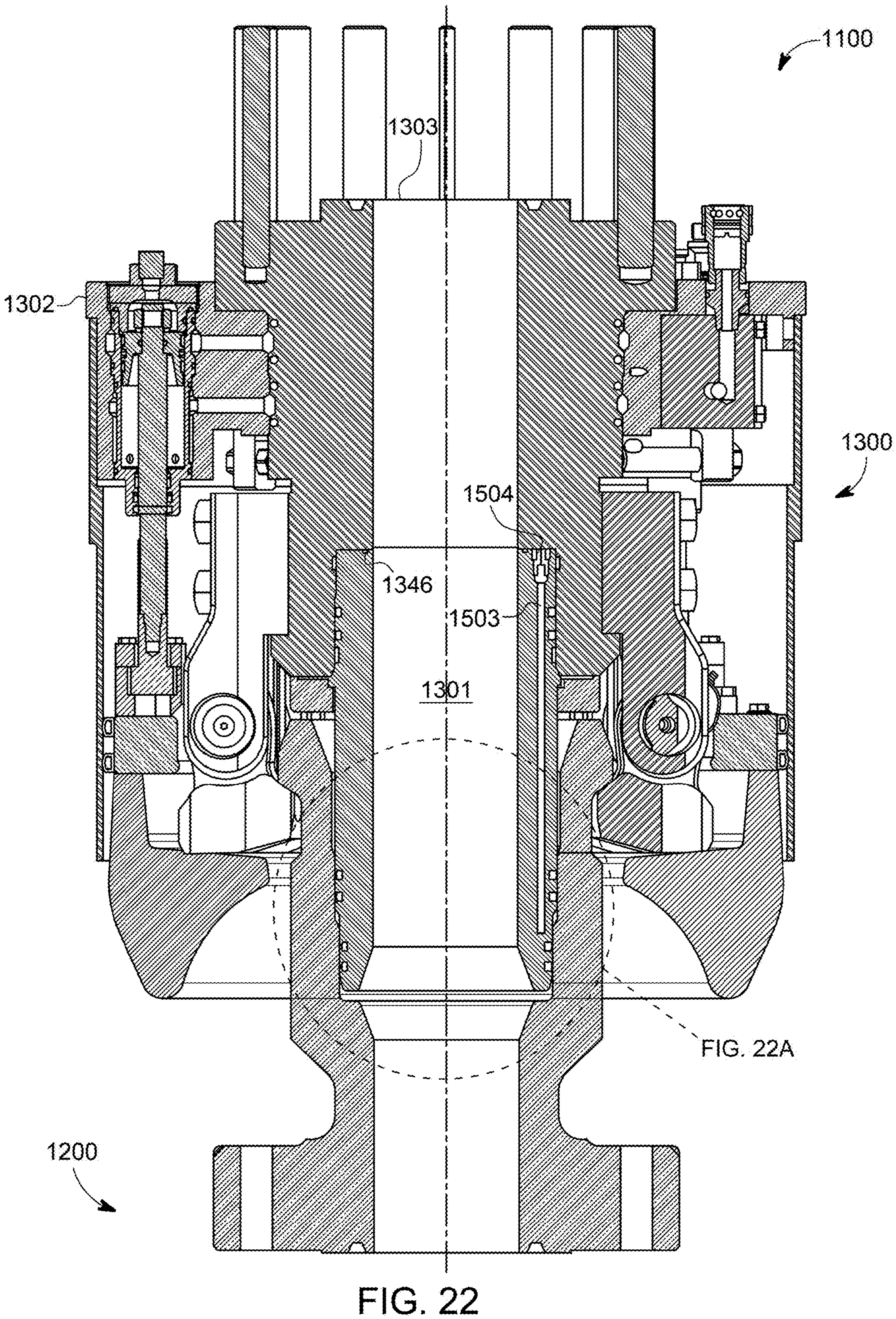
FIG. 22 depicts a section through the assembled embodiments of fluid connection adapter 1200 and fluid connection housing assembly 1300 shown on FIGS. 19 and 20 respectively.
Figure 22A:
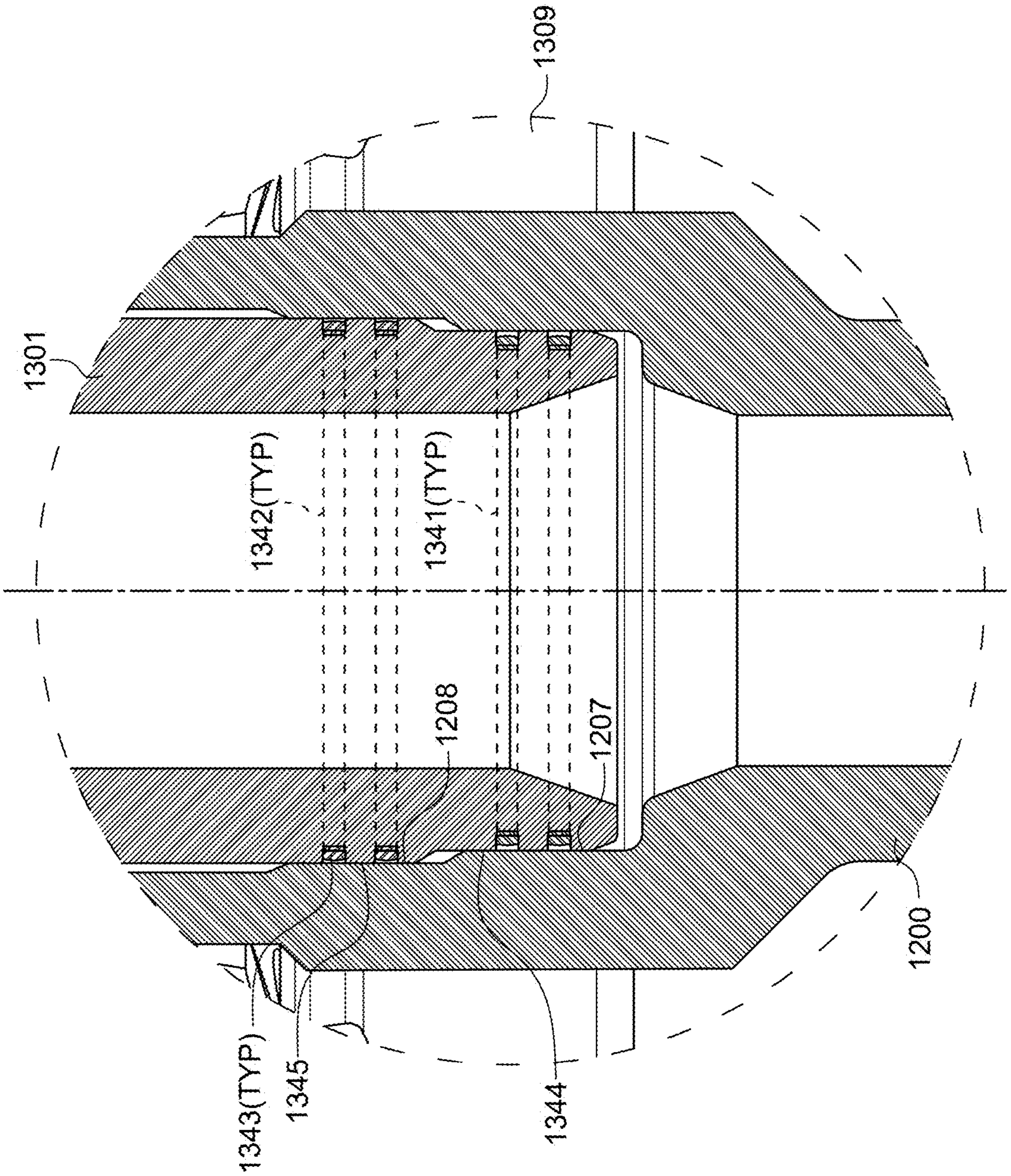
FIG. 22A is an enlargement as shown on FIG. 22.
Figure 22B:
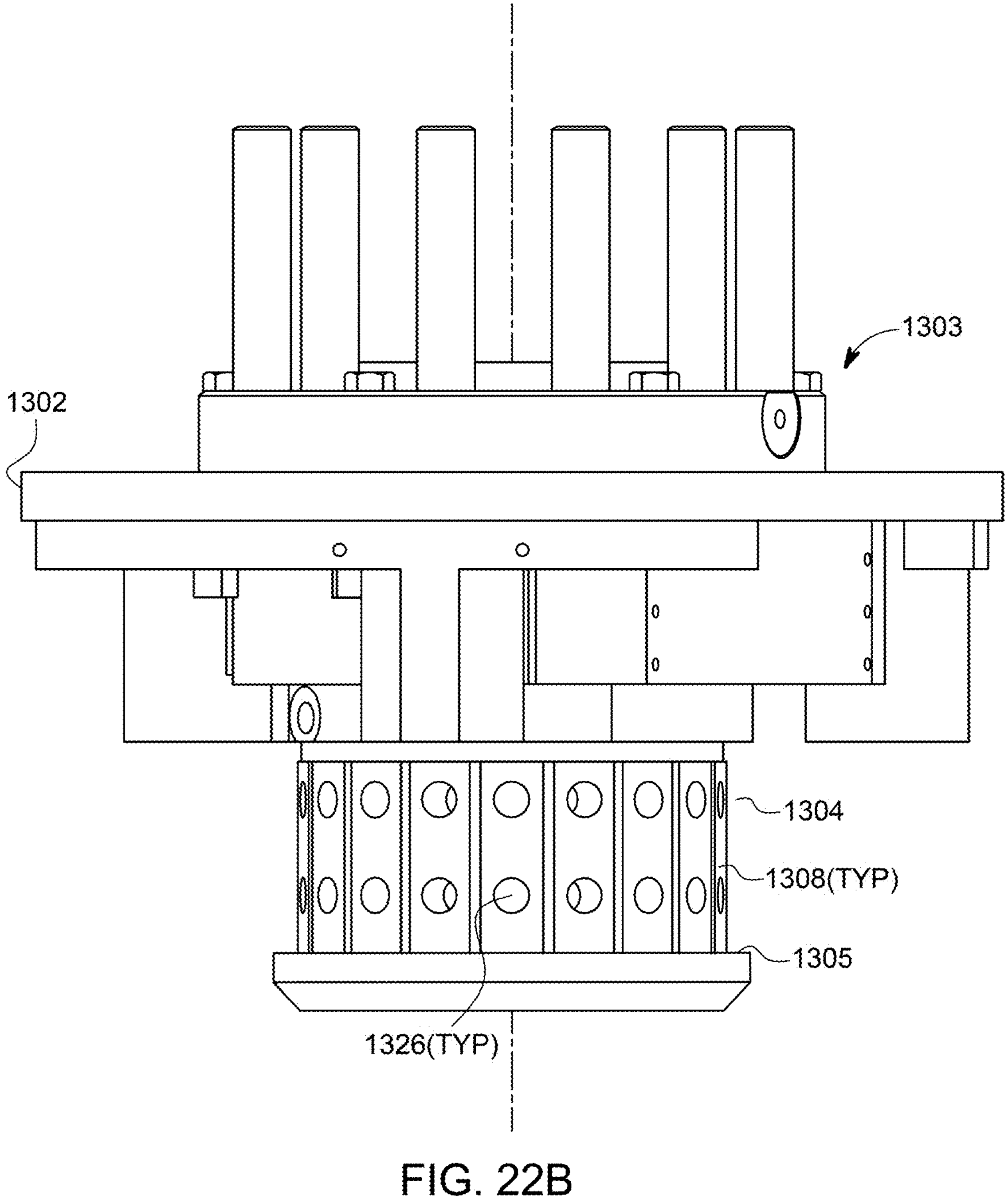
FIG. 22B is an isolated and enlarged view of flanged connector 1303 received into housing frame 1302 on FIG. 22.

FIG. 20B is an isolated and enlarged view of flanged connector 1303, as also shown on FIGS. 20 and 22B, for example. FIG. 20C is an end view of flanged connector 1303 as shown on FIG. 20B. FIGS. 20B and 20C show additional features of flanged connector 1303 in more detail. FIG. 20B illustrates annular cutout 1304, shelf 1305, connector surface 1308 and connector surface throughbore 1326 on (or provided by) flanged connector 1303. Each of annular cutout 1304, shelf 1305, connector surface 1308 and connector surface throughbore 1326 are described in greater detail below with reference to FIG. 22B, for example.

FIG. 20C illustrates flanged connector 1303 including longitudinal flanged connector seal surface 1327 on an interior of flanged connector 1303. With momentary reference to FIG. 24D, for example, it will be seen that longitudinal flanged connector seal surface 1327 opposes longitudinal housing seal surface 1347 on seal insert 1301 when seal insert 1301 is received into flanged connector 1303.

Figure 21:
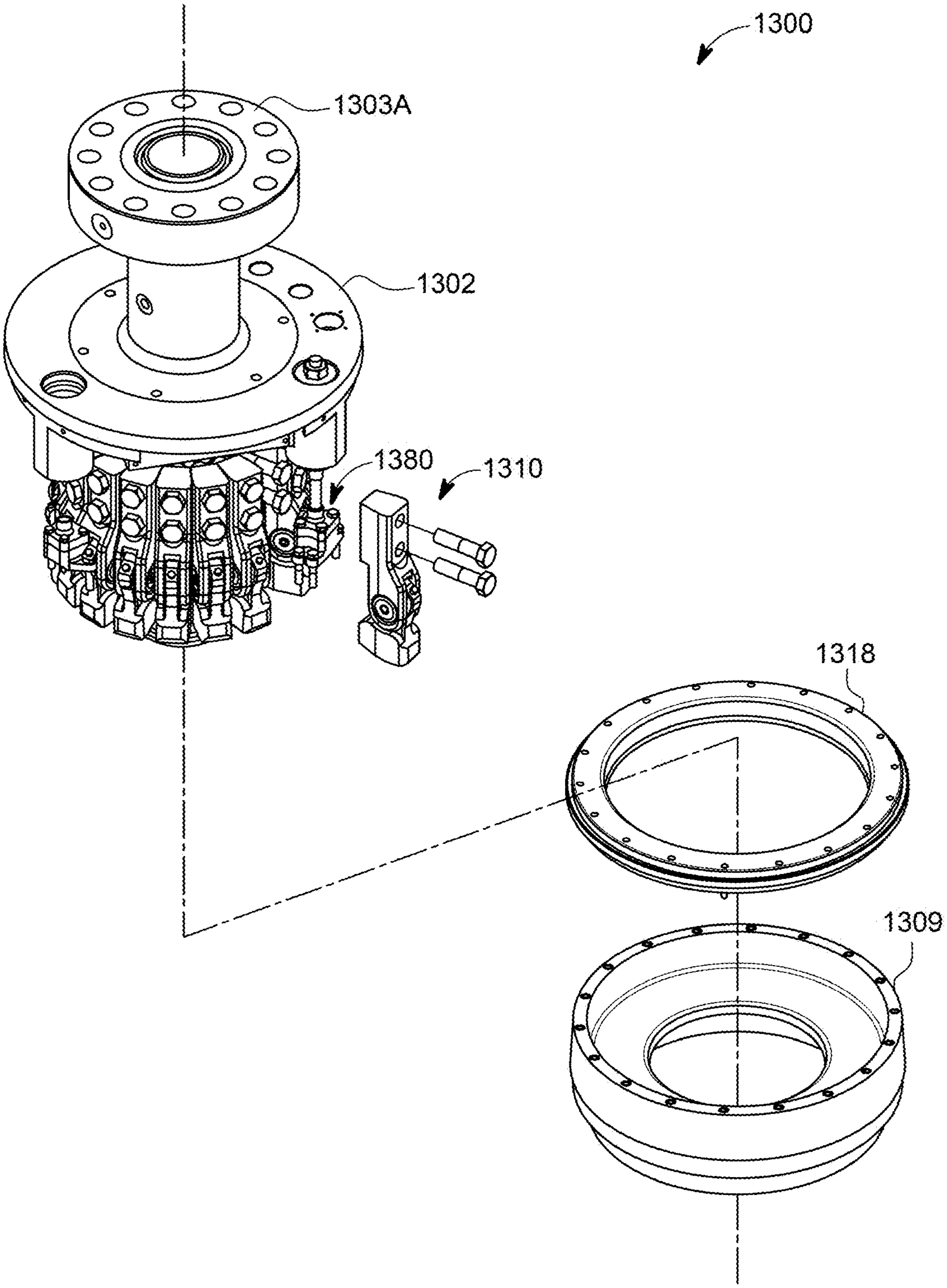
FIG. 21 is an exploded view of an embodiment of fluid connection housing assembly 1300.

FIG. 21 is an exploded view of an embodiment of fluid connection housing assembly 1300, and shows selected major components and assemblies from FIG. 20 in isolation. FIG. 21 shows flanged connector 1303A is received into and affixed to housing frame 1302. Note that FIG. 21 depicts flanged connector 1303A as a through-bore variant of the stud-bearing flanged connector 1303 shown on FIGS. 18 and 20. Through-bore flanged connector 1303A and stud-bearing flanged connector 1303 differ only in the manner in which provision is made for connection of the first end fluid connection housing assembly 1300, as a whole, to flow iron or other equipment at the first end thereof.

FIG. 21 further illustrates that wedge assemblies 1310 affix to flanged connector 1303A once flanged connector 1303A is received into housing frame 1302. In embodiments, selected wedge assemblies 1310 affix to flanged connector 1303A removably via wedge anchor fasteners 1319 (refer FIG. 23D), so that such fastened wedge assemblies 1310 may be unfastened from flanged connector 1303A (and fluid connection housing assembly 1300) for service or replacement.

FIG. 21 further illustrates piston assembly 1380 received and secured into housing frame 1302. Typically, fluid connection housing assembly 1300 will provide a plurality of piston assemblies 1380. Embodiments of fluid connection housing assembly 1300 described and illustrated in this disclosure provide three (3) piston assemblies equispaced around housing frame 1302, although the scope of the disclosure is not limited in this regard. FIG. 21 also shows locking ring 1318 and tulip 1309. As shown on FIG. 20 and elsewhere in this disclosure, fluid connection housing assembly 1300 provides the floating ends of piston assemblies 1380 affixed to locking ring 1318. In this way, extension and retraction of piston assemblies 1380 causes corresponding displacement (travel) of locking ring 1318. Tulip 1309, affixed to locking ring 1318, also travels with locking ring 1318.

Figure 21A:
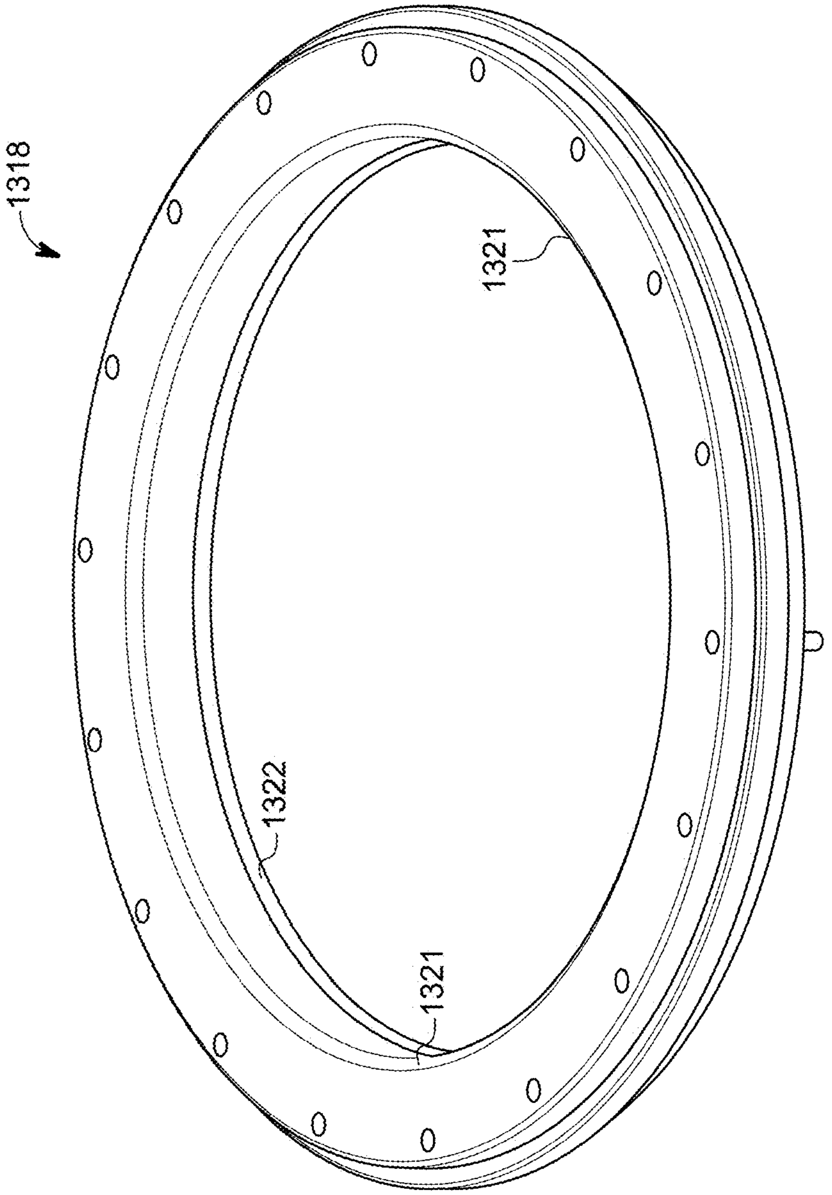
FIG. 21A is an isolated and enlarged view of locking ring 1318 also shown on FIGS. 20 and 21, for example.

FIG. 21A is an isolated and enlarged view of locking ring 1318 also shown on FIGS. 20 and 21, for example. FIG. 21A shows additional features of locking ring 1318 in more detail. FIG. 21A illustrates locking ring 1318 providing locking ring disengagement surface 1321 and locking ring engagement rib 1322 on an interior annular surface thereof.

FIG. 22 depicts a section through the assembled embodiments of fluid connection adapter 1200 and fluid connection housing assembly 1300 shown on FIGS. 19 and 20 respectively. FIG. 22A is an enlargement as shown on FIG. 22. As also described above with reference to FIGS. 19 and 24A, FIG. 22A shows that fluid connection adapter 1200 provides first and second adapter seal bores 1211, 1212 formed in an internal surface thereof. First and second adapter seal bores 1211, 1212 are shaped to receive seal insert 1301 on fluid connection housing assembly 1300 such that first and second adapter seal surfaces 1207, 1208 on fluid connection adapter 1200 form seals with first and second adapter seal surfaces 1344, 1345 on seal insert 1301. FIG. 22A further shows that embodiments of seal insert 1301 may include elastomer seal rings 1343 (such as o-rings, for example) deployed in first and second seal insert grooves 1341, 1342.

FIG. 22B is an isolated and enlarged view of flanged connector 1303 received into housing frame 1302 on FIG. 22. FIG. 22B shows flanged connector 1303 having an annular cutout 1304. Annular cutout 1304 provides shelf 1305. Annular cutout 1304 also provides a plurality of connector surfaces 1308 which are flat (planar) in illustrated embodiments, although the scope of this disclosure is not limited in this regard. It will be appreciated that in illustrated embodiments, the plurality of connector surfaces 1308 forms a polygonal cross-section across annular cutout 1304. FIG. 22B also shows connector surfaces 1308 providing connector surface throughbores 1326 formed therein. As will be described in more detail immediately below, and with further reference to FIG. 22, for example, connector surfaces 1308 and connector surface throughbores 1326 are configured to receive wedge assemblies 1310.

Figure 23C:
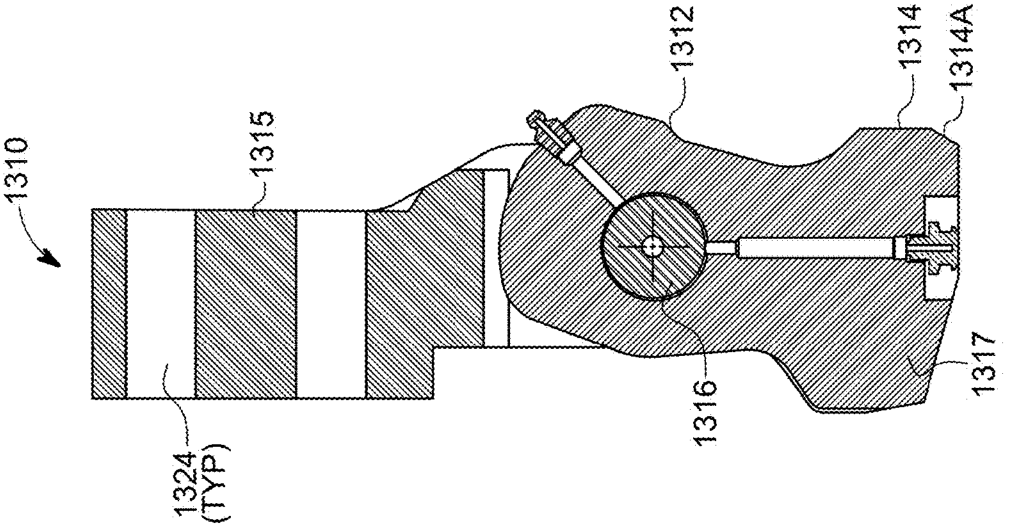
FIGS. 23B and 23C are sections as shown on FIG. 23A.
Figure 23B:
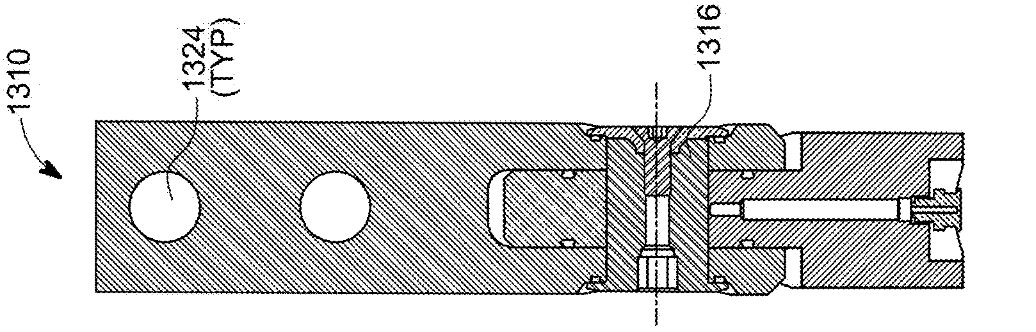
Figure 23A:
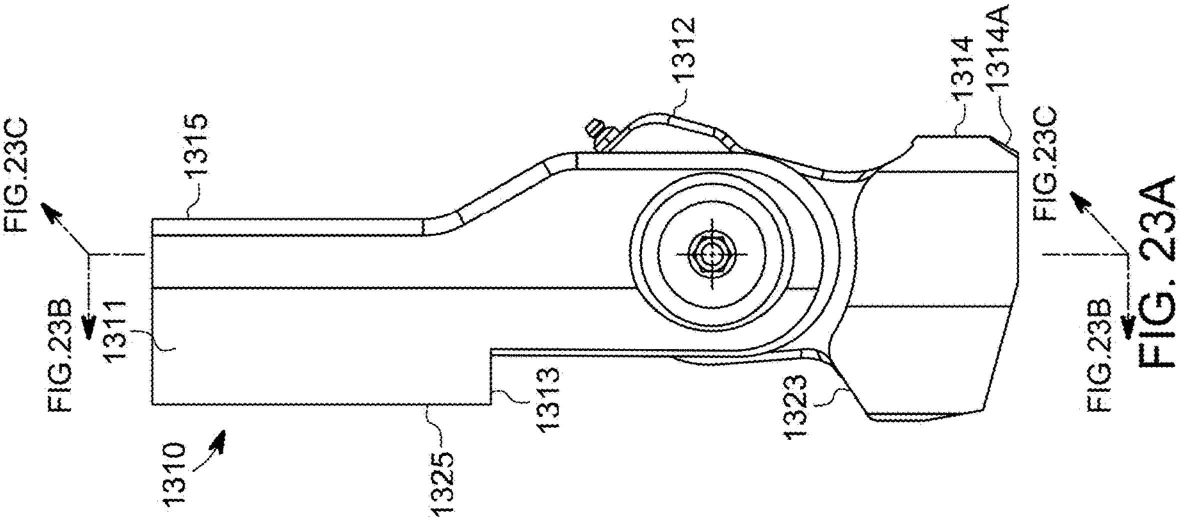
FIG. 23A is an isolated and enlarged elevation view of wedge assembly 1310 on FIGS. 20 and 21.
Figure 23D:
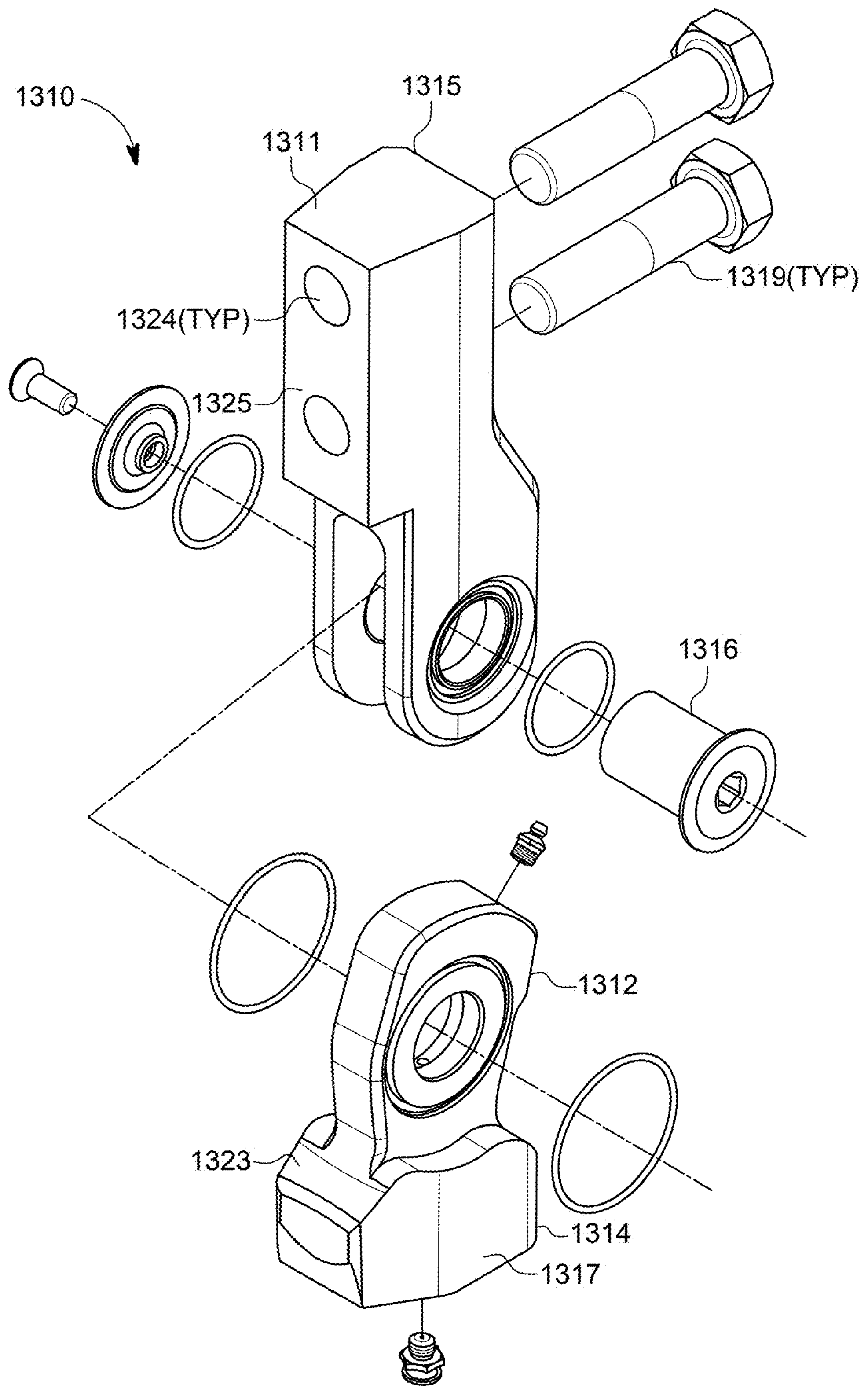
FIG. 23D is an exploded view of wedge assembly 1310 on FIG. 23A.

FIGS. 23A through 23D should now be viewed together. FIG. 23A is an isolated and enlarged view of wedge assembly 1310 on FIGS. 20 and 21. FIGS. 23B and 23C are sections as shown on FIG. 23A. FIG. 23D is an exploded view of wedge assembly 1310 on FIG. 23A. FIGS. 23A through 23D illustrate wedge assembly 1310 comprising wedge 1317 rotationally connected to wedge anchor 1315 via wedge pin 1316. Wedge anchor 1315 provides wedge anchor lug 1311. Wedge anchor lug 1311 provides wedge anchor attachment surface 1325 and wedge anchor bearing surface 1313. Wedge anchor 1315 further provides wedge anchor throughbores 1324 for receiving wedge anchor fasteners 1319. As also described above with reference to FIGS. 21 and 22B, wedge assemblies 1310 affix to flanged connector 1303/1303A in an assembled fluid connection housing assembly 1300.

Reference should now be made to FIGS. 23D and 22B together. Wedge anchor lugs 1311 on wedge assemblies 1310 on FIG. 23D are configured to be received into annular cutouts 1304 on flanged connector 1303 on FIG. 22B. Wedge anchor fasteners 1319 secure wedge assemblies 1310 to annular cutouts 1304. Wedge anchor fasteners 1319 pass through wedge anchor throughbores 1324 shown on FIG. 23D and connector surface throughbores 1326 on FIG. 22B in securing wedge assemblies 1310 to annular cutouts 1304. Wedge anchor attachment surfaces 1325 oppose/contact connector surfaces 1308, and wedge anchor bearing surfaces 1313 oppose/contact shelf 1305 when wedge anchor lugs 1311 are received into annular cutout 1304. As a result, it will be seen from FIGS. 23D and 22B that loads exerted on the components of wedge assemblies 1310 during operation of fluid connection assembly 1100 are passed through to (and are potentially absorbed by) flanged connector 1303 in the first instance (rather than housing frame 1302). Further, in illustrated embodiments, selected wedge assemblies 1310 may be unfastened from flanged connector 1303/1303A (and fluid connection housing assembly 1300) for service or replacement.

FIG. 23A through 23D further illustrate wedge 1317 providing wedge disengagement rib 1312, wedge outer surface 1314 and wedge inner surface 1323. With further reference to FIG. 24 and FIGS. 24A through 24D, for example, it will be seen that wedge disengagement rib 1312 is configured to be contacted by locking ring disengagement surface 1321 during travel of locking ring 1318. Wedge outer surface 1314 is configured to be contacted by locking ring engagement rib 1322 during travel of locking ring 1318. Wedge inner surface 1323 is configured for constricting wedge locking engagement with adapter wedge engagement surface 1209 during travel of locking ring 1318.

Figure 26:
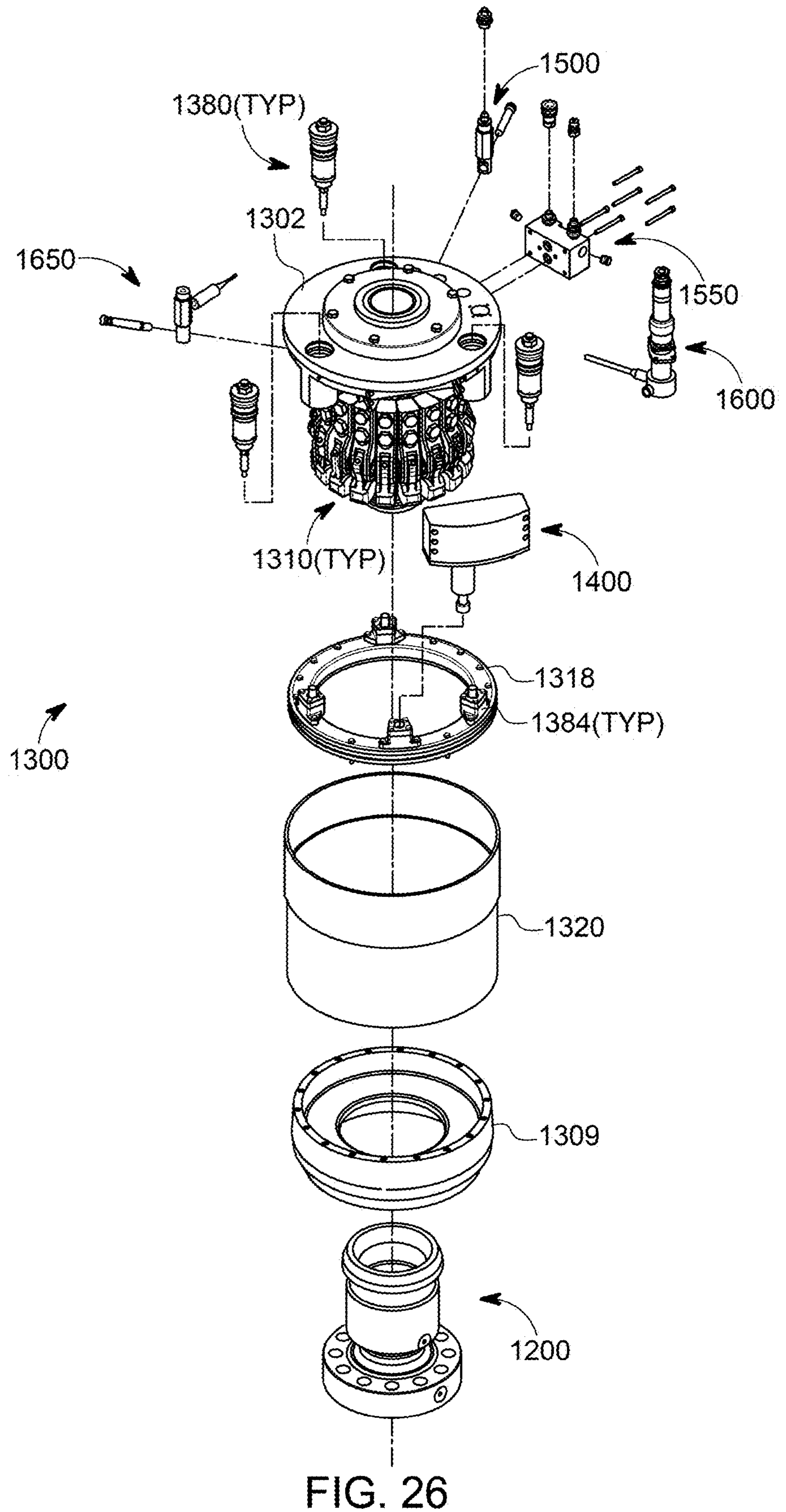
FIG. 26 is an exploded view of features of the fluid connection assembly 1100 as depicted in FIG. 18.
Figure 26A:
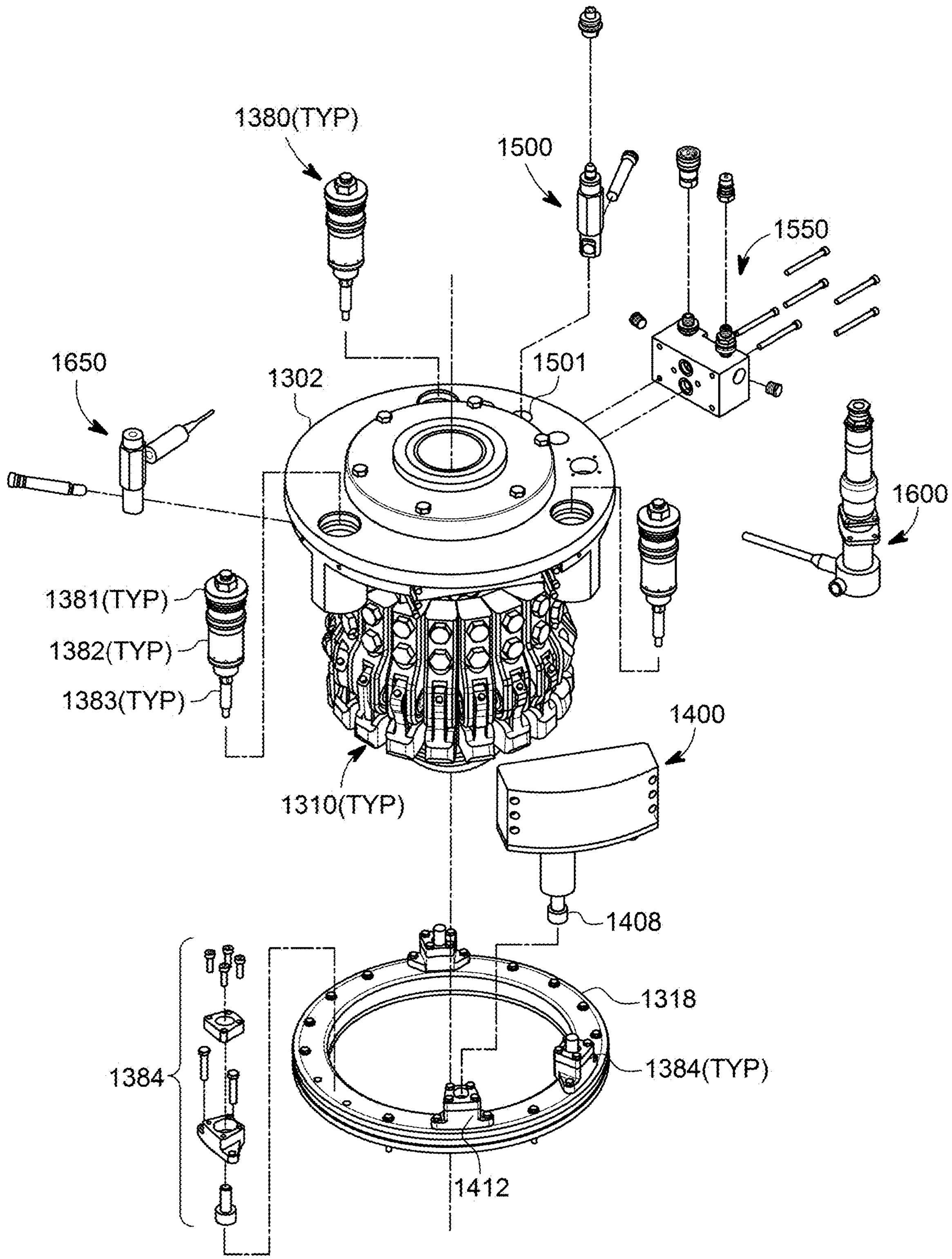
FIG. 26A is an enlargement and further exploded view of features shown on FIG. 26.

FIG. 26 is an exploded view of fluid connection assembly 1100 as depicted in FIG. 18. FIG. 26A is an enlarged portion of FIG. 26. Some of the major components, features and assemblies illustrated on FIGS. 26 and 26A are described in detail above with reference to other Figures. FIG. 26 depicts the following major components and assemblies: fluid connection adapter 1200, tulip 1309, cover 1320, locking ring 1318, wedge assemblies 1310, piston assemblies 1380, position sensor assembly 1400, and quick test sub (QTS) 1500 (all described above or elsewhere in this disclosure with reference to other Figures). FIG. 26 also depicts additional components and assemblies affixed to and/or received onto fluid connection housing assembly 1300 via housing frame 1302. Hydraulic pressure balancing manifold 1550 regulates pressurized hydraulic fluid flow to and from piston assemblies 1380 to ensure that locking ring 1318 travels evenly when piston assemblies are extended or retracted. Electrical connector/junction box 1600 gathers and organizes wires and connectors deployed within fluid connection housing assembly for control or monitoring purposes. Electrical connector/junction box 1600 further allows sensors or other electrical components on fluid connection housing assembly 1300 to be addressed from a common location. High pressure monitor 1650 senses pressure within fluid connection housing assembly 1300. High pressure monitor 1650's functions include sensing internal pressure as part of a safety protocol to prevent inadvertent unlocking of fluid connection assembly 1100 while still the unit is still under operational pressure.

Figure 27:
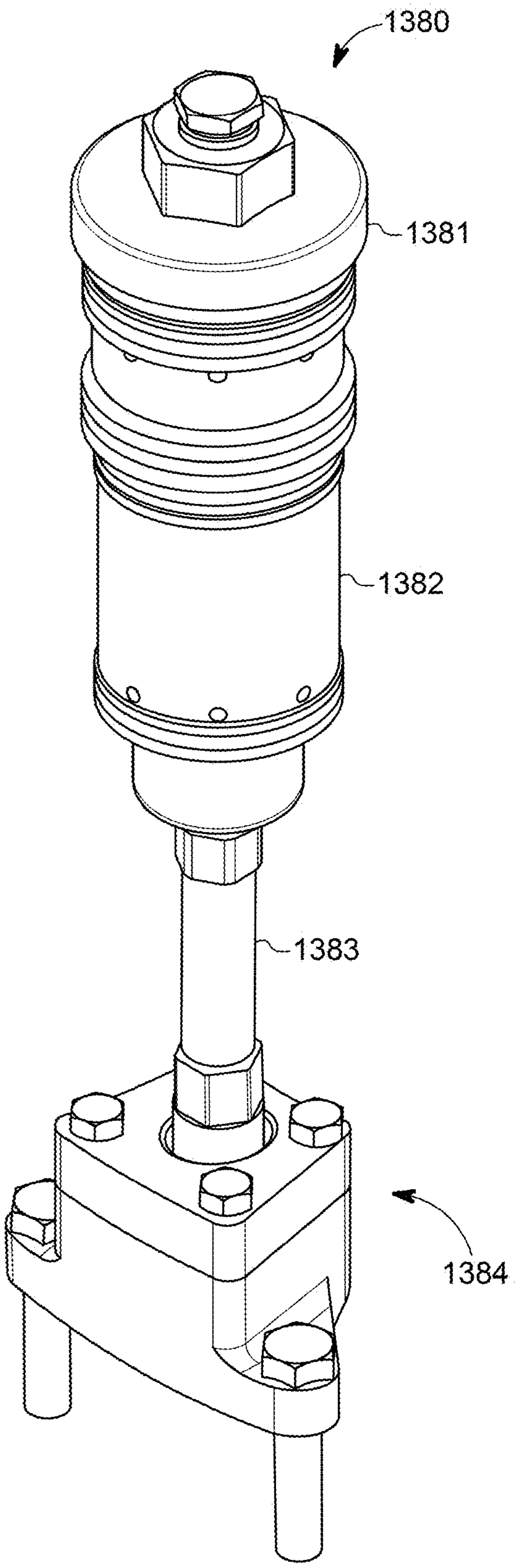
FIG. 27 is a general perspective view of piston assembly 1380 in isolation.

FIG. 26A shows assembly details for some of the components, features and assemblies illustrated on FIG. 26. FIG. 26A shows that piston assemblies 1380 are received into and affixed to housing frame 1302 (as also described above with reference to FIG. 21). Refer now to FIG. 27. FIG. 27 depicts one piston assembly 1380 in isolation, comprising piston plug 1381, piston cylinder 1382, piston shaft 1383 and piston attachment assembly 1384. FIG. 26A illustrates these piston assembly components in exploded form. FIG. 26A shows that piston attachment assemblies 1384 are affixed to locking ring 1318 such that hydraulic extension and retraction of piston shafts 1383 within piston cylinders 1382 causes corresponding displacement (travel) of locking ring 1318.

FIG. 26A further illustrates position sensor assembly 1400 disposed to be attached to locking ring 1318. FIG. 26A shows position sensor assembly 1400 disposed to be affixed at a first, traveling end to locking ring 1318 via attachment of sensor attachment lug 1408 on position sensor assembly 1400 to sensor attachment bracket 1412 on locking ring 1318. FIG. 26A further shows position sensor assembly 1400 disposed to be affixed at a second, fixed end to housing frame 1302 via fasteners, for example.

Figure 28:
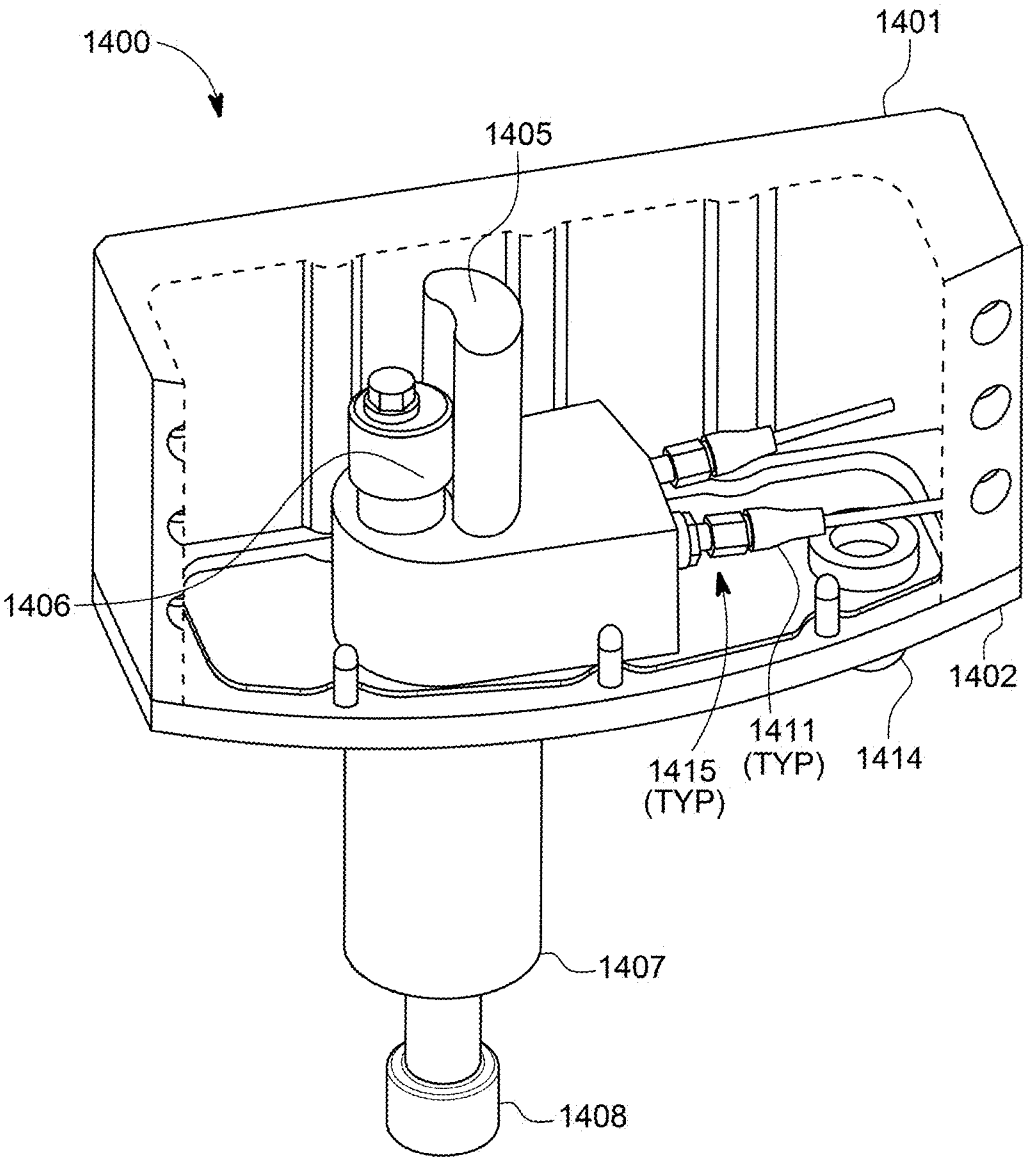
FIG. 28 is a cutaway view of position sensor assembly 1400.
Figure 28A:
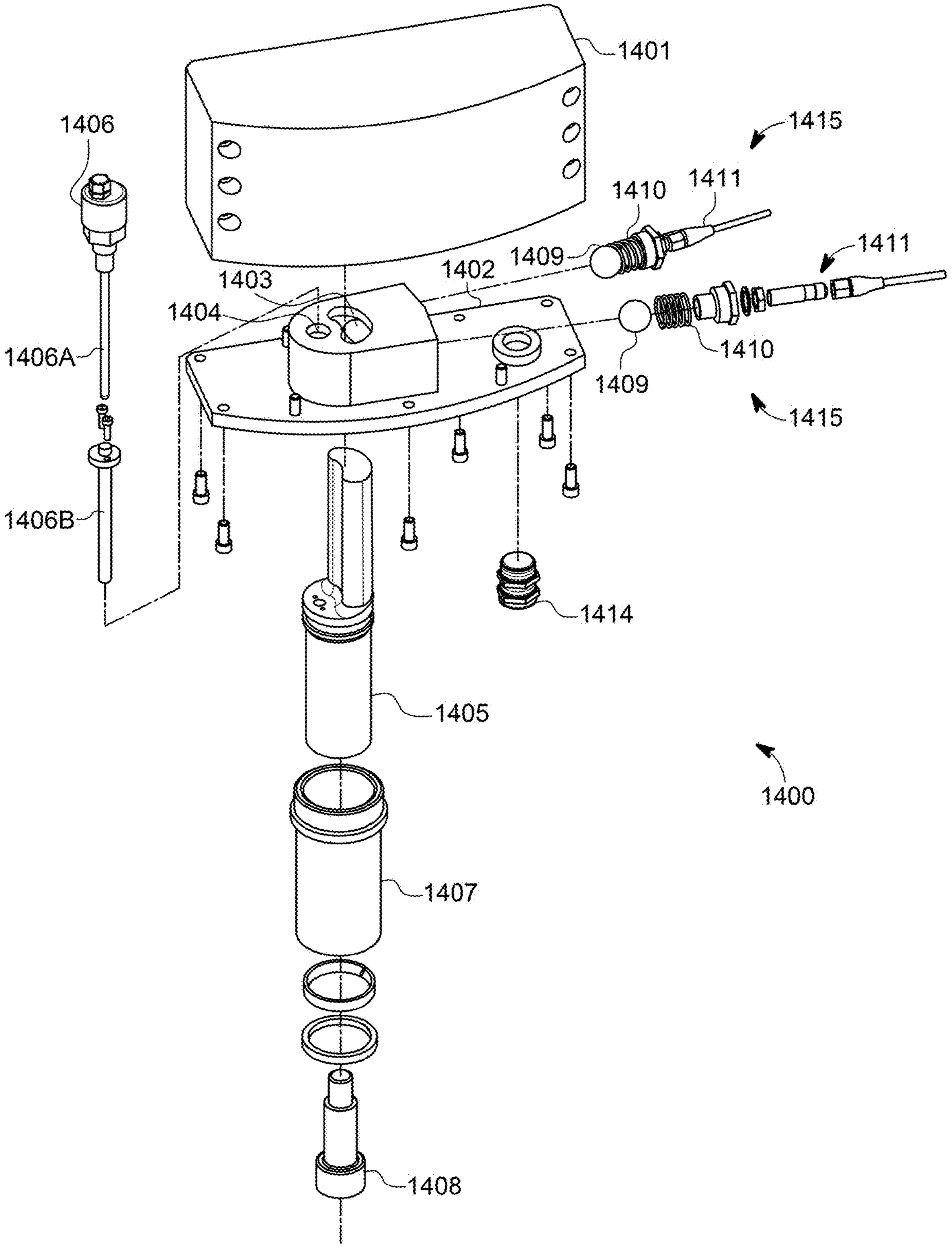
FIGS. 28A and 28B depict exploded views of position sensor assembly 1400 as shown assembled on FIG. 28.
Figure 28B:
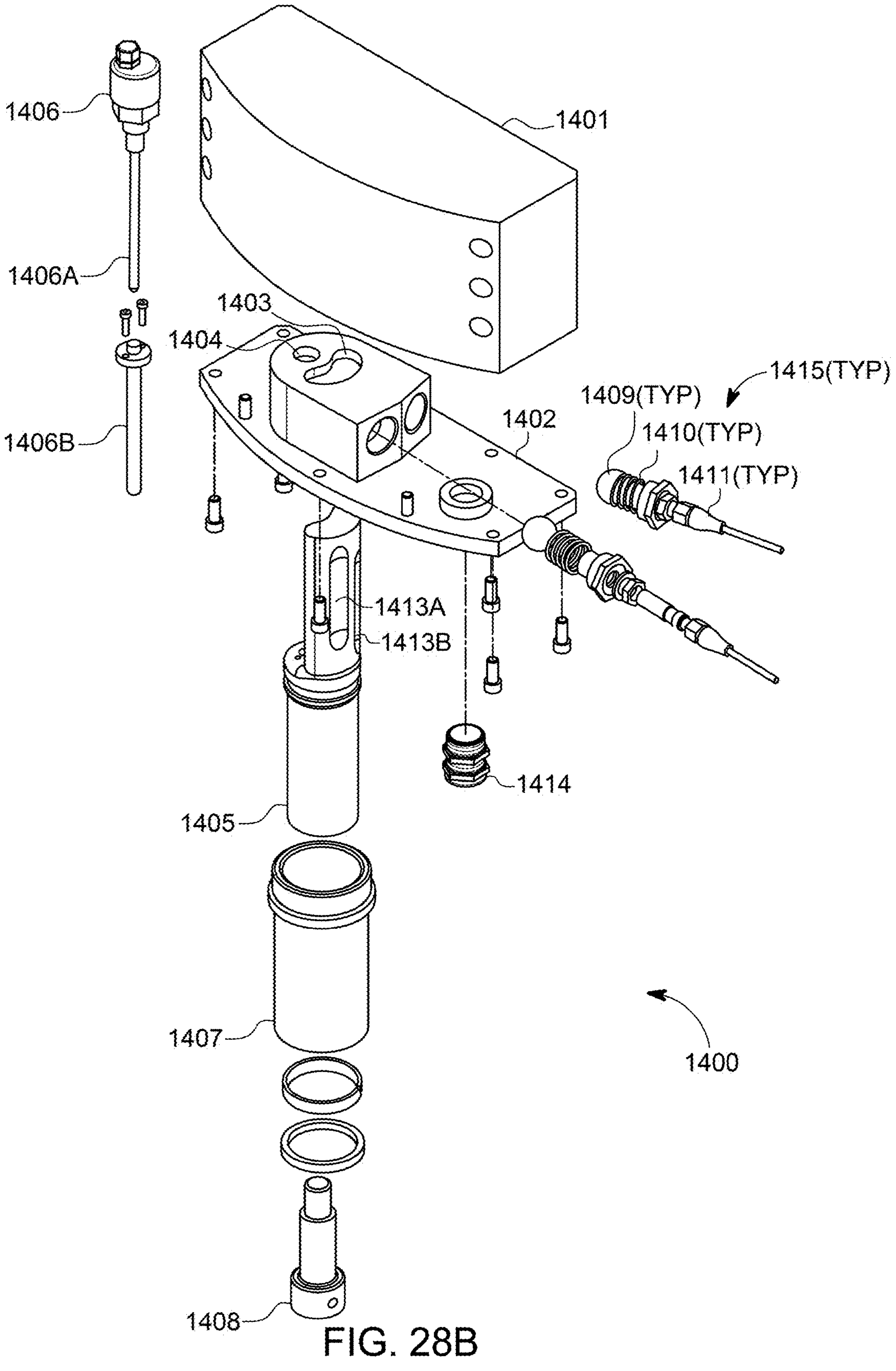

FIGS. 28, 28A and 28B depict position sensor assembly 1400 in an assembled view and then in exploded views. FIGS. 28, 28A and 28B should be viewed together, and additionally with reference to FIGS. 26A and 29. FIG. 28 is a cutaway view of position sensor assembly 1400. FIG. 28 illustrates travel pin 1405, displacement sensor 1406 and switch assembly 1415 assembled within sensor cover 1401, sensor base 1402 and cover sleeve 1407. FIG. 28 further depicts switch 1411 as part of switch assembly 1415. FIG. 28 also shows sensor attachment lug 1408 attached to the traveling end of travel pin 1405, and cord grip 1414 (acting as a grommet) within sensor base 1402. It will be understood from FIGS. 28, 28A and 28B that cord grip 1414 enables electrical wiring to access the interior of assembled position sensor assembly 1400.

FIGS. 28A and 28B depict exploded views of position sensor assembly 1400 as shown assembled on FIG. 28. FIGS. 28A and 28B show travel pin 1405 disposed to be received in cover sleeve 1407. Sensor attachment lug 1408 is attached to the traveling end of travel pin 1405. FIGS. 28A and 28B further show travel pin opening 1403 in sensor base configured for receiving travel pin 1405. It will be appreciated that when position sensor assembly 1400 is assembled, travel pin 1405 is disposed to displace (reciprocate) within travel pin opening 1403.

FIG. 28B shows groove 1413A and groove 1413B formed in travel pin 1405.

FIGS. 28A and 28B further illustrate switch assemblies 1415 each including sphere 1409, spring 1410 and switch 1411. It will be appreciated that grooves 1413A, 1413B on travel pin 1405 are configured for receiving spheres 1409 in switch assemblies 1415. When travel pin 1405 and switch assemblies 1415 are assembled within position sensor assembly 1400, springs 1410 in switch assemblies 1415 exert a spring bias to retain spheres 1409 against travel pin 1405, whether or not spheres 1409 are received in grooves 1413A, 1413B. When assembled, each sphere 1409 is positioned to activate (e.g., depress) its corresponding switch 1411 in a switch assembly 1415 when the sphere 1409 is outside a groove 1413A, 1413B. Conversely, each sphere 1409 is positioned to displace away from and not activate (e.g., not depress) its corresponding switch 1411 in a switch assembly 1415 when the sphere 1409 is received in a groove 1413A, 1413B. It will be further understood from FIG. 28B that once assembled, reciprocating displacement of travel pin 1405 within travel pin opening 1403 may cause a sphere 1409 to be inside or outside of a groove 1413A, 1413B as travel pin 1405 reciprocates, depending on travel pin 1405's position. In this way, a switch 1411 will activate when its corresponding sphere 1409 is outside of a groove 1413A, 1413B and deactivate when its corresponding sphere 1409 is received into a groove 1413A, 1413B. Grooves 1413A, 1413B may thus be deployed on travel pin 1405 such that spheres 1409 activate corresponding switches 1411 according to predetermined reciprocating travel positions of travel pin 1405. The location and length of each groove 1413A, 1413B on travel pin 1405 may be configured to dictate corresponding reciprocating travel positions of travel pin 1405 at which switches 1411 will activate and deactivate. The activation of a switch 1411 during reciprocating travel of travel pin 1405 may thus be used to monitor whether travel pin 1405 has reached a predetermined travel position.

FIGS. 28A and 28B further show displacement sensor 1406 including sensor probe 1406A disposed to be slidably received into sensor sleeve 1406B. Displacement sensor opening 1404 on sensor base 1402 is configured for receiving displacement sensor 1406 and anchoring sensor probe 1406A to sensor base 1402. Sensor sleeve 1406B affixes to travel pin 1405. Reciprocating displacement of travel pin 1405 thus causes corresponding sliding reciprocating displacement of sensor sleeve 1406B with respect to fixed sensor probe 1406A. In embodiments, displacement sensor 1406 is a linear transducer-type sensor that senses and monitors sensor probe 1406A's precise sliding insertion and withdrawal position within sensor sleeve 1406B. When assembled within position sensor assembly 1400, displacement sensor 1406 may thus be calibrated to sense and monitor travel pin 1405's precise travel position as travel pin 1405 reciprocates.

Figure 29:
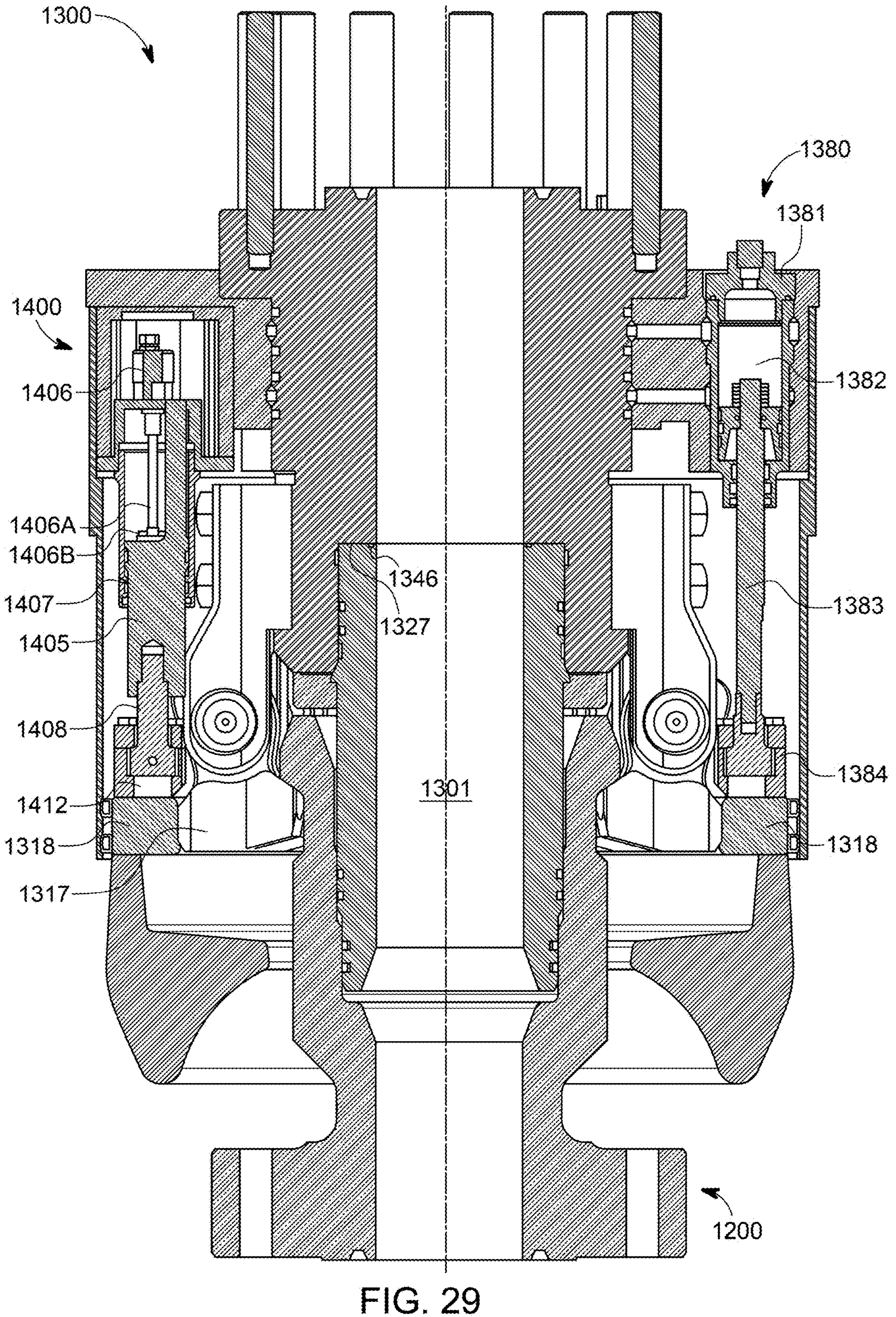
FIG. 29 is a section as shown on FIG. 18.

The operation of position sensor assembly 1400 to sense and monitor position of locking ring 1318 on fluid connection housing assembly 1300 will now be discussed. FIG. 29 is a section as shown on FIG. 18. The section depicted on FIG. 29 is taken such that both position sensor assembly 1400 and piston assembly 1380 are shown in section on FIG. 29. The operation of piston assembly 1380 on FIG. 29 to extend and retract locking ring 1318 is described above (refer to description associated with FIG. 26A). FIG. 29 also illustrates travel pin 1405 on position sensor assembly 1400 affixed at a distal, traveling end to locking ring 1318 via attachment of sensor attachment lug 1408 (on position sensor assembly 1400) to sensor attachment bracket 1412 on locking ring 1318. Actuation of piston assembly 1380 on FIG. 29 to extend and retract locking ring 1318 thus causes corresponding reciprocating travel of travel pin 1405 on position sensor assembly 1400.

The description above associated with FIGS. 28, 28A and 28B establishes that displacement sensor 1406 on position sensor assembly 1400 may be calibrated to sense and monitor travel pin 1405's precise travel position as travel pin 1405 reciprocates. FIG. 29 shows that such calibration of displacement sensor 1406 may be translated a corresponding travel position of locking ring 1318, since reciprocating travel of travel pin 1405 is in register with corresponding extension and retraction of locking ring 1318.

Figure 24C:
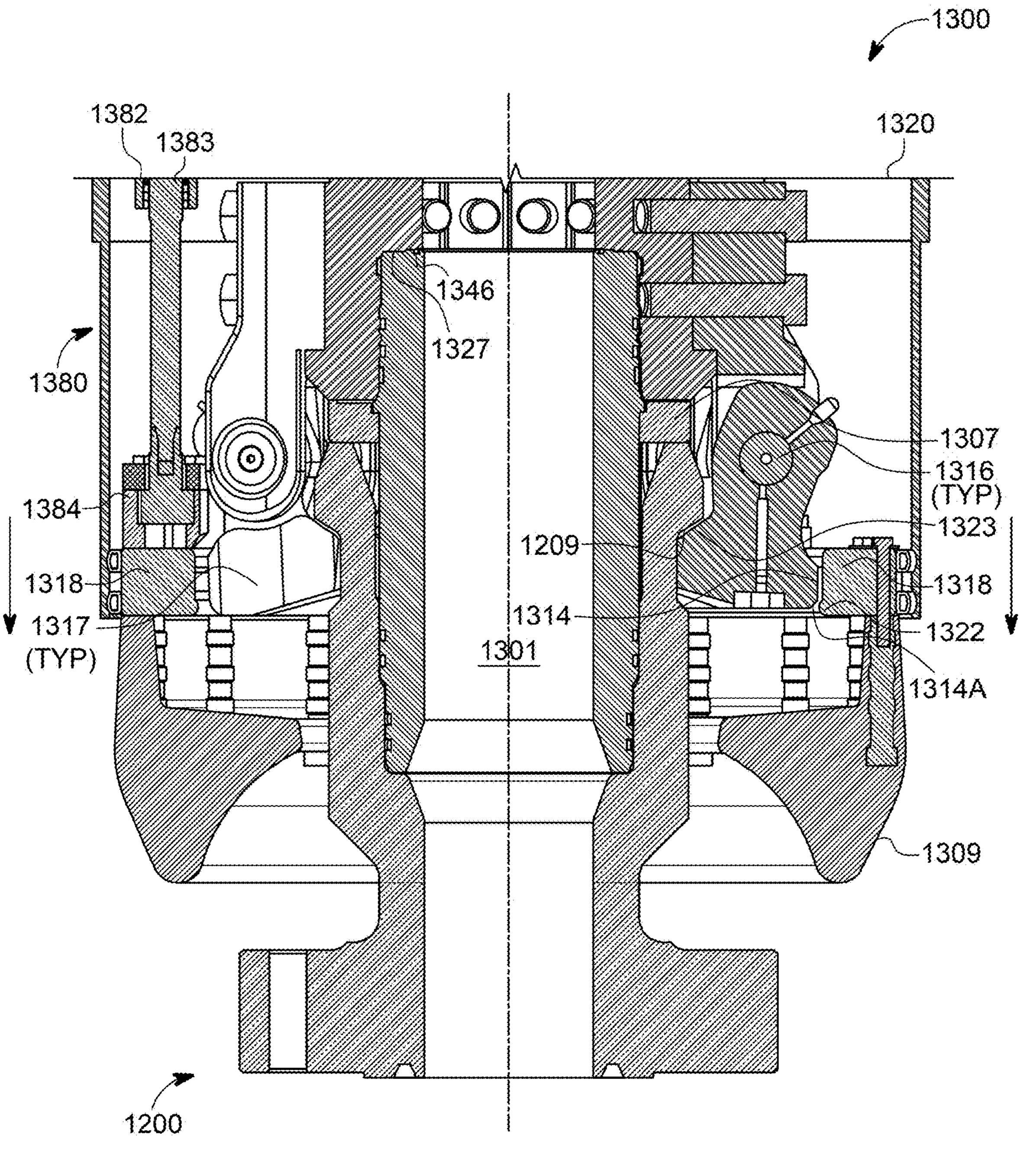
Figure 25:
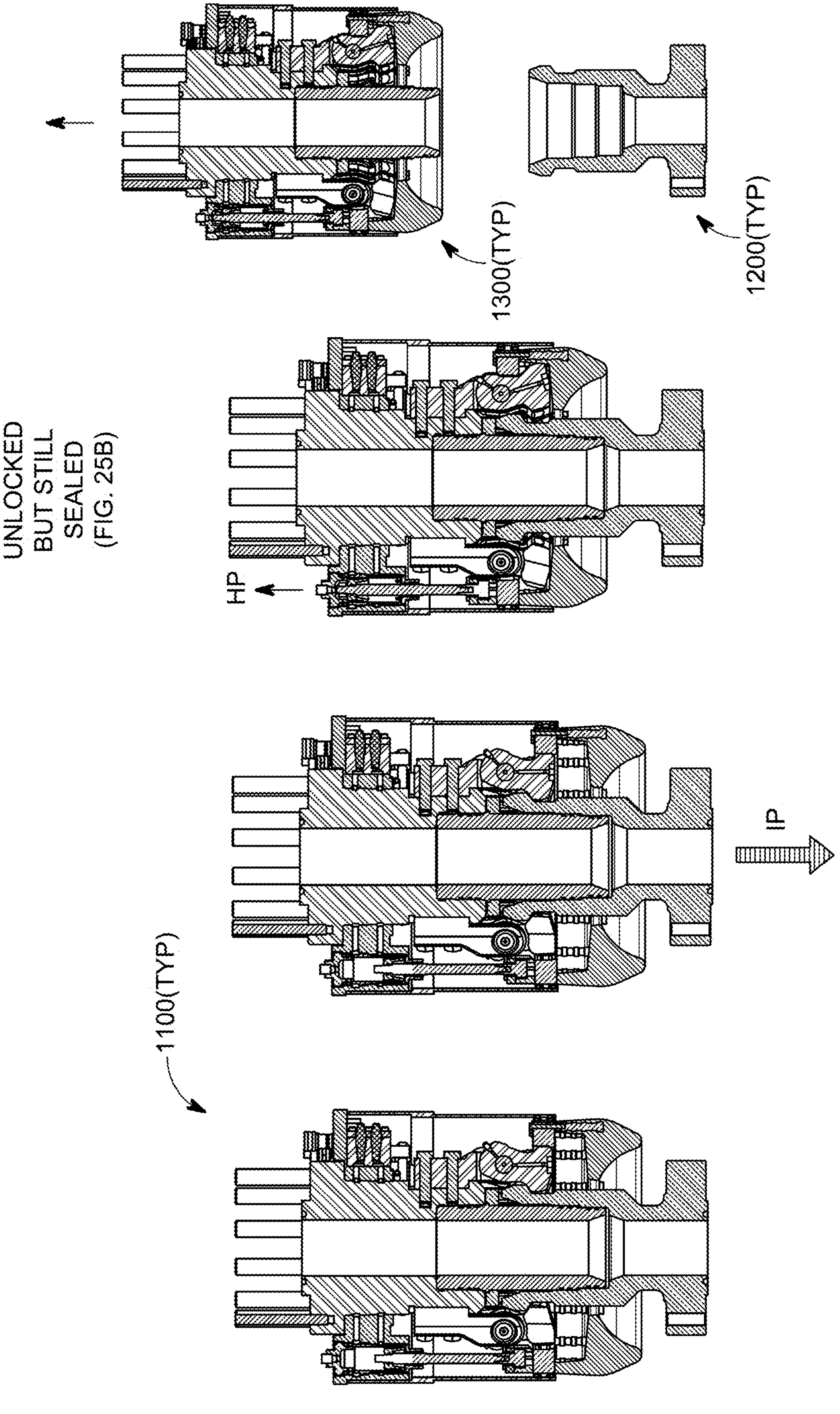
FIG. 25 depicts sequential "freeze frame" views illustrating disengagement of fluid connection assembly 1100 to release the fluid connection and seal.

The description above associated with FIGS. 28, 28A and 28B further establishes that the activation of a switch 1411 on position sensor assembly 1400 during reciprocating travel of travel pin 1405 may be used to monitor whether travel pin 1405 has reached a predetermined travel position. The travel of travel pin 1405 may thus be configured to be limited to a travel range between, say, travel positions A and B where positions A and B translate to preselected limits of locking ring 1318's designed range of travel. In some embodiments, travel position A for travel pin 1405 may selected to translate to a locking ring position towards a first end of locking ring 1318's range of travel, where piston assemblies 1380 on FIG. 29 are operationally extended so that fluid connection adapter 1200 and fluid connection housing assembly 1300 unit are operationally locked. Refer momentarily to FIG. 24C-"LOCKED", where extension of locking ring 1318 has caused wedge inner surfaces 1323 to become operationally engaged against adapter wedge engagement surface 1209. In some embodiments, travel position B for travel pin 1405 may selected to translate to a locking ring position towards a second end of locking ring 1318's range of travel, where piston assemblies 1380 on FIG. 29 are operationally retracted so that fluid connection adapter 1200 is free to enter or exit from fluid connection housing assembly 1300. Refer momentarily to FIGS. 24 and 25-"FREE", where retraction of locking ring 1318 has caused wedge assemblies 1310 to dilate open. Referring again to the description above associated with FIGS. 28, 28A and 28B, grooves 1413A, 1413B in travel pin 1405 may be configured such that a corresponding one of the switches 1411 on switch assembly 1415 activates when travel pin 1405 reaches either travel position A or travel position B. Activation of a switch 1411 may be configured to trigger an alarm, for example, alerting that locking ring 1318 has reached a locking ring position corresponding to one of travel pin 1405's travel positions A or B. Alternatively, if travel pin 1405's travel positions A and B translate to preselected limits of locking ring 1318's designed range of travel, activation of a switch 1411 may be configured to trigger a kill switch over piston assembly 1380 to prevent locking ring from traveling outside its design travel range.

FIG. 30 is similar to the section view in FIG. 22 except with the section location reoriented to cut through quick test sub 1500 and illustrate quick test passageway 1503. FIG. 30 shows that embodiments of fluid connection housing assembly 1300 providing quick test passageway 1503 give quick test sub 1500 continuous fluid passageway access to a preselected location between elastomer seal rings 1343 on first and second housing seal surfaces 1344, 1345 on seal insert 1301. FIG. 30 also illustrates quick test plugs 1504. FIG. 20A illustrates quick test apertures 1506 into which quick test plugs 1504 are received. Quick test plugs 1504 are for closing quick test apertures 1506 at desired locations. It will be appreciated from FIG. 30 that, in embodiments, quick test passageway 1503 may be manufactured by drilling holes into various parts on fluid housing connection assembly 1300 to form cooperating "tunnels" when fluid housing connection assembly 1300 is assembled. Quick test apertures 1506 arise from drilling such holes, and quick test plugs 1504 are made available to close and seal the ends of the holes as required.

FIG. 30 shows that quick test passageway 1503 extends from a fluid connection housing assembly exterior through to a preselected location between first and second housing seal surfaces 1344, 1345. More specifically, FIG. 30 illustrates an embodiment in which quick test sub 1500 is received into quick test port 1501 on housing frame 1302. Housing frame 1302 is located on an exterior of fluid connection housing assembly 1300. Quick test passageway 1503 begins through quick test port 1501 on the exterior of fluid connection housing assembly 1300 and extends through to a first interface point. The first interface point is located between housing frame 1302 and flanged connector 1303. The first interface point is created by specifically orienting flanged connector 1303 relative to housing frame 1302 during assembly of fluid connection housing assembly 1300. FIG. 30 then shows that quick test passageway 1503 runs through the wall of flanged connector 1303 from the first interface point to a second interface point. The second interface point is located between flanged connector 1303 and seal insert 1301. The second interface point is created by specifically orienting seal insert 1301 relative to flanged connector 1303 during assembly of fluid connection housing assembly 1300. FIG. 30 then shows that quick test passageway 1503 runs through the wall of seal insert 1301 from the second interface point to a preselected location between elastomer seal rings 1343 on first and second housing seal surfaces 1344, 1345.

The operation and purpose of quick test sub 1500 is as follows: Pressurized fluid may be introduced (via, for example, hand pumping) into quick test sub 1500 on FIG. 30 and through quick test passageway 1503 all the way down to the space between elastomer seal rings 1343 on first and second housing seal surfaces 1344, 1345. The integrity of the seals created in the space between elastomer seal rings 1343 on first and second housing seal surfaces 1344, 1345 may thus be checked prior to introducing high pressure operational fluid (e.g. from a wellhead) into a connection between fluid connection adapter 1200 and fluid connection housing assembly 1300. Other operational uses for quick test sub 1500 and quick test passageway 1503 include equalizing existing pressure in the space between elastomer seal rings 1343 on first and second housing seal surfaces 1344, 1345 after the introduction of operational high pressure fluid (e.g. from a wellhead) into a connection between fluid connection adapter 1200 and fluid connection housing assembly 1300. Conversely, upon release of such operational pressure, it may be beneficial to use quick test passageway 1503 to release any residual operational pressure in the space between elastomer seal rings 1343 on first and second housing seal surfaces 1344, 1345 that may have not immediately released by itself.

It will thus be appreciated that quick test passageway 1503 is engineered to reside entirely on fluid connection housing assembly 1300. No portion of quick test passageway 1503 resides on fluid connection adapter 1200. This configuration provides advantages as described in the "Summary" section of this disclosure above. Further, it will be appreciated that the scope of this disclosure includes non-illustrated embodiments that provide an additional monitoring port and passageway from an exterior of fluid connection housing assembly 1300 into the space between elastomer seal rings 1343 on first and second housing seal surfaces 1344, 1345. In this way, an external pressure monitor may determine whether the quick test space between elastomer seal rings 1343 on first and second housing seal surfaces 1344, 1345 needs to be pressurized or depressurized, as operational circumstances may require.

FIGS. 24 and 24A through 24D depict sequential "freeze frame" views illustrating engagement of fluid connection assembly 1100 to form a fluid connection and seal. FIG. 24 provides a sequential summary, left to right, of stages of engagement illustrated individually on FIGS. 24A through 24D. FIG. 24 initially shows fluid connection housing assembly 1300 and fluid connection adapter 1200 in a "FREE" state. As shown on FIGS. 24 and 24A, engagement begins with mating fluid connection adapter 1200 and fluid connection housing assembly 1300 to form a seal between them. As noted above, some embodiments of the technology described in this disclosure may be configured such that fluid connection adapter 1200 is stationary (as in, for example, attached ultimately to a well head), and such that fluid connection housing assembly 1300 is movable (as in, for example, deployable by crane to mate with a stationary fluid connection adapter 1200). Consistent with such embodiments, FIGS. 24 and 24A show fluid connection housing assembly 1300 lowered onto a stationary fluid connection adapter 1200.

FIG. 24A illustrates a "SEALED" state in which rib 1210 on fluid connection adapter 1200 encounters and abuts retaining ring 1307 when fluid connection housing assembly 1300 is fully received over fluid connection adapter 1200. In this way, rib 1210's contact with retaining ring 1307 acts as a positive insertion stop for fluid connection adapter 1200 into fluid connection housing assembly 1300. FIG. 24A shows that first and second adapter seal surfaces 1207, 1208 on fluid connection adapter 1200 form operational seals with first and second housing seal surfaces 1344, 1345 on seal insert 1301 when rib 1210 abuts retaining ring 1307.

It should be further noted on FIG. 24A that although fluid connection adapter 1200 and seal insert 1301 are in a "SEALED" state, fluid connection adapter 1200 and fluid connection housing assembly 1300 on FIG. 24A are still in an unlocked state. Piston assemblies 1380 on FIG. 24A have locking ring 1318 in a retracted state. As a result, wedges 1317 on wedge assemblies 1310 are dilated open to allow rib 1210 on fluid connection adapter 1200 to pass between wedges 1317 and seal insert 1301 as fluid connection housing assembly 1300 is lowered onto fluid connection adapter 1200. In more detail on FIG. 24A, locking ring disengagement surface 1321 contacts and bears upon wedge disengagement ribs 1312 when, as illustrated, piston assemblies 1380 have locking ring 1318 in a retracted state. When locking ring disengagement surface 1321 bears upon wedge disengagement ribs 1312, wedges 1317 rotate about wedge pins 1316 in a direction such that wedge inner surfaces 1323 separate from adapter wedge engagement surface 1209. Wedge assemblies 1310 thereby dilate open.

Figure 24B:
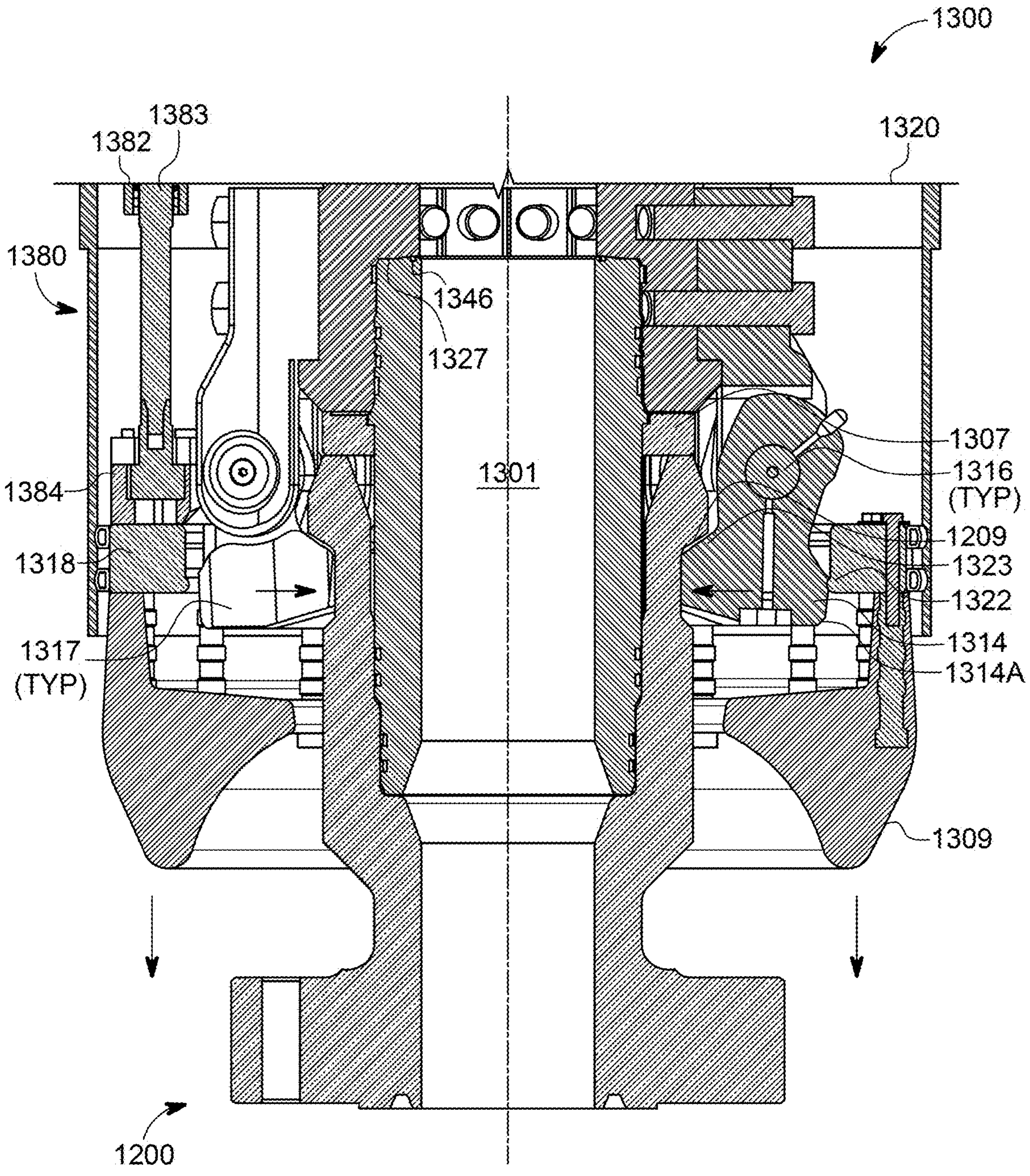

FIG. 24B illustrates a "HALF-TRAVEL" state in which extension of piston assemblies 1380 has caused corresponding travel of locking ring 1318 in the direction of the vertical black arrows on FIG. 24B. See also corresponding hydraulic pressure HP arrow shown on FIG. 24 indicating extension of piston assemblies 1380. Referring again to FIG. 24B, locking ring engagement rib 1322 now contacts and bears upon wedge outer surfaces 1314 causing constricting rotation of wedges 1317 about wedge pins 1316 in the direction of the horizontal black arrows (that is, such that wedge inner surfaces 1323 constrict radially towards adapter wedge engagement surface 1209).

FIG. 24C illustrates a "LOCKED" state in which further extension of piston assemblies 1380 has caused further travel of locking ring 1318 in the direction of the illustrated vertical black arrows on FIG. 24C. See also corresponding hydraulic pressure HP arrow shown on FIG. 24 indicating extension of piston assemblies 1380. Referring again to FIG. 24C, the resulting further radial constriction of wedges 1317 about wedge pins 1316 has caused wedge inner surfaces 1323 to become operationally engaged and locked against adapter wedge engagement surface 1209. Fluid connection housing assembly 1300 may now be considered operationally "locked and tight" over fluid connection adapter 1200 to preserve and maintain an operational seal between first and second adapter seal surfaces 1207, 1208 and first and second housing seal surfaces 1344, 1345.

In more detail on FIG. 24C, progressive engagement of locking ring engagement rib 1322 on wedge outer surfaces 1314 causes wedges 1317 to constrict radially. As locking ring engagement rib 1322 tightens its contact upon wedge outer surfaces 1314, locking ring 1318 urges wedge inner surfaces 1323 tighter onto adapter wedge engagement surface 1209. Preferably, adapter wedge engagement surface 1209 has a taper selected to cooperate with wedge element inner surfaces 1323 such that a full tightening action and force translation is enabled as wedges 1317 constrict radially. This disclosure is not limited to any specific cooperating tapers selected, and may include curved tapers as well as straight tapers.

Figure 24D:
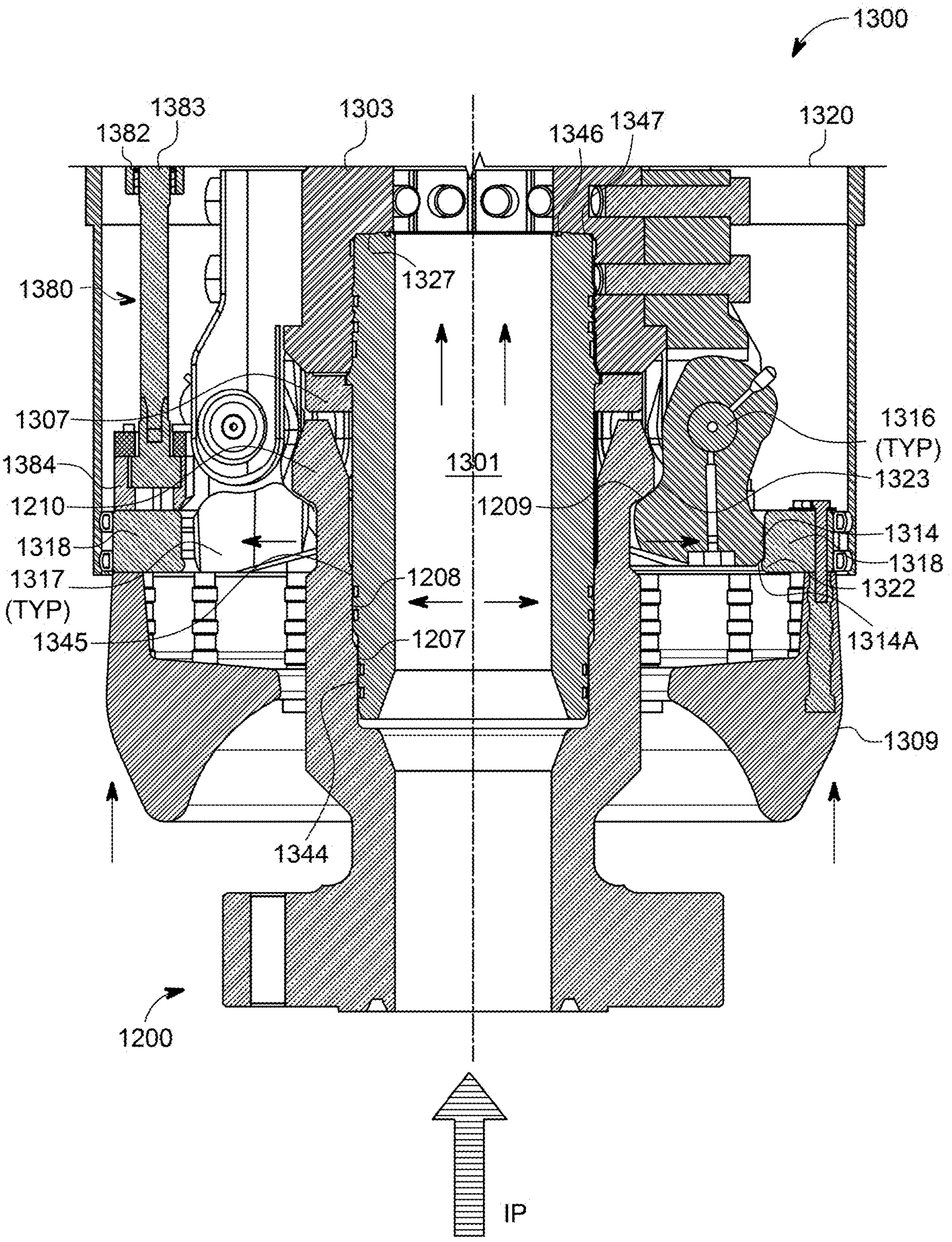

FIG. 24D illustrates a "PRESSURIZED" state when operational internal pressure IP is introduced once fluid connection housing assembly 1300 is operationally locked and sealed with fluid connection adapter 1200 (per FIG. 24C). Well pressure may be the source of internal pressure IP, for example. FIG. 24D shows internal pressure IP introduced within the second adapter end of fluid connection adapter 1200 (refer to description of FIG. 18 above for orientation of first and second adapter ends). Internal pressure IP within fluid connection adapter 1200 displaces fluid connection housing assembly 1300 into tighter restraint by wedges 1317. Specifically, seal insert 1301 expands radially responsive to internal pressure IP (per the horizontal black arrows on FIG. 24D within seal insert 1301) and as a result tightens sealing contact between first and second adapter seal surfaces 1207, 1208 on fluid connection adapter 1200 and first and second housing seal surfaces 1344, 1345 on seal insert 1301. Further, fluid connection housing assembly 1300 is urged away from fluid connection adapter 1200 responsive to internal pressure IP (per the externally-drawn vertical black arrows on FIG. 24D). As a result, rib 1210 displaces from abutment with retaining ring 1307, urging adapter wedge engagement surface 1209 even tighter onto wedge inner surfaces 1323, and further urging wedge outer surfaces 1314 even tighter onto locking ring 1318 (per the horizontal black arrows on FIG. 24D on wedges 1317).

FIG. 24D further illustrates where, in embodiments, seal insert 1301 is disposed to be received into the flanged connector 1303. Longitudinal housing seal surface 1347 on seal insert 1301 on FIG. 24D opposes longitudinal flanged connector seal surface 1327 on flanged connector 1303 when seal insert 1301 is received into flanged connector 1303. Per the internally-drawn vertical black arrows within seal insert 1301 on FIG. 24D, seal insert 1301 is disposed to expand longitudinally towards flanged connector 1303 responsive to introduction of internal pressure IP within the second adapter end of fluid connection adapter 1200. Longitudinal expansion of seal insert 1301 causes longitudinal housing seal surface 1347 to tighten against longitudinal flanged connector seal surface 1327.

FIG. 24D further illustrates an interface between seal insert 1301 and flanged connector 1303 when seal insert 1301 is received into flanged connector 1303. FIG. 24D shows that the interface could potentially provide a pathway for internal pressure IP leak out to atmosphere. It will therefore be appreciated from FIG. 24D that tightening of longitudinal housing seal surface 1347 against longitudinal flanged connector seal surface 1327 (responsive to introduction of internal pressure IP) acts to contain internal pressure IP from leaking out through the interface between seal insert 1301 and flanged connector 1303. With momentary reference to FIG. 20A, FIG. 24D further shows longitudinal seal insert groove 1346 may provide an elastomer seal ring (such as an o-ring seal) between longitudinal housing seal surface 1347 and longitudinal flanged connector seal surface 1327 in order to further seal the surfaces when internal pressure IP causes seal insert 1301 to expand longitudinally in the direction of the vertical black arrows on FIG. 24D.

FIG. 24D also depicts first adapter seal surface 1207 still sealingly engaged with first housing seal surface 1344, and second adapter seal surface 1208 still sealingly engaged with second housing seal surface 1345. It will be understood that when internal pressure IP displaces fluid connection adapter 1200, first and second adapter seal sections 1207, 1208 also slidingly displace relative to first and second housing seal surfaces 1344, 1345 but nonetheless maintain sealing contact and engagement.

FIG. 24D further illustrates that in some embodiments, locking ring 1318 provides locking ring engagement rib 1322, and each wedge 1317 provides a wedge outer surface chamfer 1314A. Wedge outer surface chamfer 1314A is illustrated in more detail on FIG. 23C and locking ring engagement rib 1322 is illustrated in more detail on FIG. 21A. FIG. 24D shows that wedge outer surface chamfers 1314A are configured to receive locking ring engagement rib 1322 when locking ring 1318 is fully engaged on wedge outer surfaces 1314. FIG. 24D further illustrates that when locking ring engagement rib 1322 is received by at least one wedge outer surface chamfer 1314A, introduction of internal pressure IP within the second adapter end of fluid connection adapter 1200 restrains locking ring 1318 from disengagement from each wedge outer surface 1314. [Refer back to description of FIG. 18 for orientation of first and second adapter ends of fluid connection adapter 1200]. As described above also with reference to FIG. 24D, internal pressure IP acts to urge wedge outer surfaces 1314 tighter onto locking ring 1318 (per the smaller horizontal black arrows on FIG. 24D on wedges 1317). The more that internal pressure IP urges wedge outer surfaces 1314 to tighten onto locking ring 1318, the more that locking ring engagement rib 1322, as received by wedge outer surface chamfers 1314A, restrains locking ring 1318 from travel in the direction of the externally-drawn vertical black arrows on FIG. 24D (that is, in the direction of retraction of piston assemblies 1380). The interoperation of locking ring engagement rib 1322 and wedge outer surface chamfers 1314A is thus effective to guard against unintentional (or accidental) disengagement of fluid connection housing assembly 1300 from fluid connection adapter 1200 when internal pressure IP is present.

Figure 25A:
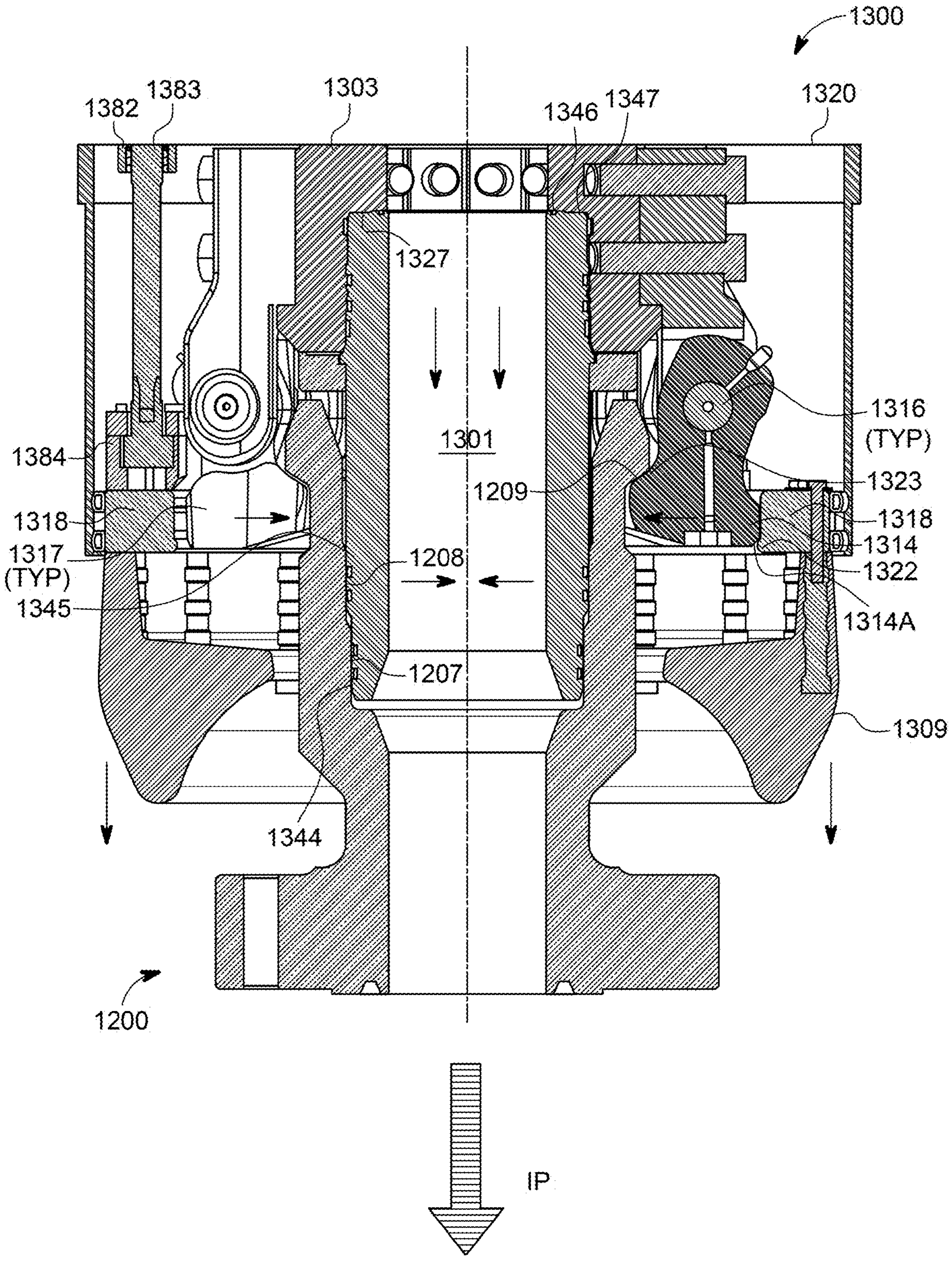
FIGS. 25A and 25B are enlargements of the correspondingly-labeled "freeze frame" views on FIG. 25.
Figure 25B:
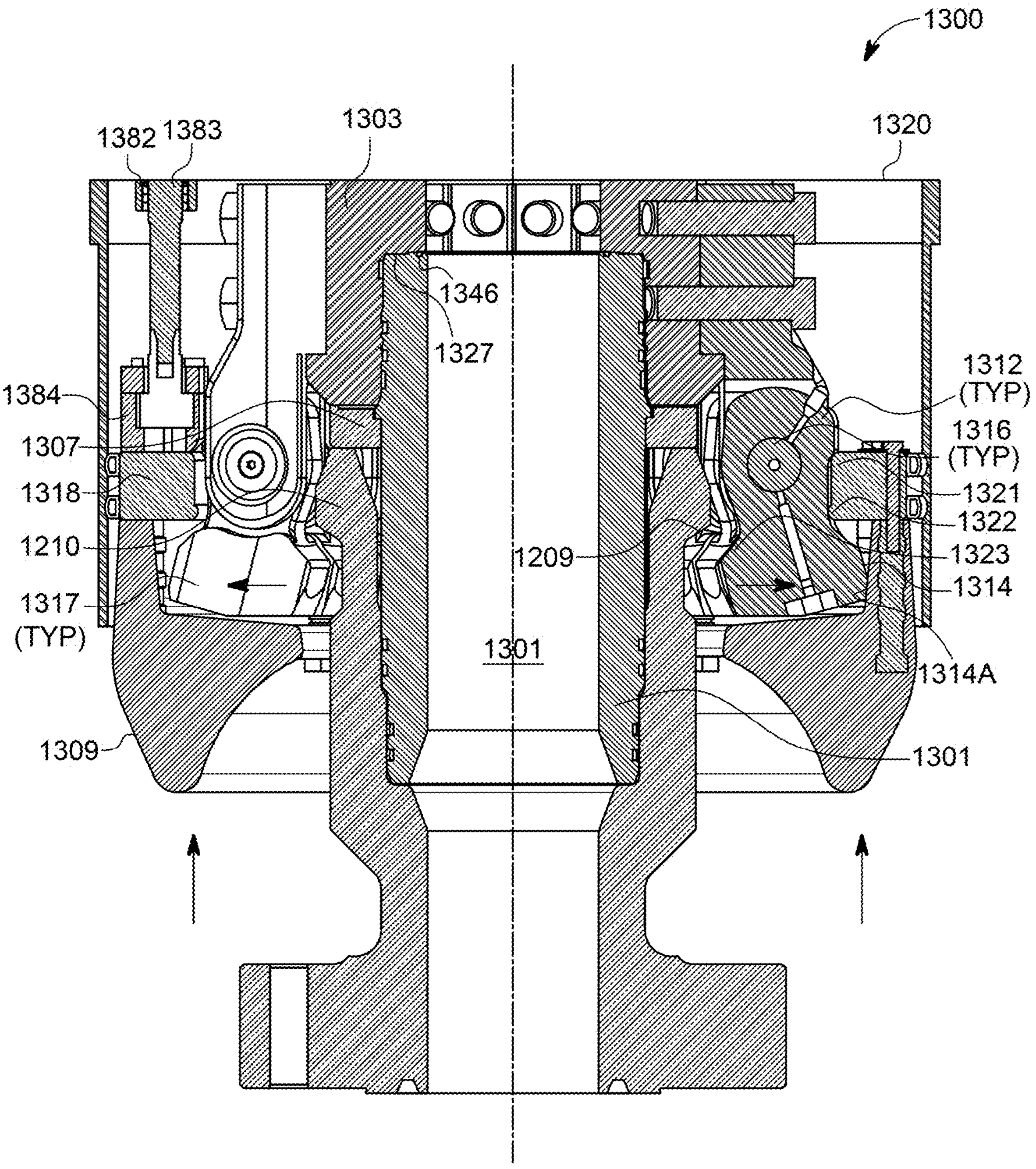

FIGS. 25, 25A and 25B depict sequential "freeze frame" views illustrating disengagement of fluid connection assembly 1100. Disengagement of fluid connection adapter 1200 from fluid connection housing assembly 1300 is essentially the reverse operation of the operation described immediately above with reference to FIGS. 24 and 24A through 24D. FIG. 25 provides a sequential summary, left to right, of the stages of engagement illustrated individually on FIGS. 25A and 25B. The disengagement sequence illustrated on FIGS. 25, 25A and 25B begins on the left on FIG. 25 with fluid connection assembly 1100 in the "PRESSURIZED" state illustrated and described above with reference to FIG. 24D.

FIG. 25A illustrates a "DEPRESSURIZED" state in which internal pressure IP is removed. Seal insert 1301 contracts radially responsive to removal of internal pressure IP (per the horizontal black arrows on FIG. 25A within seal insert 1301). Fluid connection housing assembly 1300 also moves towards fluid connection adapter 1200 responsive to removal of internal pressure IP (per the externally-drawn vertical black arrows on FIG. 25A). At least two kinetic effects occur as a result of fluid connection housing assembly 1300 moving towards fluid connection adapter 1200 responsive to removal of internal pressure IP. First, rib 1210 abuts with retaining ring 1307 again (see FIG. 25B), allowing adapter wedge engagement surface 1209 to relax against wedge inner surfaces 1323, and relaxing wedge outer surfaces 1314 against locking ring 1318 (per the horizontal black arrows on FIG. 25A on wedges 1317). Second, per the internally-drawn vertical black arrows within seal insert 1301 on FIG. 25A, seal insert 1301 is disposed to contract longitudinally away from flanged connector 1303 responsive to removal of internal pressure IP. Longitudinal contraction of seal insert 1301 causes longitudinal housing seal surface 1347 to relax against longitudinal flanged connector seal surface 1327.

FIG. 25B illustrates an "UNLOCKED BUT STILL SEALED" state in which retraction of piston assemblies 1380 has caused travel of locking ring 1318 in the direction of the illustrated vertical black arrows on FIG. 25B. See also corresponding hydraulic pressure HP arrow shown on FIG. 25 indicating retraction of piston assemblies 1380. Referring again to FIG. 25B, the illustrated travel of locking ring 1318 disengages locking ring engagement rib 1322 from contact with wedge outer surfaces 1314 so that wedge inner surfaces 1323 are free to disengage with adapter wedge engagement surface 1209. Further, the illustrated travel of locking ring 1318 causes locking ring disengagement surface 1321 to contact wedge disengagement ribs 1312, causing dilation of wedges 1317 via rotation around wedge pins 1316 in the direction of the horizontal black arrows on FIG. 25B. As a result, wedge inner surfaces 1323 separate from adapter wedge engagement surface 1209, giving fluid connection housing assembly 1300 clearance to be removed over rib 1210 on fluid connection adapter 1200. Removal of fluid connection housing assembly 1300 from fluid connection adapter 1200 breaks the seal between first and second adapter seal surfaces 1207, 1208 on fluid connection adapter 1200 and first and second housing seal surfaces 1344, 1345 on seal insert 1301. The disengagement sequence on FIG. 25 finally illustrates a "FREE" state in which fluid connection housing assembly 1300 has been unsealed and separated from fluid connection adapter 1200.

Earlier description made clear that the scope of this disclosure in no way limits the described fluid connection design embodiments and associated seal embodiments to specific sizes or models. Currently envisaged embodiments make the disclosed technology available in several sizes, shapes, and pressure ratings to adapt to desired applications. Proprietary connections may require specialized adapters. It will be nonetheless understood that the scope of this disclosure is not limited to any particular sizes, shapes, and pressure ratings for various embodiments thereof, and that the embodiments described in this disclosure and in U.S. provisional patent application Ser. No. 62/649,008 (incorporated herein by reference) are exemplary only.

Currently envisaged embodiments of the fluid connection designs (and associated seals) provide pressure ratings up to and including at least 15,000 psi MAWP. Currently envisaged sizes include internal diameters up to and including at least 8" ID. The foregoing sizes and performance metrics are exemplary only, and the scope of this disclosure is not limited in such regards.

Although fluid connection embodiments and associated seal embodiments have been described in this disclosure with reference to an exemplary application in hydraulic fracturing, pressure control at a wellhead, alternative applications could include, for example, areas such as subsea connections, deep core drilling, offshore drilling, methane drilling, open hole applications, well pressure control, wireline operations, coil tubing operations, mining operations, and various operations where connections are needed under a suspended or inaccessible load (i.e., underwater, hazardous area). The scope of this disclosure is not limited to any particular application in which the described fluid connections may be deployed.

Exemplary materials used in the construction of the disclosed embodiments include high strength alloy steels, high strength polymers, and various grades of elastomers.

Although the material in this disclosure has been described in detail along with some of its technical advantages, it will be understood that various changes, substitutions and alternations may be made to the detailed embodiments without departing from the broader spirit and scope of such material as set forth in the following claims.

We claim:

1. A fluid connection assembly, comprising:

a fluid connection adapter having first and second adapter ends, the fluid connection adapter providing a tapered adapter wedge engagement surface on an external surface of the fluid connection adapter, the fluid connection adapter further providing at least a first adapter seal surface on an internal surface of the fluid connection adapter; and a fluid connection housing assembly having first and second housing ends, the fluid connection housing assembly including a plurality of wedges and at least a first housing seal surface;

wherein each wedge is disposed to constrict radially;

wherein each wedge has a wedge inner surface;

wherein entry of the second adapter end into the first housing end causes the first adapter seal surface to sealingly contact the first housing seal surface;

wherein entry of the second adapter end into the first housing end also causes the wedge inner surfaces to engage the fluid connection adapter via the adapter wedge engagement surface; and wherein the first adapter seal surface is disposed to expand radially, such that when the first adapter seal surface expands radially the first adapter seal surface tightens sealing contact against the first housing seal surface.

2. The fluid connection assembly of claim 1, in which each wedge also has a wedge outer surface and in which the fluid connection housing assembly further includes a displaceable locking ring, wherein displacement of the locking ring engages the wedge outer surfaces to cause the wedge inner surfaces to engage the fluid connection adapter via the adapter wedge engagement surface.

3. The fluid connection assembly of claim 2, in which engagement of the locking ring on the wedge outer surfaces urges the wedge inner surfaces to tighten against the adapter wedge engagement surface.

4. The fluid connection assembly of claim 2, in which the wedge inner surfaces are disposed to tighten against the adapter wedge engagement surface responsive to displacement of the second adapter end towards the first housing end once the locking ring engages the wedge outer surfaces.

5. The fluid connection assembly of claim 1, in which the first adapter seal surface is disposed to expand radially responsive to introduction of internal pressure within the second adapter end.

6. The fluid connection assembly of claim 5, in which the locking ring provides a locking ring engagement rib, and in which each wedge provides a wedge outer surface chamfer configured to receive the locking engagement ring rib;

wherein, when the locking ring engagement rib is received by at least one wedge outer surface chamfer, introduction of internal pressure within the second adapter end restrains the locking ring from disengagement from each wedge outer surface.

7. The fluid connection assembly of claim 1, in which:

the fluid connection housing assembly further comprises a flanged connector and a seal insert such that the seal insert is disposed to be received into the flanged connector, wherein the first housing seal surface is on an exterior of the seal insert, wherein a longitudinal housing seal surface on the seal insert opposes a longitudinal flanged connector seal surface on the flanged connector when the seal insert is received into the flanged connector; and the seal insert is disposed to expand longitudinally responsive to introduction of internal pressure within the second adapter end, causing the longitudinal housing seal surface to tighten against the longitudinal flanged connector seal surface.

8. The fluid connection assembly of claim 1, in which the fluid connection housing assembly further includes a second housing seal surface and a quick test passageway, wherein the second housing seal surface is also on an exterior of the seal insert, wherein the quick test passageway extends from a fluid connection housing assembly exterior through to a preselected location between the first housing seal surface and the second housing seal surface.

9. A fluid connection assembly, comprising:

a fluid connection adapter having first and second adapter ends, the fluid connection adapter providing a tapered adapter wedge engagement surface on an external surface of the fluid connection adapter, the fluid connection adapter further providing at least a first adapter seal surface; and a fluid connection housing assembly having first and second housing ends, the fluid connection housing assembly including a plurality of wedges and at least a first housing seal surface;

wherein each wedge is disposed to constrict radially;

wherein each wedge has a wedge inner surface;

wherein entry of the second adapter end into the first housing end causes the first adapter seal surface to sealingly contact the first housing seal surface;

wherein entry of the second adapter end into the first housing end also causes the wedge inner surfaces to engage the fluid connection adapter via the adapter wedge engagement surface;

wherein the first adapter seal surface is disposed to expand radially, such that when the first adapter seal surface expands radially the first adapter seal surface tightens sealing contact against the first housing seal surface; and wherein, when the fluid connection adapter is in stationary connection to a pressurized source of fluids, the fluid connection housing assembly is movable to be brought into fluid sealing engagement with the fluid connection adapter.

10. The fluid connection assembly of claim 9, in which the first adapter seal surface is on an internal surface of the fluid connection adapter.

11. The fluid connection assembly of claim 9, in which each wedge also has a wedge outer surface and in which the fluid connection housing assembly further includes a displaceable locking ring, wherein displacement of the locking ring engages the wedge outer surfaces to cause the wedge inner surfaces to engage the fluid connection adapter via the adapter wedge engagement surface.

12. The fluid connection assembly of claim 11, in which engagement of the locking ring on the wedge outer surfaces urges the wedge inner surfaces to tighten against the adapter wedge engagement surface.

13. The fluid connection assembly of claim 11, in which the wedge inner surfaces are disposed to tighten against the adapter wedge engagement surface responsive to displacement of the second adapter end towards the first housing end once the locking ring engages the wedge outer surfaces.

14. The fluid connection assembly of claim 9, in which the first adapter seal surface is disposed to expand radially responsive to introduction of internal pressure within the second adapter end.

15. The fluid connection assembly of claim 9, in which the fluid connection housing assembly further includes a second housing seal surface and a quick test passageway, wherein the second housing seal surface is also on an exterior of the seal insert, wherein the quick test passageway extends from a fluid connection housing assembly exterior through to a preselected location between the first housing seal surface and the second housing seal surface.

16. A fluid connection assembly, comprising:

a fluid connection adapter having first and second adapter ends, the fluid connection adapter providing a tapered adapter wedge engagement surface on an external surface of the fluid connection adapter, the fluid connection adapter further providing at least a first adapter seal surface;

a fluid connection housing assembly having first and second housing ends, the fluid connection housing assembly including a plurality of wedge assemblies and at least a first housing seal surface;

the fluid connection housing assembly further providing a flanged connector received into a housing frame, wherein the wedge assemblies are affixed to the flanged connector;

wherein each wedge assembly includes a wedge such that each wedge is disposed to constrict radially;

wherein each wedge has a wedge inner surface;

wherein entry of the second adapter end into the first housing end causes the first adapter seal surface to sealingly contact the first housing seal surface;

wherein entry of the second adapter end into the first housing end also causes the wedge inner surfaces to engage the fluid connection adapter via the adapter wedge engagement surface; and wherein the first adapter seal surface is disposed to expand radially, such that when the first adapter seal surface expands radially the first adapter seal surface tightens sealing contact against the first housing seal surface.

17. The fluid connection assembly of claim 16, in which selected wedge assemblies affix to the flanged connection removably via wedge anchor fasteners.

18. The fluid connection assembly of claim 16, in which the first adapter seal surface is on an internal surface of the fluid connection adapter.

19. The fluid connection assembly of claim 16, in which, when the fluid connection adapter is in stationary connection to a pressurized source of fluids, the fluid connection housing assembly is movable to be brought into fluid sealing engagement with the fluid connection adapter.

20. The fluid connection assembly of claim 16, in which each wedge also has a wedge outer surface and in which the fluid connection housing assembly further includes a displaceable locking ring, wherein displacement of the locking ring engages the wedge outer surfaces to cause the wedge inner surfaces to engage the fluid connection adapter via the adapter wedge engagement surface.

21. The fluid connection assembly of claim 20, in which engagement of the locking ring on the wedge outer surfaces urges the wedge inner surfaces to tighten against the adapter wedge engagement surface.

22. The fluid connection assembly of claim 20, in which the wedge inner surfaces are disposed to tighten against the adapter wedge engagement surface responsive to displacement of the second adapter end towards the first housing end once the locking ring engages the wedge outer surfaces.

23. The fluid connection assembly of claim 16, in which the first adapter seal surface is disposed to expand radially responsive to introduction of internal pressure within the second adapter end.

24. The fluid connection assembly of claim 16, in which the fluid connection housing assembly further includes a second housing seal surface and a quick test passageway, wherein the second housing seal surface is also on an exterior of the seal insert, wherein the quick test passageway extends from a fluid connection housing assembly exterior through to a preselected location between the first housing seal surface and the second housing seal surface.

25. A fluid connection assembly, comprising:

a fluid connection adapter having first and second adapter ends, the fluid connection adapter providing a tapered adapter wedge engagement surface on an external surface of the fluid connection adapter, the fluid connection adapter further providing at least a first adapter seal surface; and a fluid connection housing assembly having first and second housing ends, the fluid connection housing assembly including a plurality of wedges and at least a first housing seal surface, the fluid connection housing assembly further including a displaceable locking ring in which the locking ring provides a locking ring engagement rib;

wherein each wedge is disposed to constrict radially;

wherein each wedge has a wedge inner surface and a wedge outer surface;

wherein at least one wedge provides a wedge outer surface chamfer configured to receive the locking ring engagement rib;

wherein entry of the second adapter end into the first housing end causes the first adapter seal surface to sealingly contact the first housing seal surface;

wherein entry of the second adapter end into the first housing end also causes the wedge inner surfaces to engage the fluid connection adapter via the adapter wedge engagement surface;

wherein displacement of the locking ring engages the wedge outer surfaces to urge the wedge inner surfaces to tighten against the adapter wedge engagement surface;

wherein the first adapter seal surface is disposed to expand radially, such that when the first adapter seal surface expands radially the first adapter seal surface tightens sealing contact against the first housing seal surface; and wherein, when the locking ring engagement rib is received by at least one wedge outer surface chamfer, introduction of internal pressure within the second adapter end restrains the locking ring from disengagement from each wedge outer surface.

26. The fluid connection assembly of claim 25, in which, when the fluid connection adapter is in stationary connection to a pressurized source of fluids, the fluid connection housing assembly is movable to be brought into fluid sealing engagement with the fluid connection adapter.

27. The fluid connection assembly of claim 25, in which the fluid connection housing assembly further includes a flanged connector received into a housing frame, wherein the wedge assemblies are affixed to the flanged connector.

28. The fluid connection assembly of claim 25, in which:
- the fluid connection housing assembly further comprises a flanged connector and a seal insert such that the seal insert is disposed to be received into the flanged connector, wherein the first housing seal surface is on an exterior of the seal insert, wherein a longitudinal housing seal surface on the seal insert opposes a longitudinal flanged connector seal surface on the flanged connector when the seal insert is received into the flanged connector; and
- the seal insert is disposed to expand longitudinally responsive to introduction of internal pressure within the second adapter end, causing the longitudinal housing seal surface to tighten against the longitudinal flanged connector seal surface.

29. The fluid connection assembly of claim 25, in which the first adapter seal surface is on an internal surface of the fluid connection adapter.

30. The fluid connection assembly of claim 25, in which the fluid connection housing assembly further includes a second housing seal surface and a quick test passageway, wherein the second housing seal surface is also on an exterior of the seal insert, wherein the quick test passageway extends from a fluid connection housing assembly exterior through to a preselected location between the first housing seal surface and the second housing seal surface.

31. The fluid connection assembly of claim 25, in which the wedge inner surfaces are disposed to tighten against the adapter wedge engagement surface responsive to displacement of the second adapter end towards the first housing end once the locking ring engages the wedge outer surfaces.

32. The fluid connection assembly of claim 25, in which the first adapter seal surface is disposed to expand radially responsive to introduction of internal pressure within the second adapter end.

33. The fluid connection assembly of claim 25, in which the fluid connection housing assembly further includes a second housing seal surface and a quick test passageway, wherein the second housing seal surface is also on an exterior of the seal insert, wherein the quick test passageway extends from a fluid connection housing assembly exterior through to a preselected location between the first housing seal surface and the second housing seal surface.

34. A fluid connection assembly, comprising:
- a fluid connection adapter having first and second adapter ends, the fluid connection adapter providing a tapered adapter wedge engagement surface on an external surface of the fluid connection adapter, the fluid connection adapter further providing at least a first adapter seal surface; and
- a fluid connection housing assembly having first and second housing ends, the fluid connection housing assembly including a plurality of wedges and at least a first housing seal surface, the fluid connection housing assembly further including a flanged connector and a seal insert such that the seal insert is disposed to be received into the flanged connector, wherein the first housing seal surface is on an exterior of the seal insert, wherein a longitudinal housing seal surface on the seal insert opposes a longitudinal flanged connector seal surface on the flanged connector when the seal insert is received into the flanged connector;
- wherein each wedge is disposed to constrict radially;
- wherein each wedge has a wedge inner surface;
- wherein entry of the second adapter end into the first housing end causes the first adapter seal surface to sealingly contact the first housing seal surface;
- wherein entry of the second adapter end into the first housing end also causes the wedge inner surfaces to engage the fluid connection adapter via the adapter wedge engagement surface;
- wherein the first adapter seal surface is disposed to expand radially, such that when the first adapter seal surface expands radially the first adapter seal surface tightens sealing contact against the first housing seal surface; and
- wherein the seal insert is disposed to expand longitudinally responsive to introduction of internal pressure within the second adapter end, causing the longitudinal housing seal surface to tighten against the longitudinal flanged connector seal surface.

35. The fluid connection assembly of claim 34, in which, when the fluid connection adapter is in stationary connection to a pressurized source of fluids, the fluid connection housing assembly is movable to be brought into fluid sealing engagement with the fluid connection adapter.

36. The fluid connection assembly of claim 34, in which the fluid connection housing assembly further includes a flanged connector received into a housing frame, wherein the wedge assemblies are affixed to the flanged connector.

37. The fluid connection assembly of claim 34, in which the first adapter seal surface is on an internal surface of the fluid connection adapter.

38. The fluid connection assembly of claim 34, in which each wedge also has a wedge outer surface and in which the fluid connection housing assembly further includes a displaceable locking ring, wherein displacement of the locking ring engages the wedge outer surfaces to cause the wedge inner surfaces to engage the fluid connection adapter via the adapter wedge engagement surface.

39. The fluid connection assembly of claim 38, in which engagement of the locking ring on the wedge outer surfaces urges the wedge inner surfaces to tighten against the adapter wedge engagement surface.

40. The fluid connection assembly of claim 38, in which the wedge inner surfaces are disposed to tighten against the adapter wedge engagement surface responsive to displacement of the second adapter end towards the first housing end once the locking ring engages the wedge outer surfaces.

41. The fluid connection assembly of claim 34, in which the first adapter seal surface is disposed to expand radially also responsive to said introduction of internal pressure within the second adapter end.

42. The fluid connection assembly of claim 34, in which the fluid connection housing assembly further includes a second housing seal surface and a quick test passageway, wherein the quick test passageway extends from a fluid connection housing assembly exterior through to a preselected location between the first housing seal surface and the second housing seal surface.

* * * * *